US012119701B2

(12) United States Patent
Sanghvi et al.

(10) Patent No.: US 12,119,701 B2
(45) Date of Patent: Oct. 15, 2024

(54) SYSTEMS AND METHODS FOR UNIVERSAL SERIAL BUS (USB) POWER DELIVERY WITH MULTIPLE CHARGING PORTS

(71) Applicant: Leviton Manufacturing Co, Inc., Melville, NY (US)

(72) Inventors: Ankit Milan Sanghvi, Hicksville, NY (US); Benjamin R. Weiss, Hicksville, NY (US); Mahesh Srinivasan, Hicksville, NY (US); Ronald Jansen, Ridgewood, NY (US); Michael Kamor, North Massapequa, NY (US); William Randall, Port Washington, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 806 days.

(21) Appl. No.: 17/177,100

(22) Filed: Feb. 16, 2021

(65) Prior Publication Data

US 2021/0167623 A1    Jun. 3, 2021

Related U.S. Application Data

(63) Continuation-in-part of application No. 17/268,935, filed as application No. PCT/US2019/048739 on Aug. 29, 2019.

(51) Int. Cl.
*H02J 7/00* (2006.01)
(52) U.S. Cl.
CPC ...... *H02J 7/007192* (2020.01); *H02J 7/0013* (2013.01); *H02J 7/0045* (2013.01); *H02J 2207/30* (2020.01)
(58) Field of Classification Search
CPC .. H02J 7/007192; H02J 7/0013; H02J 7/0045; H02J 2207/30
See application file for complete search history.

(56) References Cited

U.S. PATENT DOCUMENTS 3,688,239 A    8/1972   Jaconette
5,472,350 A    12/1995  Mehta
(Continued)

FOREIGN PATENT DOCUMENTS

EP    3413426 A1    12/2018
WO    2012068635 A1    5/2012

OTHER PUBLICATIONS

Article: "Thermally Conductive Plastics to be Used in Wiring Devices", an ip.com technical dislosure No., IPCOM000240467D, published Feb. 2, 2015.
(Continued)

*Primary Examiner* — Richard V Muralidar
(74) *Attorney, Agent, or Firm* — Carter, DeLuca & Farrell LLP; George Likourezos

(57) ABSTRACT

A universal serial bus (USB) charging system includes a power supply including a plurality of power converters and a plurality of power supply outputs electrically coupled to the plurality of power converters, respectively. Each of the plurality of power converters is configured to convert an input voltage to a plurality of output voltages. A plurality of charging ports are electrically connected with the plurality of power supply outputs, respectively. Each of the plurality of charging ports provides an output voltage selected from the plurality of output voltages to an electronic device. A logic circuit is in electrical communication with the power supply and the plurality of charging ports. The logic circuit provides direct feedback to the power supply to output a particular output voltage of the plurality of output voltages to the plurality of charging ports and regulates a temperature of the plurality of charging ports.

30 Claims, 40 Drawing Sheets

(56) References Cited

U.S. PATENT DOCUMENTS

| | | | |
|---|---|---|---|
| 5,954,523 | A | 9/1999 | Babcock |
| 6,050,849 | A | 4/2000 | Chang |
| 6,056,578 | A | 5/2000 | Lin |
| 6,141,221 | A | 10/2000 | Tong et al. |
| 6,210,216 | B1 | 4/2001 | Tso-Chin et al. |
| 6,211,581 | B1 | 4/2001 | Farrant |
| 6,305,986 | B1 | 10/2001 | Hwang |
| 6,346,009 | B1 | 2/2002 | Lin |
| 6,362,987 | B1 | 3/2002 | Yurek et al. |
| D465,769 | S | 11/2002 | Zhang et al. |
| 6,512,682 | B2 | 1/2003 | Coehn et al. |
| 6,541,879 | B1 | 4/2003 | Wright |
| 6,614,206 | B1 | 9/2003 | Wong |
| 6,722,917 | B2 | 4/2004 | Huang |
| 6,722,924 | B1 | 4/2004 | Zhou et al. |
| 6,736,677 | B1 | 5/2004 | Lin et al. |
| 6,767,245 | B2 | 7/2004 | King |
| D494,934 | S | 8/2004 | Milan |
| 6,776,658 | B2 | 8/2004 | Tang |
| 6,799,997 | B2 | 10/2004 | Lin et al. |
| 6,811,415 | B2 | 11/2004 | Chen |
| 6,843,684 | B2 | 1/2005 | Milan |
| 6,923,663 | B2 | 8/2005 | Oddsen et al. |
| 6,936,936 | B2 | 8/2005 | Fischer |
| 6,943,296 | B2 | 9/2005 | Perrella et al. |
| 7,075,004 | B1 | 7/2006 | Gretz |
| 7,140,922 | B2 | 11/2006 | Luu et al. |
| 7,167,372 | B2 | 1/2007 | Mori et al. |
| 7,170,259 | B2 | 1/2007 | Veselic |
| 7,195,500 | B2 | 3/2007 | Huang et al. |
| 7,211,986 | B1 | 5/2007 | Flowerdew et al. |
| 7,212,420 | B2 | 5/2007 | Liao |
| 7,239,111 | B2 | 7/2007 | Fischer et al. |
| 7,242,111 | B2 | 7/2007 | Menas et al. |
| 7,285,874 | B2 | 10/2007 | Menas et al. |
| 7,338,328 | B2 | 3/2008 | Krieger et al. |
| 7,358,703 | B2 | 4/2008 | Veselic |
| 7,453,233 | B2 | 11/2008 | Fischer et al. |
| 7,485,986 | B2 | 2/2009 | Menas et al. |
| 7,508,092 | B2 | 3/2009 | Menas et al. |
| 7,514,814 | B2 | 4/2009 | Menas et al. |
| 7,525,291 | B1 | 4/2009 | Ferguson |
| 7,528,323 | B2 | 5/2009 | Wu et al. |
| 7,528,582 | B1 | 5/2009 | Ferguson |
| 7,554,033 | B1 | 6/2009 | Bhosale et al. |
| 7,573,159 | B1 | 8/2009 | DeIuliis et al. |
| 7,573,242 | B2 | 8/2009 | Bayne et al. |
| 7,579,711 | B2 | 8/2009 | Menas et al. |
| 7,595,446 | B2 | 9/2009 | Turcovsky et al. |
| 7,602,079 | B2 | 10/2009 | Menas et al. |
| D607,816 | S | 1/2010 | Chen et al. |
| 7,646,107 | B2 | 1/2010 | Smith |
| 7,646,111 | B2 | 1/2010 | Menas et al. |
| 7,656,132 | B2 | 2/2010 | So et al. |
| 7,701,168 | B2 | 4/2010 | Thijssen |
| 7,714,534 | B2 | 5/2010 | Bayne et al. |
| 7,737,657 | B2 | 6/2010 | Fischer et al. |
| 7,741,870 | B2 | 6/2010 | Hurtz et al. |
| 7,759,906 | B2 | 7/2010 | Ferguson |
| 7,759,907 | B2 | 7/2010 | Ferguson |
| 7,766,698 | B1 | 8/2010 | Luliis et al. |
| 7,768,150 | B2 | 8/2010 | Platania et al. |
| 7,768,152 | B2 | 8/2010 | Menas et al. |
| 7,791,220 | B2 | 9/2010 | Menas et al. |
| 7,808,122 | B2 | 10/2010 | Menas et al. |
| 7,812,475 | B2 | 10/2010 | Menas et al. |
| 7,812,476 | B2 | 10/2010 | Menas et al. |
| 7,812,477 | B2 | 10/2010 | Menas et al. |
| 7,812,478 | B1 | 10/2010 | Menas |
| 7,812,565 | B2 | 10/2010 | Bayne et al. |
| 7,816,807 | B2 | 10/2010 | Menas et al. |
| 7,816,808 | B2 | 10/2010 | Menas et al. |
| 7,816,809 | B2 | 10/2010 | Menas et al. |
| 7,816,810 | B2 | 10/2010 | Menas et al. |
| 7,816,885 | B2 | 10/2010 | Bayne et al. |
| 7,834,586 | B2 | 11/2010 | Fischer et al. |
| 7,834,591 | B2 | 11/2010 | Hussain et al. |
| 7,855,528 | B2 | 12/2010 | Lee |
| 7,862,350 | B2 | 1/2011 | Richter et al. |
| 7,878,840 | B2 | 2/2011 | Hankey et al. |
| 7,886,104 | B2 | 2/2011 | Lai et al. |
| 7,893,653 | B2 | 2/2011 | Bayne et al. |
| 7,906,936 | B2 | 3/2011 | Azancot et al. |
| 7,910,833 | B2 | 3/2011 | McGinley et al. |
| RE42,385 | E | 5/2011 | Wong et al. |
| 7,960,859 | B2 | 6/2011 | Menas et al. |
| 7,960,944 | B2 | 6/2011 | Hoffman et al. |
| 7,978,489 | B1 | 7/2011 | Telefus et al. |
| 7,986,127 | B2 | 7/2011 | Fischer et al. |
| 7,997,925 | B2 | 8/2011 | Lam et al. |
| 8,011,937 | B2 | 9/2011 | Oddsen et al. |
| 8,033,846 | B2 | 10/2011 | Youssefi-Shams et al. |
| 8,052,486 | B2 | 11/2011 | Lee et al. |
| 8,057,265 | B2 | 11/2011 | Youssefi-Shams et al. |
| 8,096,818 | B2 | 1/2012 | Arenas et al. |
| 8,111,039 | B2 | 2/2012 | Bayne et al. |
| 8,115,591 | B2 | 2/2012 | Fair et al. |
| 8,134,254 | B2 | 3/2012 | Makwinski |
| 8,158,883 | B2 | 4/2012 | Soffer |
| 8,164,932 | B2 | 4/2012 | Sims et al. |
| 8,169,187 | B2 | 5/2012 | Fischer et al. |
| 8,170,623 | B2 | 5/2012 | Dorogusker et al. |
| 8,193,776 | B2 | 6/2012 | Bayne et al. |
| 8,193,779 | B2 | 6/2012 | Ferguson |
| 8,212,386 | B2 | 7/2012 | Mahaffey |
| 8,217,621 | B2 | 7/2012 | Tsai et al. |
| 8,219,729 | B1 | 7/2012 | Wright |
| 8,222,773 | B2 | 7/2012 | De Iuliis et al. |
| 8,232,766 | B2 | 7/2012 | Fischer et al. |
| 8,237,414 | B1 | 8/2012 | Li et al. |
| 8,242,359 | B2 | 8/2012 | McGinley et al. |
| 8,261,100 | B2 | 9/2012 | Paniagua, Jr. et al. |
| 8,272,899 | B2 | 9/2012 | Youssefi-Shams et al. |
| 8,296,587 | B2 | 10/2012 | Paniagua, Jr. et al. |
| 8,301,814 | B2 | 10/2012 | Ejiri |
| 8,308,496 | B2 | 11/2012 | Youssefi-Shams et al. |
| 8,321,603 | B2 | 11/2012 | Singh et al. |
| 8,330,422 | B2 | 12/2012 | Bayne et al. |
| 8,350,522 | B2 | 1/2013 | Johnson |
| 8,352,644 | B2 | 1/2013 | Malamant et al. |
| 8,362,713 | B2 | 1/2013 | Recker et al. |
| 8,362,745 | B2 | 1/2013 | Tinaphong |
| 8,373,387 | B2 | 2/2013 | Bourilkov et al. |
| 8,380,998 | B2 | 2/2013 | Azancot et al. |
| 8,384,241 | B2 | 2/2013 | Chen et al. |
| 8,386,814 | B2 | 2/2013 | Tom et al. |
| 8,415,901 | B2 | 4/2013 | Recker et al. |
| 8,439,692 | B1 | 5/2013 | Oddsen et al. |
| 8,446,134 | B2 | 5/2013 | Manor et al. |
| 8,450,980 | B2 | 5/2013 | Kumar et al. |
| 8,469,746 | B2 | 6/2013 | Kemp |
| 8,475,187 | B2 | 7/2013 | Youssefi-Shams et al. |
| 8,480,418 | B2 | 7/2013 | Youssefi-Shams et al. |
| 8,496,342 | B2 | 7/2013 | Misener |
| 8,497,659 | B2 | 7/2013 | Navid |
| 8,536,840 | B2 | 9/2013 | Walter et al. |
| 8,542,819 | B2 | 9/2013 | Hazani et al. |
| 8,545,039 | B2 | 10/2013 | Patel |
| 8,550,857 | B2 | 10/2013 | Youssefi-Shams et al. |
| 8,575,889 | B2 | 11/2013 | Platania et al. |
| 8,583,955 | B2 | 11/2013 | Lu et al. |
| 8,593,115 | B2 | 11/2013 | Walter et al. |
| 8,613,824 | B2 | 12/2013 | Kappacher et al. |
| 8,758,031 | B2 | 6/2014 | Cheng et al. |
| 8,760,123 | B2 | 6/2014 | Hawawini et al. |
| 8,773,078 | B2 | 7/2014 | Yu et al. |
| 8,819,301 | B2 | 8/2014 | Lai |
| 9,083,180 | B2 | 7/2015 | Dodal et al. |
| 9,368,982 | B2 | 6/2016 | Jansen et al. |
| 9,496,726 | B2 | 11/2016 | Frid et al. |
| 9,887,571 | B1* | 2/2018 | Sultenfuss ............ H02J 7/0068 |
| 10,433,455 | B2 | 10/2019 | Jansen et al. |
| 10,534,412 | B2* | 1/2020 | Perchlik ................ G06F 1/3206 |
| 10,615,613 | B2 | 4/2020 | Calhoun et al. |

(56) References Cited

U.S. PATENT DOCUMENTS

| | | | |
|---|---|---|---|
| 10,790,687 B2* | 9/2020 | Lee ................. | H02J 7/0047 |
| 10,923,941 B2* | 2/2021 | Jahan ................ | H02J 7/0019 |
| 2003/0109173 A1 | 6/2003 | Kidman | |
| 2003/0211300 A1 | 11/2003 | Kiyotaki | |
| 2004/0251878 A1 | 12/2004 | Veselic | |
| 2005/0088834 A1 | 4/2005 | Milan | |
| 2006/0085584 A1 | 4/2006 | Chen et al. | |
| 2007/0015401 A1 | 1/2007 | Sun | |
| 2007/0035276 A1 | 2/2007 | Webjorn | |
| 2007/0072476 A1 | 3/2007 | Milan | |
| 2007/0182363 A1 | 8/2007 | Yang | |
| 2007/0247800 A1 | 10/2007 | Smith et al. | |
| 2008/0012423 A1 | 1/2008 | Mimran | |
| 2008/0042616 A1 | 2/2008 | Monks | |
| 2008/0073117 A1 | 3/2008 | Misener | |
| 2008/0122292 A1 | 5/2008 | Minami | |
| 2008/0265838 A1 | 10/2008 | Garg et al. | |
| 2008/0318474 A1 | 12/2008 | Crotinger et al. | |
| 2009/0177906 A1 | 7/2009 | Paniagua, Jr. et al. | |
| 2010/0033018 A1 | 2/2010 | Fukasawa | |
| 2010/0090528 A1 | 4/2010 | Makwinski | |
| 2010/0090644 A1 | 4/2010 | Nokkonen | |
| 2010/0237696 A1 | 9/2010 | Maleyran et al. | |
| 2010/0246232 A1 | 9/2010 | Chen et al. | |
| 2010/0280671 A1 | 11/2010 | Lee | |
| 2011/0035624 A1 | 2/2011 | Miller | |
| 2011/0095722 A1 | 4/2011 | Chang | |
| 2012/0056495 A1 | 3/2012 | Carson et al. | |
| 2012/0166173 A1 | 6/2012 | Fischbach | |
| 2012/0276763 A1 | 11/2012 | Quezada | |
| 2012/0292991 A1 | 11/2012 | Dodal | |
| 2013/0241469 A1 | 9/2013 | Ono | |
| 2013/0267116 A1 | 10/2013 | Tin | |
| 2014/0333263 A1 | 11/2014 | Stewart | |
| 2015/0038006 A1 | 2/2015 | Jansen | |
| 2016/0097522 A1 | 4/2016 | Chien | |
| 2016/0291663 A1 | 10/2016 | Sun et al. | |
| 2019/0027944 A1 | 1/2019 | Grzybowski et al. | |
| 2019/0387639 A1 | 12/2019 | Jansen et al. | |
| 2021/0167623 A1* | 6/2021 | Sanghvi ................ | H02J 7/0013 |

OTHER PUBLICATIONS

International Preliminary Report on Patentability and Written Opinion of the International Searching Authority dated Mar. 23, 2021.
International Search Report and Written Opinion dated Nov. 27, 2019 issued in corresponding PCT Appln. No. PCT/US19/48739.
2012 EC&M Product of the Year Unveiled, EC&M Electrical Construction & Maintenance, Jul. 24, 2012,http://ecmweb.com/product-year/2012-ecm-product-year-unveiled.
U-Socket Installation Guide 2012.
Bryant Electric, New Dual USB Charger Duplex Receptacles from Bryant Electric, Shelton, CN, Jun. 2013, www.hubbell-bryant.com/PressReleaseDetail.aspx?Id=7, printed Mar. 11, 2015.
International Search Report and Written Opinion dated Nov. 24, 2021 issued in corresponding PCT Appln. No. PCT/US2021/018222.

* cited by examiner

Voltage control channel 1
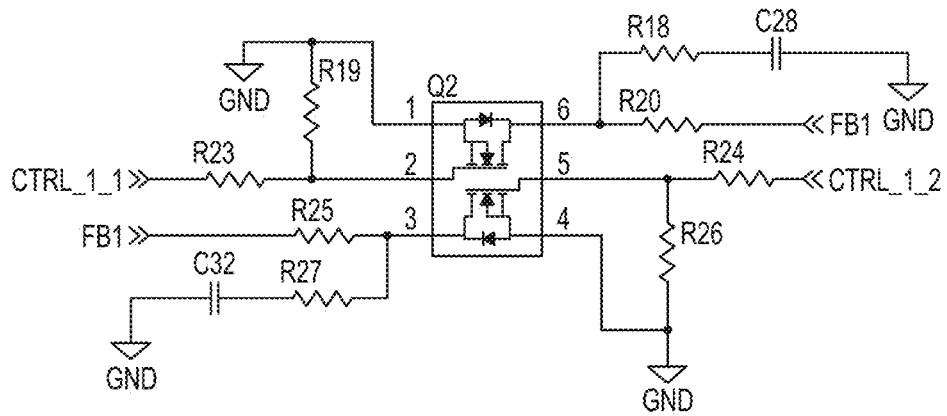
Voltage control channel 2
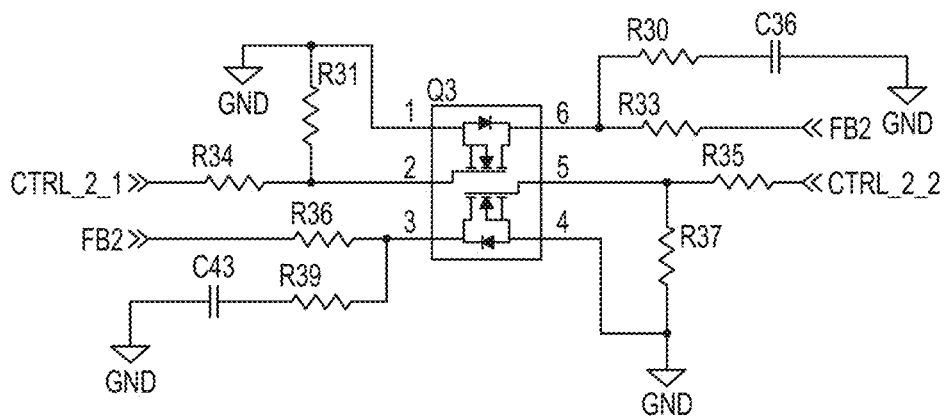
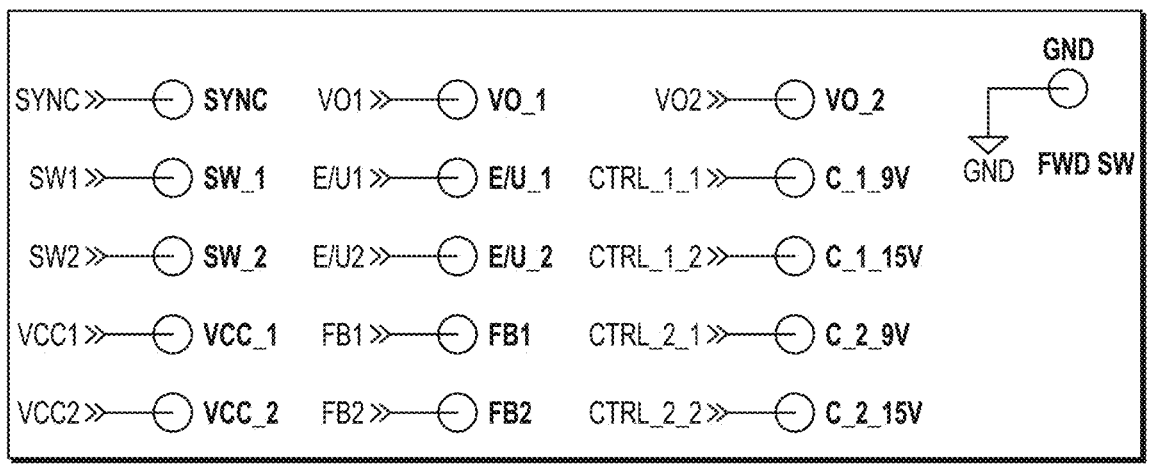
FIG. 3
(Continued)

SYSTEMS AND METHODS FOR UNIVERSAL SERIAL BUS (USB) POWER DELIVERY WITH MULTIPLE CHARGING PORTS

CROSS REFERENCE TO RELATED APPLICATION

The present application claims the benefit and priority of and priority to U.S. National Stage application Ser. No. 17/268,935, filed on Feb. 16, 2021, which is a national stage application of International Application No. PCT/US2019/048739, filed Aug. 29, 2019, the entire disclosures of which are incorporated by reference herein.

BACKGROUND

All residential and commercial buildings have wall outlets for powering AC-powered devices, such as lights, appliances, electronic devices, computers, and mobile devices. The AC-powered devices typically have a power cord with a plug configured to be connected to and removed from the wall outlet.

An outlet is a female connector with slots or holes in the wall outlet. The slots are configured to receive a male connector often referred to as a plug. The plug has protruding prongs, blades, or pins that fit into matching slots in the wall outlet. The wall outlet is enclosed by a cover typically called a wall plate, face plate, outlet cover, socket cover, or wall cover. Different countries have different national standards for wall outlets. The national standards differ by voltage rating, current rating, connector shape, connector size, and connector type.

Due to proliferation of various rechargeable consumer electronic devices, such as cell phones, laptops, tablets, personal digital assistants (PDA's), and the like, there is a need to charge and/or connect to such devices. Most of these devices are powered by low voltage. Recharging these devices may be facilitated through the use of standard interfaces, such as a Universal Serial Bus (USB).

There have been developed a number of standards and solutions for providing power via USB. USB standards define the physical and electrical specifications of USB. Examples of these standards include USB 3.1, USB Power Delivery, and their revisions. USB has several types of connectors including USB Type-A and Type-C. Such USB Connectors can be used to supply power to a device.

SUMMARY

Embodiments of the present disclosure are described in detail with reference to the drawing figures wherein like reference numerals identify similar or identical elements.

An aspect of the present disclosure features a universal serial bus (USB) charging system configured to charge connected electronic devices. The system includes a power supply including a power supply including a plurality of power converters and a plurality of power supply outputs electrically coupled to the plurality of power converters, respectively, each of the plurality of power converters configured to convert an input voltage to a plurality of different output voltages; a plurality of charging ports electrically coupled to the plurality of power supply outputs, respectively, each of the plurality of charging ports configured to connect to, and provide an output voltage selected from the plurality of different output voltages to, an electronic device; and a controller in electrical communication with the power supply and the plurality of charging ports. The controller includes one or more processors and a memory having stored thereon instructions which, when executed by the processor, cause the controller to: communicate information regarding the plurality of different output voltages to first and second electronic devices via respective first and second charging ports of the plurality of charging ports; receive, via the respective first and second charging ports, information regarding first and second output voltages selected from the plurality of different output voltages by the respective first and second electronic devices; and control the power supply to provide the selected first output voltage to the first electronic device and to provide the selected second output voltage to the second electronic device.

In another aspect of the present disclosure, the USB charging system further includes a first power delivery (PD) integrated circuit and a second PD integrated circuit, the first and second PD integrated circuits in electrical communication with the controller and configured to selectively disable transmission of electrical energy to corresponding charging ports.

In an aspect of the present disclosure, the controller communicates a first set of output voltages to the first electronic device and communicates a second set of output voltages to the second electronic device, wherein the first set is different from the second set.

In another aspect of the present disclosure, the instructions, when executed by the one or more processors, further cause the controller to determine the first and second sets of output voltages based on at least one parameter associated with the first and second electronic devices, respectively.

In yet another aspect of the present disclosure, the at least one parameter is at least one of the current being drawn by each of the first and second electronic devices, the charge levels of each of the first and second electronic devices, the period over which each of the first and second electronic devices have been charged by the USB charging system, and the priority level of each of the first and second electronic devices.

In a further aspect of the present disclosure, the charging ports are USB Type-C charging ports.

In yet a further aspect of the present disclosure, the priority level is determined based on the order in which the first and second electronic devices are connected to the USB charging system.

In an aspect of the present disclosure, the system further includes a current sense resister coupled to each of the first and second charging ports. The instructions, when executed by the one or more processors, cause the controller to measure voltage across each of the current sense resistors and determine a charge level of each of the first and second electronic devices based on the measured voltages.

In another aspect of the present disclosure, the controller determines a first set of output voltages that includes an output voltage greater than the output voltages in the second set of output voltages, if the first electronic device has the lower charge level than the second electronic device. In yet another aspect of the present disclosure, the first and second sets of output voltages are determined based on total power that can be provided by the USB charging system.

Yet another aspect of the present disclosure presents a method for charging electronic devices. The method includes communicating information regarding different output voltages to first and second electronic devices via first and second charging ports, respectively, receiving, via the respective first and second charging ports, information regarding first and second output voltages selected by the respective first and second electronic devices from the different output voltages, converting an input voltage to the selected first and second output voltages, and providing the selected first output voltage to the first electronic device and providing the selected second output voltage to the second electronic device.

In an aspect of the present disclosure, a first set of output voltages is communicated to the first electronic device and a second set of output voltages is communicated to the second electronic device, wherein the first set is different from the second set.

In another aspect of the present disclosure, the method includes determining the first and second sets of output voltages based on at least one parameter associated with each of the first and second electronic devices, respectively.

In yet another aspect of the present disclosure, the at least one parameter is at least one of the current being drawn by each of the first and second electronic devices, the charge levels of each of the first and second electronic devices, the period over which each of the first and second electronic devices have been charged, and the priority level of each of the first and second electronic devices.

In a further aspect of the present disclosure, the method includes determining the priority level based on the order in which the first and second electronic devices are connected to the USB charging system.

In yet a further aspect of the present disclosure, the method includes measuring a first current supplied to the first electronic device, determining a first charge level based on the first current, measuring a second current supplied to the second electronic device, and determining a second charge level based on the second current.

In another aspect of the present disclosure, the method includes determining whether the first electronic device has a lower charge level than the second electronic device, wherein the first and second sets of output voltages are determined so that the first set of output voltages includes an output voltage greater than the output voltages in the second set of output voltages, if it is determined that the first electronic device has a lower charge level than the second electronic device. In yet another aspect of the present disclosure, the first and second sets of output voltages are determined based on total power that can be provided by the USB charging system.

According to an aspect of the present disclosure, a universal serial bus (USB) charging system includes a power supply including a plurality of power converters and a plurality of power supply outputs electrically coupled to the plurality of power converters, respectively. Each of the plurality of power converters is configured to convert an input voltage to a plurality of output voltages. A plurality of charging ports are electrically connected with the plurality of power supply outputs, respectively. Each of the plurality of charging ports is configured to provide an output voltage selected from the plurality of output voltages to an electronic device. A logic circuit is in electrical communication with the power supply and the plurality of charging ports. The logic circuit is configured to provide direct feedback to the power supply to output a particular output voltage of the plurality of output voltages to the plurality of charging ports.

According to an aspect of the present disclosure, a first power converter of the plurality of power converters simultaneously outputs a first output voltage different from a second output voltage output by a second power converter of the plurality of power converters.

According to an aspect of the present disclosure, each respective electronic device connected with each respective charging port of the plurality of charging ports may receive a same output voltage.

According to an aspect of the present disclosure, each of the plurality of charging ports may be a USB Type-C charging port.

According to an aspect of the present disclosure, voltages of the plurality of output voltages may range from substantially 5 volts to substantially 20 volts.

According to an aspect of the present disclosure, the logic circuit may include a first power delivery (PD) controller integrated circuit (IC) and a second PD controller IC. The first PD controller IC may be electrically connected with a first charging port of the plurality of charging ports. The second PD controller IC may be electrically connected with a second charging port of the plurality of charging ports.

According to an aspect of the present disclosure, the first PD controller IC may be in electrical communication with the second PD controller IC.

According to an aspect of the present disclosure, the USB charging system may include a thermistor electrically connected with at least one PD controller IC. The thermistor may be configured to reduce power delivery to the at least one charging port of the plurality of charging ports in response to a temperature exceeding a first predetermined threshold. The reduced power delivery to the at least one charging port of the plurality of charging ports may be maintained at an above-zero level until a temperature of the charging port is reduced below a second predetermined threshold.

According to an aspect of the present disclosure, each of the plurality of power converters may be an AC to DC power converter or a DC to DC power converter.

According to an aspect of the present disclosure, a method for charging a plurality of electronic devices using a USB charging system includes providing AC power from a power source to an AC/DC converter. The method includes receiving, at the AC/DC converter, the AC power from the power source. The AC/DC converter includes a plurality of power converters and a plurality of power supply outputs electrically coupled to the plurality of power converters, respectively. Each of the plurality of power converters is configured to convert the AC power to a plurality of different DC output voltages. The method includes receiving, at the AC/DC converter, direct feedback from a logic circuit in direct electrical communication with the AC/DC converter, and outputting a particular DC output voltage from the AC/DC converter in response to the direct feedback received. The logic circuit is in electrical communication with a plurality of charging ports. The method includes delivering the particular DC output voltage to each of the plurality of electronic devices respectively connected with each of the plurality of charging ports.

According to an aspect of the present disclosure, a first power converter of the plurality of power converters simultaneously outputs a first output voltage different from a second output voltage output by a second power converter of the plurality of power converters.

According to an aspect of the present disclosure, each respective electronic device connected with each respective charging port of the plurality of charging ports may receive a same output voltage.

According to an aspect of the present disclosure, each of the plurality of charging ports may be a USB Type-C charging port.

According to an aspect of the present disclosure, the plurality of output voltages may range from substantially 5 volts to substantially 20 volts.

According to an aspect of the present disclosure, the logic circuit may include a first power delivery (PD) controller integrated circuit (IC) and a second PD controller IC, the first PD controller IC electrically connected with a first charging port of the plurality of charging ports and the second PD controller IC electrically connected with a second charging port of the plurality of charging ports. The first PD controller IC may be electrically connected with the second PD controller IC.

According to an aspect of the present disclosure, a thermistor may be electrically connected with at least one PD controller IC. The thermistor may be configured to reduce power delivery to the at least one charging port of the plurality of charging ports in response to a temperature exceeding a first predetermined threshold. The reduced power delivery to the at least one charging port of the plurality of charging ports is maintained at an above-zero level until a temperature of the charging port is reduced below a second predetermined threshold.

According to an aspect of the present disclosure, a firmware-upgradable USB receptacle includes a USB receptacle having a logic circuit including at least one power delivery (PD) controller integrated circuit (IC). The logic circuit has a first memory storing firmware configured to control the logic circuit. At least one USB charging port is in communication with the logic circuit. The firmware stored on the first memory of the logic circuit is modified by communicably coupling a device to the at least one USB charging port. The device has a processor and a second memory storing computer instructions configured to modify the firmware stored on the first memory of the logic circuit. The firmware stored on the first memory of the logic circuit is modified by transmitting computer instructions from the device to the logic circuit.

According to an aspect of the present disclosure, the device may be a Smartphone, a USB drive, a Tablet, or a computer. The Smartphone, USB drive, tablet or computer may have a firmware update application thereon. The firmware update application is configured to modify the firmware stored on the first memory of the logic circuit.

According to an aspect of the present disclosure, the at least one USB charging port may be a USB Type-C charging port.

According to an aspect of the present disclosure, the device may be communicably coupled to the at least one USB charging port through a USB cable. The USB cable may be a USB Type-C cable.

According to an aspect of the present disclosure, a system for wirelessly modifying firmware includes a USB receptacle having a logic circuit including at least one power delivery (PD) controller integrated circuit (IC). The logic circuit has a first memory storing firmware configured to control the logic circuit. The logic circuit has a first wireless antenna. The firmware stored on the first memory of the logic circuit is modified by communicably coupling a device to the logic circuit through a wireless connection. The device has a second wireless antenna configured to communicate with the first wireless antenna of the logic circuit. The device has a processor and a second memory storing computer instructions configured to modify the firmware stored on the first memory of the logic circuit. The firmware stored on the first memory of the logic circuit is modified by wirelessly transmitting computer instructions from the device to the logic circuit.

According to an aspect of the present disclosure, the first wireless antenna of the logic circuit may communicate with the second wireless antenna of the device through a Bluetooth or WiFi signal.

According to an aspect of the present disclosure, the device may be a Smartphone, a USB drive, a Tablet, or a computer. The device may have a firmware update application thereon. The firmware update application is configured to modify the firmware stored on the first memory of the logic circuit.

According to an aspect of the present disclosure, a USB charging system includes an AC-DC power supply configured to output a plurality of output voltages. A USB Type-A charging port is in electrical communication with the AC-DC power supply. The USB Type-A charging port is configured to provide a first output voltage to a first electronic device. A USB Type-C charging port is in electrical communication with the AC-DC power supply. The USB Type-C charging port is configured to provide a second output voltage to a second electronic device. The first and second output voltages differ from each other. A voltage regulator is in electrical communication with the AC-DC power supply and the USB Type-A charging port. The voltage regulator is configured to maintain the first output voltage provided by the USB Type-A charging port. A switch is in electrical communication with the AC-DC power supply and the USB Type-A charging port. The switch is configured to bypass the voltage regulator. A logic circuit is in electrical communication with the voltage regulator and the switch. The logic circuit is configured to enable or disable the voltage regulator by opening or closing the switch.

According to an aspect of the present disclosure, each respective electronic device connected with each respective charging port may receive a different output voltage.

According to an aspect of the present disclosure, the first output voltage may be a fixed output voltage, and the second output voltage may be a variable output voltage.

According to an aspect of the present disclosure, voltages of the plurality of output voltages may range from substantially 5 volts to substantially 20 volts.

According to an aspect of the present disclosure, the voltage regulator may be a linear voltage regulator or a DC-DC converter.

According to an aspect of the present disclosure, a USB charging system includes an AC-DC power supply configured to output a plurality of output voltages. A first USB Type-C charging port is in electrical communication with the AC-DC power supply. The first USB Type-C charging port is configured to provide a first output voltage to a first electronic device. A second USB Type-C charging port is in electrical communication with the AC-DC power supply. The second USB Type-C charging port is configured to provide a second output voltage to a second electronic device. The first and second output voltages differ from one another. A voltage regulator is in electrical communication with the AC-DC power supply and the first or second USB Type-C charging ports. The voltage regulator is configured to regulate the first or second output voltages of the first or second USB Type-C charging ports. A first switch is in electrical communication with the AC-DC power supply and the first USB Type-C charging port. The first switch is configured to bypass the voltage regulator. A second switch is electrically connected with the AC-DC power supply and the second USB Type-C charging port. The second switch is configured to bypass the voltage regulator. A logic circuit is in electrical communication with the voltage regulator and the first and second switches. The logic circuit is configured to enable or disable the voltage regulator by opening or closing the first or second switches.

According to an aspect of the present disclosure, a third switch may be in electrical communication with the AC-DC power supply and the first USB Type-C charging port. The third switch may be configured to activate the voltage regulator. A fourth switch may be in electrical communication with the AC-DC power supply and the second USB Type-C charging port. The fourth switch may be configured to activate the voltage regulator.

According to an aspect of the present disclosure, each of the first, second, third and fourth switches may be configured to be individually enabled or disabled by the logic circuit.

According to an aspect of the present disclosure, each respective electronic device connected with each respective charging port may receive a different output voltage.

According to an aspect of the present disclosure, each respective electronic device connected with each respective charging port may receive a different output voltage.

According to an aspect of the present disclosure, voltages of the plurality of output voltages may range from substantially 5 volts to substantially 20 volts.

According to an aspect of the present disclosure, the voltage regulator may be a linear voltage regulator or a DC-DC converter.

According to an aspect of the present disclosure, the logic circuit is configured to regulate a wattage delivered to two or more charging ports of the plurality of charging ports. The logic circuit is configured to detect a temperature of two or more charging ports of the plurality of charging ports. The logic circuit is configured to reduce a wattage delivered to a particular charging port of the plurality of charging ports if a temperature detected in the particular charging port of the plurality of charging ports exceeds a predetermined threshold.

According to an aspect of the present disclosure, a maximum wattage deliverable to each charging port of the plurality of charging ports is from about 1 watt to about 100 watts.

According to an aspect of the present disclosure, the plurality of charging ports includes a USB Type-A port, a USB Type-C port, or a Line-Voltage port.

According to an aspect of the present disclosure, a thermistor is configured to collect temperature data for the USB charging system and communicate the temperature data to the logic circuit.

According to an aspect of the present disclosure, the logic circuit is configured to detect a current drawn by two or more charging ports of the plurality of charging ports (e.g., a current drawn by line voltage ports). The logic circuit is configured to reduce a current drawn by a particular charging port of the plurality of charging ports if a temperature detected in the particular charging port of the plurality of charging ports exceeds a predetermined threshold. and/or if a current drawn by a particular line voltage port exceeds a predetermined threshold According to an aspect of the present disclosure, a thermally conductive housing is in thermal contact with the power supply, the plurality of charging ports and the logic circuit. The thermally conductive housing is configured to transfer heat away from at least one of the power supply, the charging ports of the plurality of charging ports, or the logic circuit to reduce a temperature of the USB charging system.

According to an aspect of the present disclosure, the thermally conductive housing includes a metal, such as Aluminum.

According to an aspect of the present disclosure, the logic circuit is configured to monitor a state of charge of a device connected with each charging port of the plurality of charging ports. The logic circuit is configured to regulate a wattage delivered to the device connected with each charging port of the plurality of charging ports. The logic circuit is configured to reduce a wattage delivered to a first charging port of the plurality of charging ports when a state of charge of a first device connected with the first charging port of the plurality of charging ports exceeds a predetermined threshold. The logic circuit is configured to increase a wattage delivered to a second device connected with a second charging port of the plurality of charging ports when the state of the charge of the first device exceeds the predetermined threshold.

According to an aspect of the present disclosure, a maximum combined wattage deliverable to the first and second charging ports may be about 60 watts. The maximum combined wattage deliverable to the first and second charging ports may also be above or below 60 watts.

According to an aspect of the present disclosure, the reduced wattage delivered to the first device connected with the first charging port of the plurality of charging ports is maintained at an above-zero level, by the logic circuit, when the state of charge of the first device is below a maximum state of charge for the first device.

According to an aspect of the present disclosure, the reduced wattage delivered to the first device connected with the first charging port of the plurality of charging ports is maintained at 0 watts, by the logic circuit, when the state of charge of the first device reaches a maximum state of charge for the first device.

According to an aspect of the present disclosure, when the state of charge of the first device reaches the maximum state of charge for the first device, the increased wattage delivered to the second device is maintained at up to about 60 watts by the logic circuit. The increased wattage may also be above or below 60 watts.

According to an aspect of the present disclosure, a first current sensor is connected with the first charging port. A second current sensor is connected with the second charging port. The first current sensor communicates data of a first load current in the first current sensor to the logic circuit. The second current sensor communicates data of a second load current in the second current sensor to the logic circuit.

According to an aspect of the present disclosure, the logic circuit is configured to receive the data of the first load current and the second load current, and adjust the wattage delivered to the device connected with each charging port of the plurality of charging ports in real-time.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the present invention may be more readily understood by one skilled in the art with reference being had to the following detailed description of several embodiments thereof, taken in conjunction with the accompanying drawings wherein like elements are designated by identical reference numerals throughout the several views, and in which:

Figure 1:
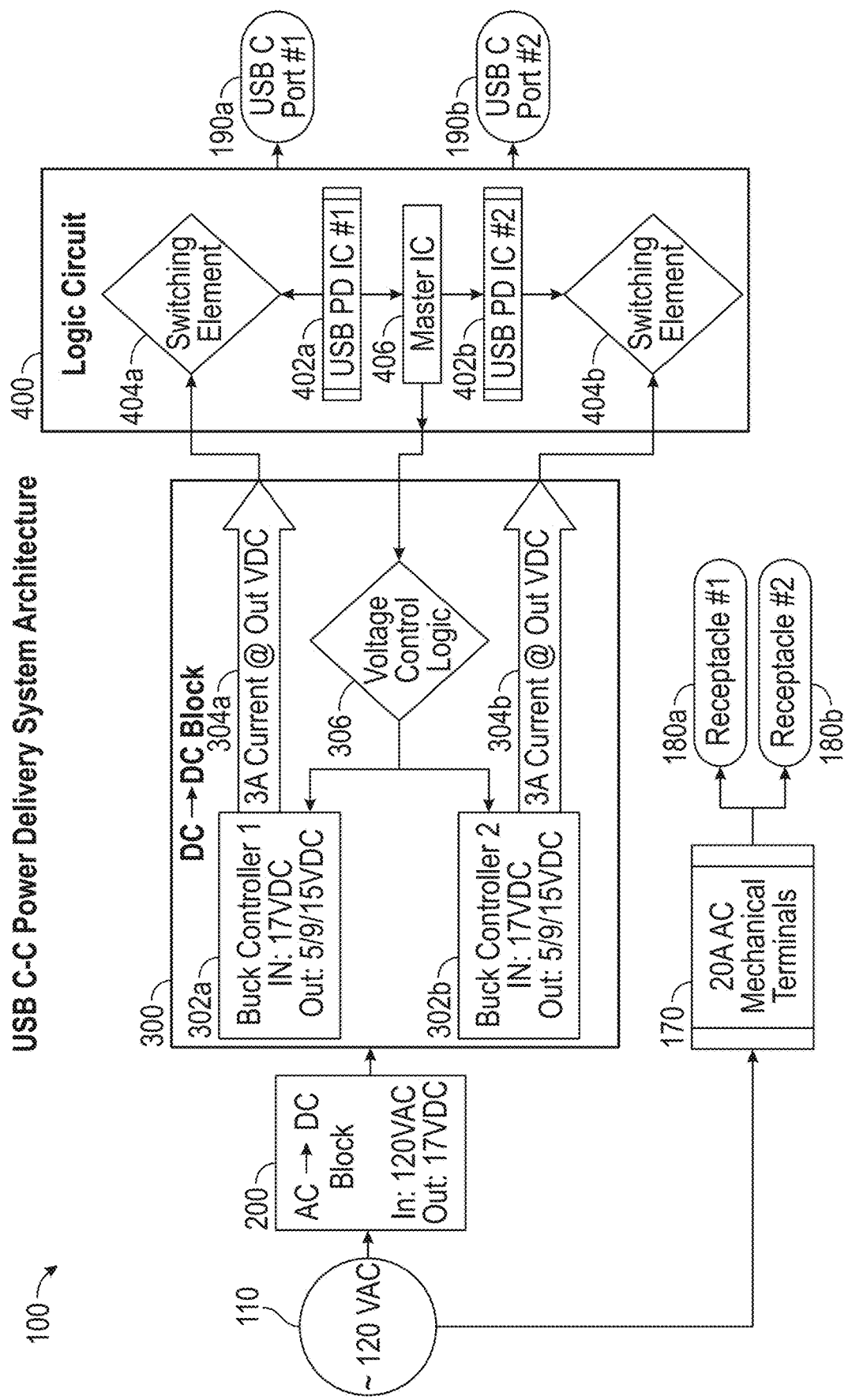
FIG. 1 depicts a block diagram of a USB power delivery system architecture in accordance with an exemplary embodiment of the disclosure.

The figures depict embodiments of the present disclosure for purposes of illustration only. One skilled in the art will readily recognize from the following description that alternative embodiments of the structures and methods illustrated herein may be employed without departing from the principles of the present disclosure described herein.

DETAILED DESCRIPTION

The present disclosure is directed to systems and methods for implementing USB power delivery mechanisms with multiple charging ports. Embodiments of the present disclosure are described herein below with reference to the accompanying drawings. However, it is to be understood that the disclosed embodiments are merely exemplary of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

"About" or "approximately" or "substantially" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" or "substantially" may mean within one or more standard variations, or within ±30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

Line voltage refers to a voltage, typically Alternating Current (AC), that is supplied to buildings/residences (e.g., electric light and power), for example, 110 V AC, 115 V AC, 120 V AC, 125 V AC, 208 V AC, 220 V AC, 230 V AC, 240 V AC, single or multiphase. Line voltage is typically made available to the end user standard plug/outlet configurations standardized by the National Electrical Manufacturers' Association (NEMA) configurations. One such standardized configuration is a NEMA 5-15 configuration which denotes a nominal 125 V AC/15 Amp outlet.

Low voltage refers to a voltage which is less than a certain threshold (50 Volts for example, AC or DC). This reduced voltage is typically used for communication, signaling, data/multimedia transmission, low voltage charging, and the like. For the purposes of this application, the term low voltage also includes optical transmission (although no electrical voltage is actually transmitted by optical transmission).

Low voltage ports denote any suitable type of low voltage ports, such as, but not limited, to Universal Serial Bus (USB), Audio/Video/Multimedia ports, Digital Visual Interface (DVI), Ethernet/data ports, High Definition Multimedia Interface (HDMI), IEEE 1394 (FireWire), Separate Video (S-Video), Video Graphics Array (VGA), Telephone, and the like, or any suitable combination thereof. For the purposes of this application, low voltage ports can also include fiber optic ports (although no electrical voltage is actually transmitted by fiber optic ports). USB ports can further be broken out into various form factors such as Type A, Type B, Type C, Mini-A, Mini-B, Micro-A, Micro-B, or any other suitable form.

The USB power delivery systems and methods of the present disclosure can provide power delivery charging capabilities to multiple ports. The total power is shared when multiple devices are connected. It is contemplated that the USB power delivery systems and methods of the present disclosure can have single or multiple ports by simply adding DC/DC sections and control logic. Most existing USB Type-C chargers are single port or dual port with no power distribution functionality. The USB Type-C power delivery systems and methods of the present disclosure can provide full or partial power delivery voltages depending on the status of the devices connected to the USB power delivery systems.

FIG. 1 depicts a USB power delivery system architecture 100 in accordance with the present disclosure. In an embodiment, the alternating current (AC) power source 110 supplies AC power to an AC/DC converter 200. It is contemplated that the AC power source 110 can be any AC power source such as from a residential or commercial electrical system, from a solar power supply's inverter, an AC generator, or any other suitable power supply source. The AC/DC converter 200 converts the AC voltage supplied by the power supply, for example 120 V AC, to a lower level DC voltage, for example, 17 V DC.

Next, the DC voltage generated at the AC/DC converter 200 is processed by a DC/DC converter block 300. The DC/DC converter block 300 may step down the DC voltage. The DC/DC converter block 300 may include, for example, a number of buck converters 302a, 302b as well as voltage control logic 306. It is contemplated that other types of DC/DC converters may be used such as, for example, linear regulators.

In an aspect of the present disclosure, the outputs 304a, 304b of the DC/DC converter block 300 supply power to a logic circuit 400 that includes switching elements 404a, 404b, USB power distribution (PD) integrated circuits (IC) 402a, 402b, and a master controller IC 406. The master controller IC 406 decides how much power to supply through the USB power delivery controller ICs 402a, 402b, to either of the two USB Type-C power distribution connectors 190a, 190b.

The USB power delivery system 100 advertises or publishes available voltage levels to devices connected to the connectors 190a, 190b, which, in turn, reply with requested voltage levels. The available voltage levels may be determined based on the charge levels of one or more devices connected to either or both of the USB Type-C power distribution connectors 190a, 190b and the output power capacity of the USB power delivery system 100. The USB power delivery system 100 then outputs voltages to either or both of the USB Type-C power distribution connectors 190a, 190b based on the voltage levels requested by the connected one or more devices.

The first USB power delivery controller IC 402a, and the second USB power delivery controller IC 402b, are electrically coupled to the master controller IC 406 and configured to selectively disable transmission of electrical energy to corresponding connectors 190a, 190b. This includes disabling transmission of electrical energy to a connector 190a, 190b when a corresponding electronic device connected to a connector 190a, 190b is fully charged or when an overcurrent condition is detected.

The master controller IC 406 communicates with the voltage control logic 306 to control the DC/DC buck boost converters 302a, 302b. Ultimately, the two or more USB Type-C connectors 190s, 190b are supplied power from the logic circuit 400 for supplying power to devices connected to these USB Type-C connectors 190s, 190b. It is contemplated that devices can be electric and/or electronic. In an embodiment, mechanical terminals 170 and receptacles 180a, 180b may operate off of the same power supply 110. It is contemplated that these receptacles 180a, 180b may be used to supply AC power to a variety of items, for example, lights, TVs, radio, etc.

Figure 2:
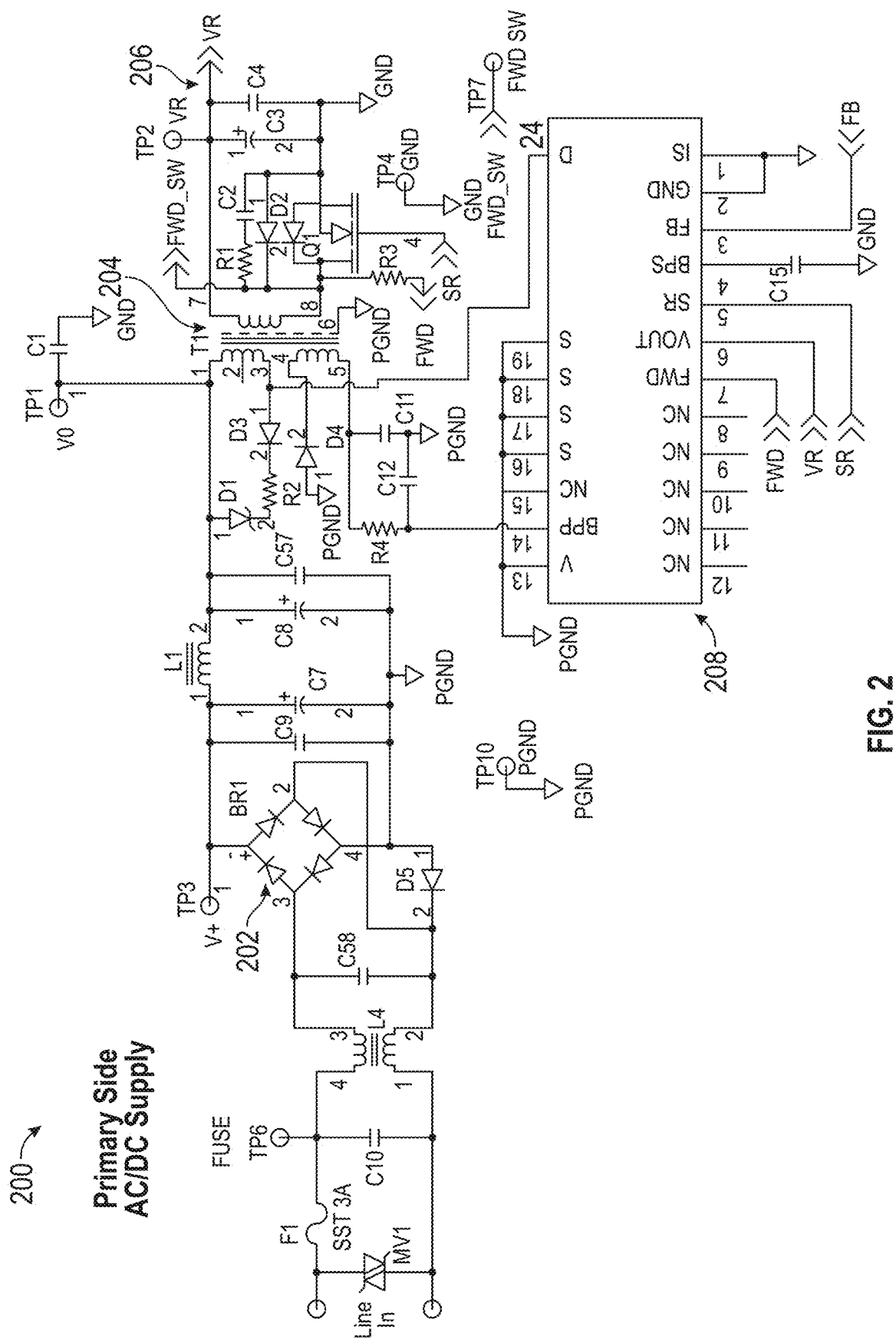
FIG. 2 depicts a schematic diagram of an example embodiment of the AC/DC converter of FIG. 1.

FIG. 2 depicts a schematic of an AC/DC converter 200 in accordance with the present disclosure. The AC/DC converter 200 typically takes an input from an AC power source 110 and processes it through the bridge rectifier 202. Bridge rectifier 202 converts AC to DC voltage by providing full wave rectification from a two-wire AC input. The polarity of the output is the same regardless of the polarity of the input. The DC signal created by the bridge rectifier 202 may have some amount of ripple on it, which is filtered out by filtering capacitors and inductors coupled to the output terminals of the bridge rectifier 202. The DC voltage is then stepped down with a transformer 204 and further filtered by a filter 206. A flyback converter 208 may be used to regulate the DC voltage.

Figure 3:
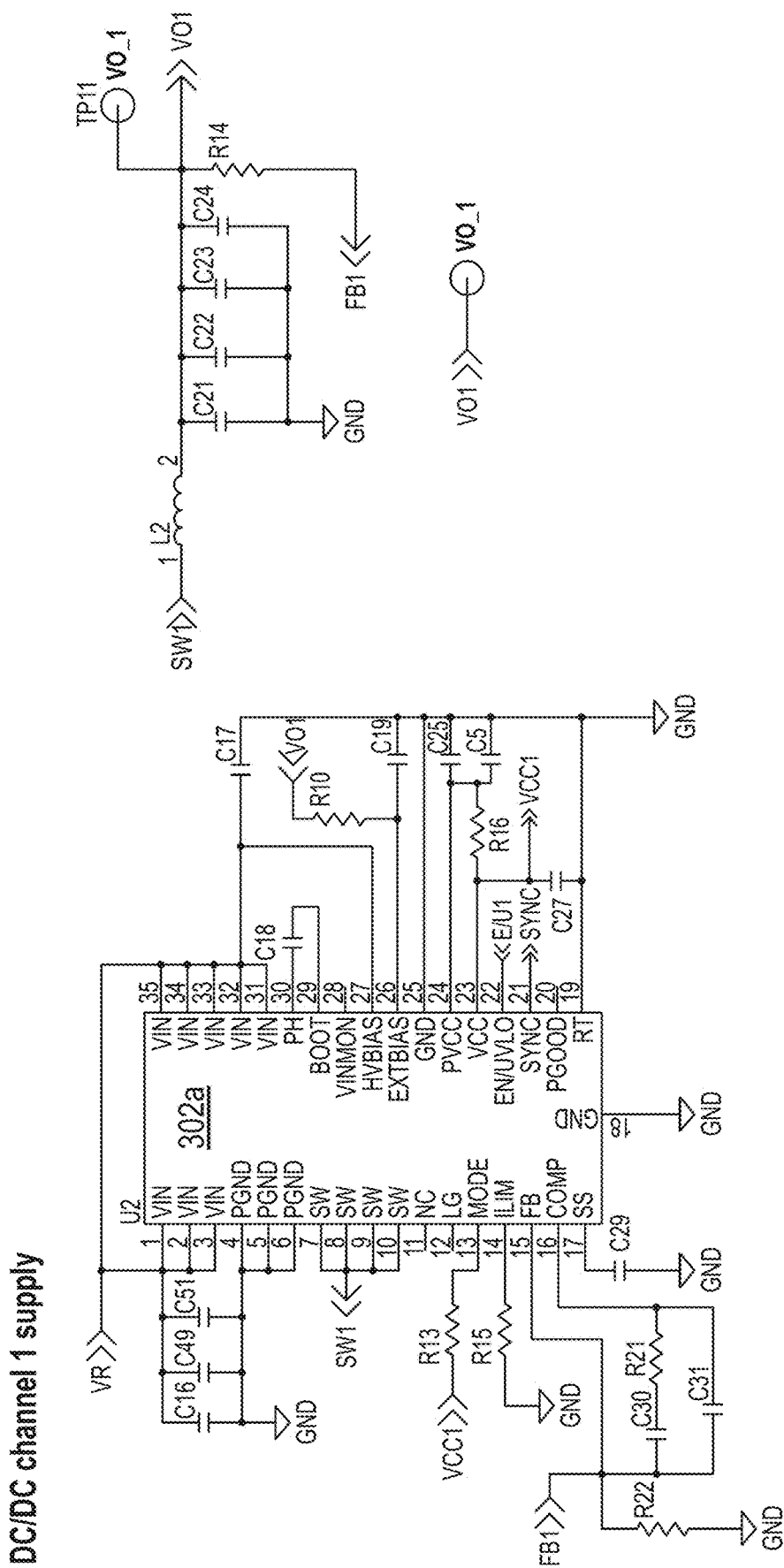
FIG. 3 depicts a schematic diagram of an example embodiment of a pair of DC/DC buck converters of FIG. 1.
Figure 3:
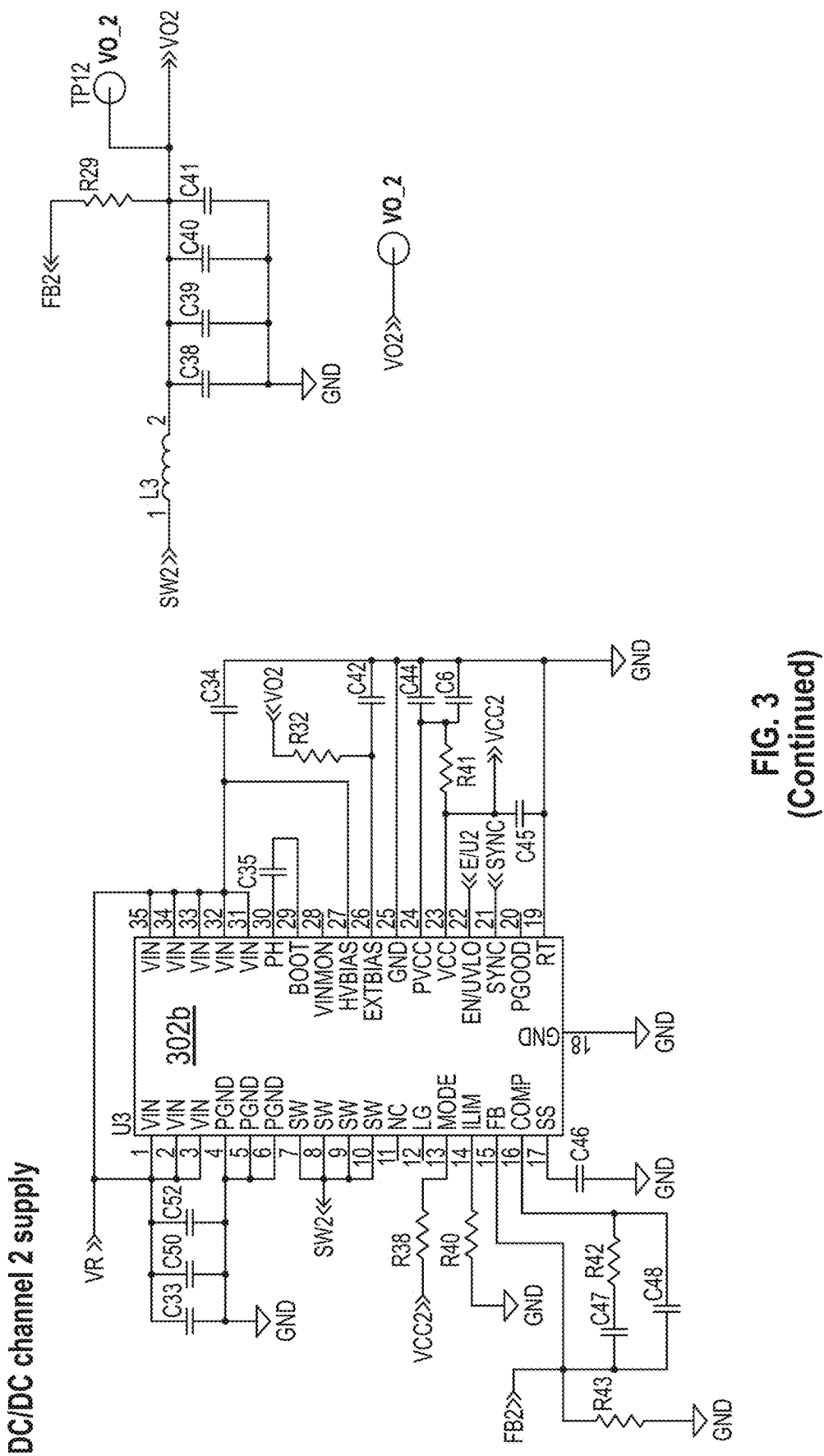

FIG. 3 depicts a schematic of a pair of DC/DC buck-boost converters 302a, 302b, in accordance with the present disclosure. The regulated voltage produced by the AC/DC converter 200 is further processed by a pair of buck-boost converters. A DC/DC buck-boost converter 302a, 302b is a type of DC/DC converter that can have an output voltage magnitude that is either greater than or less than the input voltage magnitude. Typically, DC/DC buck-boost converters 302a, 302b utilize an internal PWM controller to support a wide range of output voltages, for example, 3.3 V to 65 V.

Figure 4:
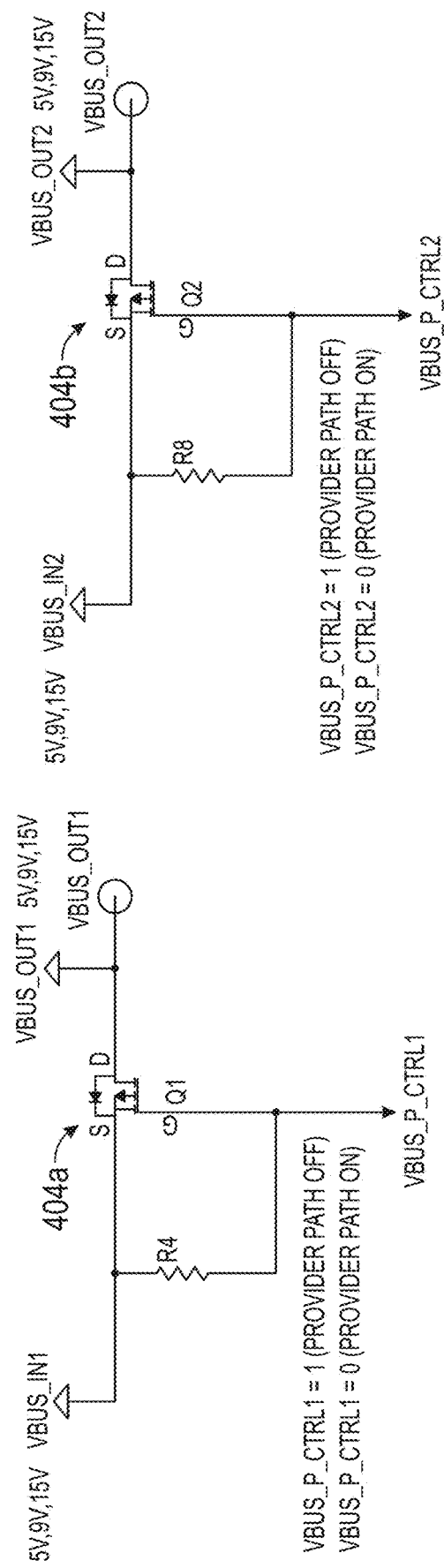
FIG. 4 depicts a schematic diagram of an example embodiment of a pair of switching elements of FIG. 1.
Figure 5A:
FIG. 5A depicts a schematic diagram of an example embodiment of a pair of USB power delivery controller integrated circuits of FIG. 1.
Figure 5B:
FIG. 5B depicts a schematic diagram of an example embodiment of a pair of USB power delivery controller integrated circuits of FIG. 1.

FIGS. 4, 5A, and 5B depict a schematic of a pair of switching elements 404a, 404b, and a pair of USB power delivery controller ICs 402a, 402b, in accordance with the present disclosure. The voltage VBUS (for example, 5, 9, or 15 V DC) from the DC/DC buck-boost converters 302a, 302b is provided to the switching element 404a, 404b, which are controlled by the USB power delivery controller ICs 402a, 402b by outputting a gate control current. The USB power delivery controller ICs 402a, 402b, may include a current sense amplifier, a high voltage regulator, overvoltage protection, overcurrent protection, and supply switch blocks. The USB power delivery controller ICs 402a, 402b also may provide Electro-static discharge (ESD) protection to the USB Type-C power distribution connectors 190a, 190b.

The USB power delivery controller ICs 402a, 402b can operate in accordance with BC 1.2, Apple®, Qualcomm's® quick charge 4.0, and Samsung® AFC. In one embodiment, the USB power delivery controller ICs 402a, 402b, can supply full power delivery charging capability to multiple ports. When multiple devices are connected to the USB power delivery system 100, the total power that can be output from the USB power delivery system 100 can be shared between those devices. Thus, full or partial power delivery voltages can be provided to the devices. It is contemplated that there are multiple USB Type-C power distribution connectors 190a, 190b, that can share power delivery according to an appropriate ratio (e.g., based on a charge level of the devices connected to the connectors 190a, 190b) or supply one of the connectors 190a, 190b full power delivery. It is contemplated that other types of connectors, including other types of USB connectors may be used.

Figure 6:
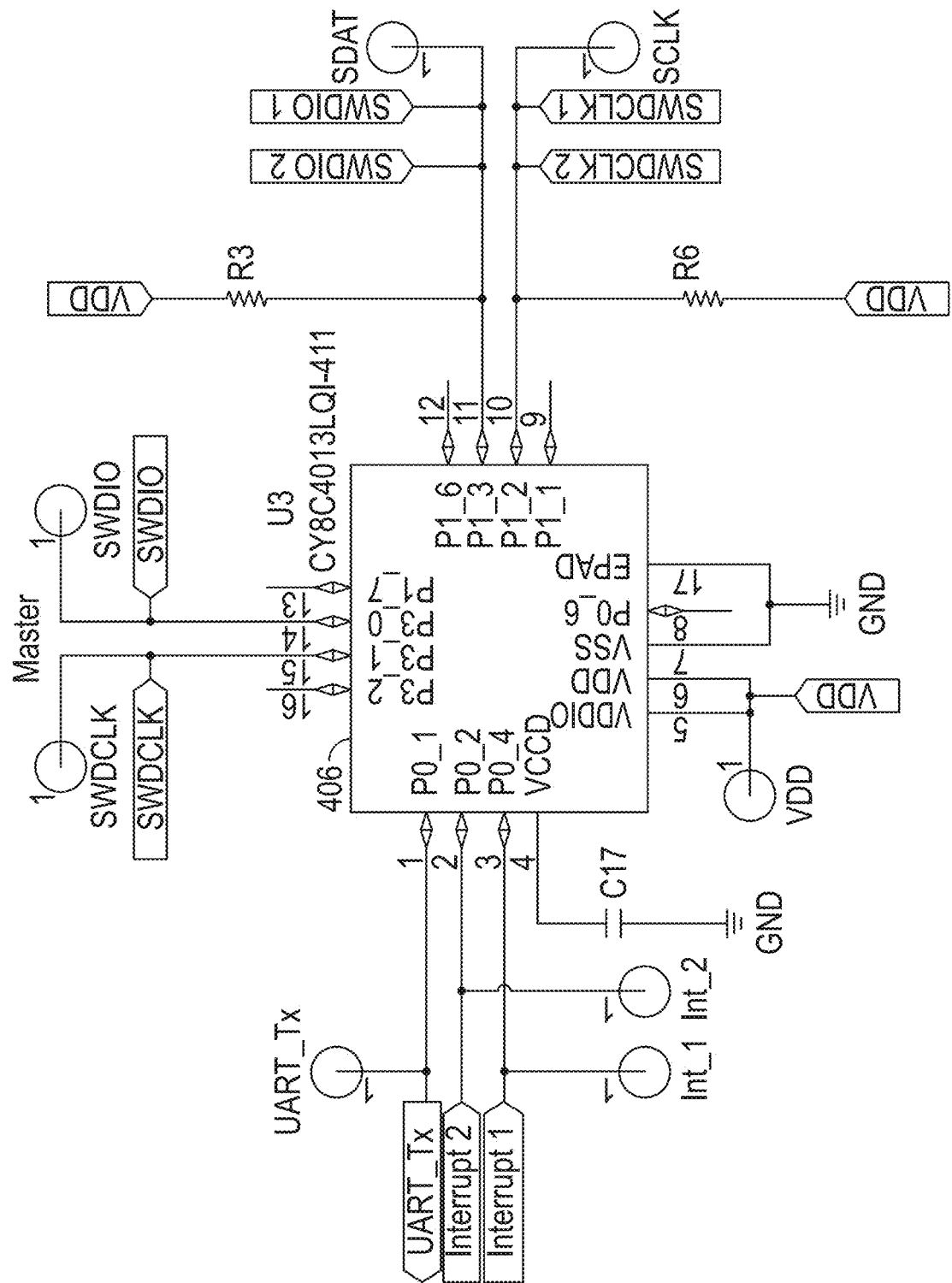
FIG. 6 depicts a schematic diagram of an example embodiment of a master controller of FIG. 1.

FIG. 6 depicts a schematic of a master controller IC 406 in accordance with the present disclosure. The master controller IC 406 determines the charging voltage levels that can be supplied to one or more electronic devices connected to one or more of the connectors 190a, 190b without exceeding the output power capacity of the USB power delivery system, and transmits the charging voltage levels to the one or more electronic devices. When the master controller IC 406 receives the charging voltage levels selected by the one or more electronic devices, the master controller IC 406 communicates with the voltage control logic 306 of FIG. 1 to cause the voltage control logic 306 to adjust the output voltages of the pair of DC/DC buck boost converters 302a, 302b based on the charging voltage levels selected by the one or more electronic devices.

In one embodiment, the master controller IC 406 can re-determine the voltage levels for charging the first device and/or the second device based on further communications with the first device and/or the second device; and output a first voltage at an updated first voltage level and/or a second voltage at an updated second voltage level. In another embodiment, the master controller IC 406 communicates to the first and/or second devices the charging voltage levels available through its respective low voltage port connections. The device charging voltage for each device is determined by the master controller IC 406 as a function of an available charging power and the voltage level for charging the first device and/or the second device. The USB power delivery controller ICs 402a, 402b handle all USB C protocols and performs functions such as overcurrent protection.

In one embodiment, the master controller IC 406 can cause the USB power delivery system 100 to determine a priority of the first and second devices including determining which of the first device or the second device is first connected to a charging system. In another embodiment, the master controller IC 406 causes the USB power delivery system 100 to determine the priority of the first and second devices including measuring, estimating, or deducing the charge level of the first device and the second device. The charging according to the priority includes charging the device having the lower charge level with a higher voltage level than the device having the higher charge level. As used herein, charge level refers to the level at which a rechargeable battery is charged relative to full charge. It may also be referred to as state of charge.

In one embodiment, a first device, when connected to the first USB Type-C power distribution connector 190a, may request two thirds of the power capacity of the USB power delivery system 100, and a second device, when connected to the second USB Type-C connector 190b, may also request two thirds of the power capacity of the USB power delivery system 100. The master controller IC 406 may determine that the first device has priority and deliver the two thirds of the available power to the first device, and only one third of the available power to the second device.

In another embodiment, a first device, when connected to the first USB Type-C power distribution connector 190a, may request two thirds of the available power, and a second device, when connected to the second USB Type-C connector 190b, may also request two thirds of the available power. The master controller IC 406 may determine that both devices should share power equally and deliver half of the available power to the first device and the other half of the available power to the second device. It is contemplated that any division of power between the two USB Type-C power distribution connectors 190a, 190b may be determined by the master controller IC 406.

Figure 7:
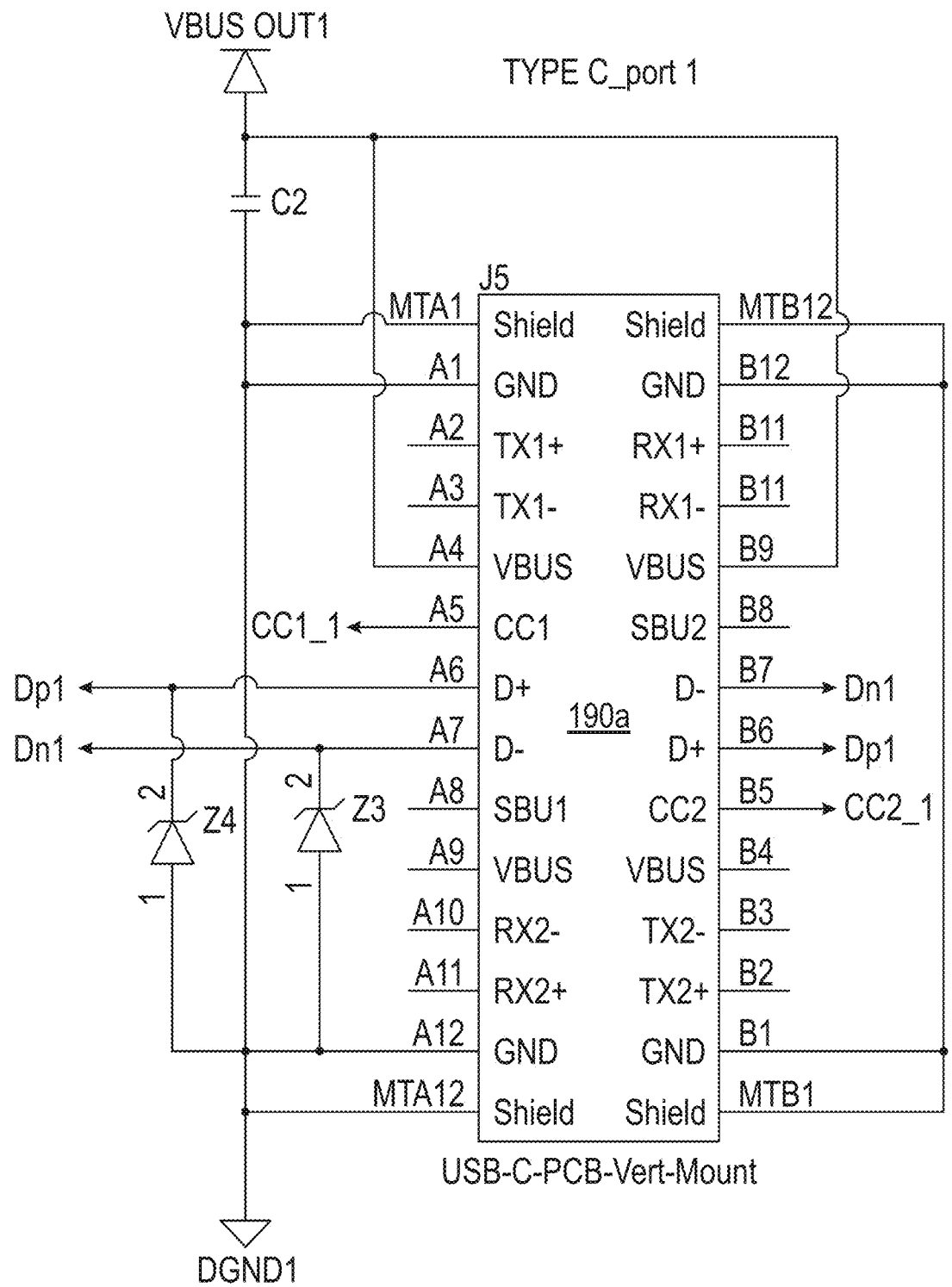
FIG. 7 depicts a schematic diagram of an example embodiment of USB Type-C power distribution connectors of FIG. 1.
Figure 7:
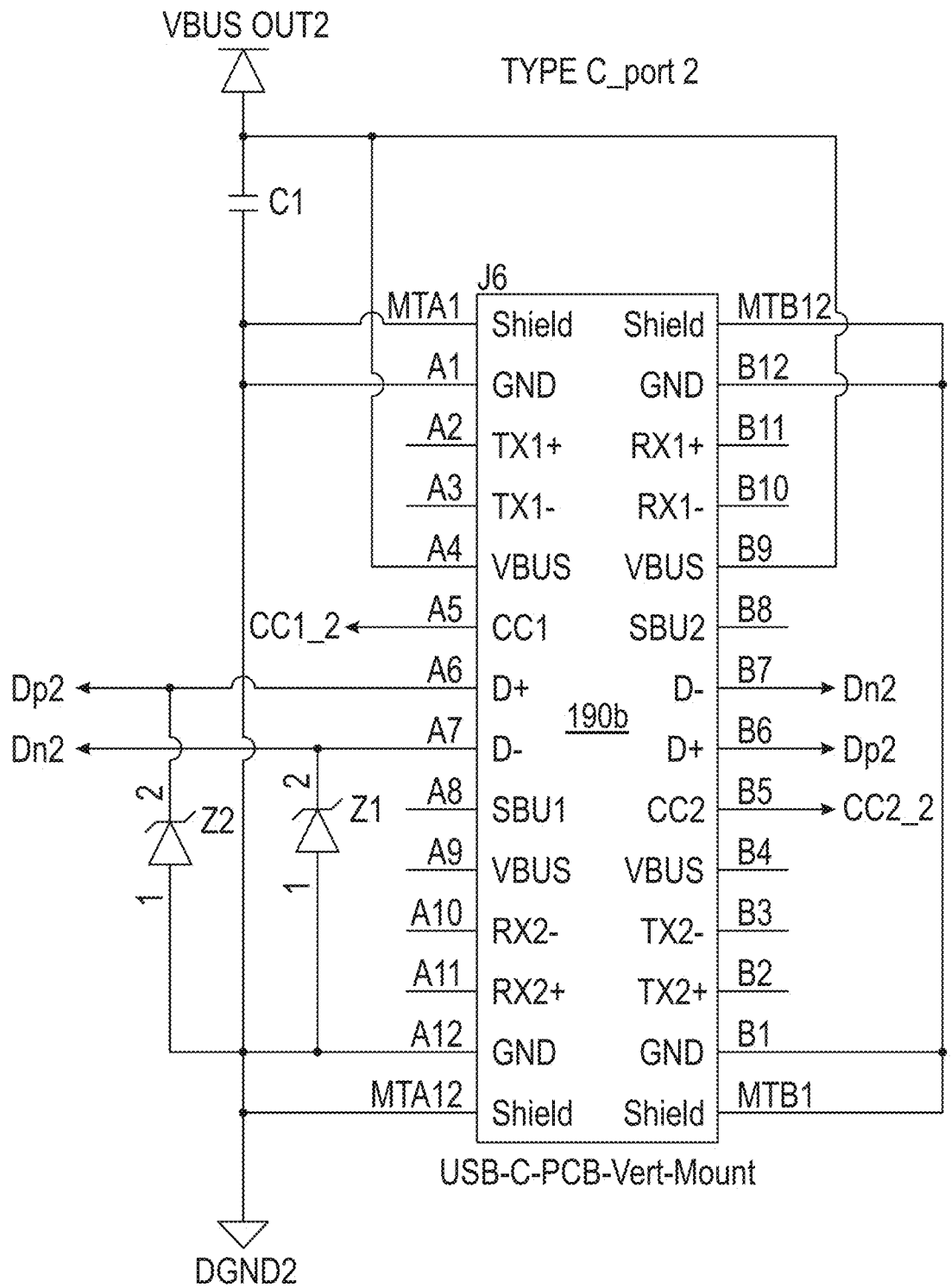

FIG. 7 depicts a schematic of USB Type-C power distribution connectors 190a, 190b in accordance with the present disclosure. The USB Type-C power distribution connectors 190a, 190b connect with both the USB power delivery system 100 and external devices. In an embodiment, the USB Type-C power distribution connectors 190a, 190b conform to a standard configuration, for example, a double-sided connector with 24 pins. The female connector may include four power pins and four ground pins, two differential pairs for high-speed USB data, four shielded differential pairs for Enhanced SuperSpeed data, two Sideband Use (SBU) pins, and two Configuration Channel (CC) pins. The CC pins on the device are used to carry USB power distribution communications.

Figure 8:
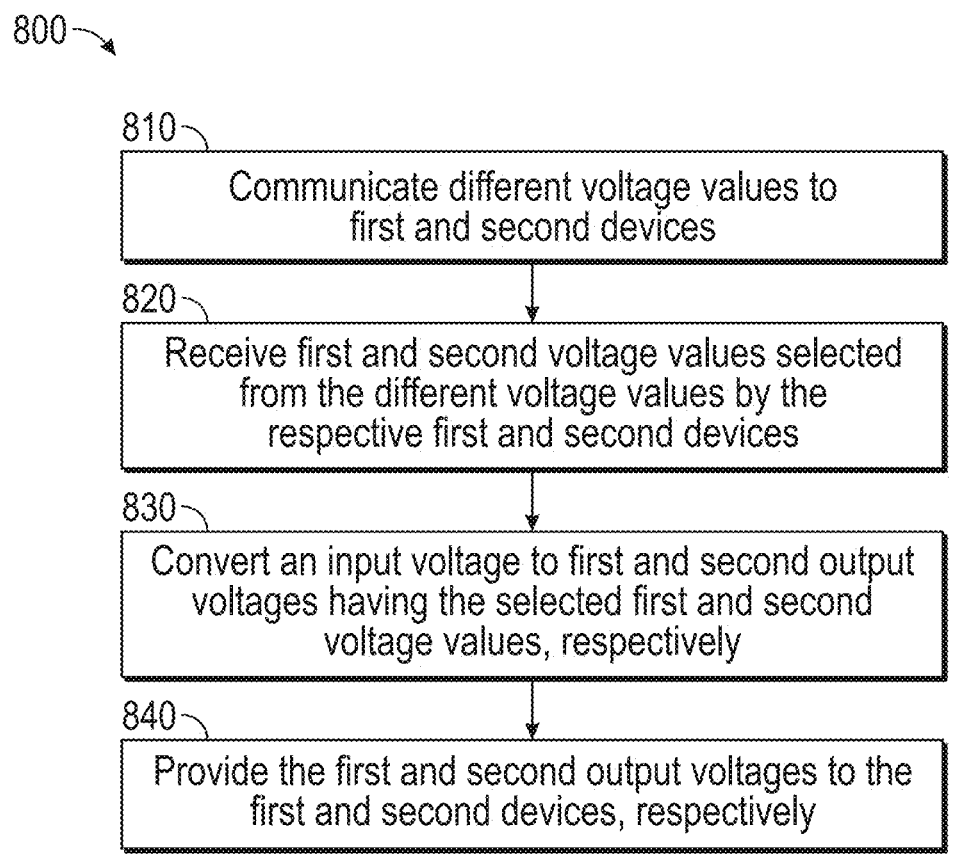
FIG. 8 is a flow chart illustrative of the method of delivering power in accordance with the present disclosure.

FIG. 8 is a flow chart illustrative of a method of delivering power 800 in accordance with the present disclosure. The method 800 includes various blocks described in an ordered sequence. However, those skilled in the art will appreciate that one or more blocks of the method 800 may be performed in a different order, repeated, and/or omitted without departing from the scope of the present disclosure. Further, the below description of the method 800 refers to various actions or tasks performed by the master controller IC 406, but those skilled in the art will appreciate that in some instances, the master controller IC 406 performs the actions or tasks via one or more software applications, such as the application which could be firmware, executing on the master controller IC 406.

The method may begin with the master controller IC 406 communicating or publishing different voltage levels to first and second electronic devices via respective first and second connectors 190*a*, 190*b* (block 810). For example, a USB Type-C device, such as a mobile device or a laptop, may be connected to the first USB Type-C power distribution connector 190*a*. Then, the master controller IC 406 receives first and second voltage levels from the respective first and second electronic devices via the respective first and second charging connectors (block 820). The communication of the voltage levels may be conducted through the Configuration Channel (CC) pins of the USB connectors 190*a*, 190*b*. The second device may be different from the first device, with different power or charging requirements. For example, the first device could require 2 watts and the second device could require 7 watts.

The master controller IC 406 then causes an input voltage to be converted to the first and second output voltages having the selected first and second voltage values, respectively (block 830). For example, the first electronic device may select +15 V DC, whereas the second electronic device may select +5 V DC. Thus, the input voltage, which may be 120 V AC, gets converted via the pair of DC/DC buck-boost converters 302*a*, 302*b* to +15 V DC and +5 V DC, respectively.

Finally, the master controller IC 406 controls the power supply (comprised of the USB power delivery controller ICs 402*a*, 402*b* and the DC/DC converter block 300) to output a first voltage at the received first voltage level to the first electronic device and output the second voltage at the received second voltage level to the second electronic device (block 840). For example, the master controller IC 406 may determine that the first electronic device has requested +5 V DC, and communicate that information to both the USB power delivery controller IC 402*a* and the DC/DC converter block 300, which may adjust its output according to this request. The master controller IC 406 may also determine that the second electronic device requested +15 V DC. That information is communicated to the USB power delivery controller IC 402*b* and the DC/DC converter block 300, which may adjust its output according to this request.

It is contemplated that the master controller IC 406 could determine the priority levels of the devices, and set the maximum power to be supplied to the devices and the corresponding sets of voltage levels to be published to the devices, accordingly. This priority can be set, for example, by determining which device was connected first, by determining which one was closer to being fully charged (e.g., by deducing the charge level), or by a communication via USB communications. It is contemplated that additional charging ports can be utilized by adding additional logic and DC sections.

In another embodiment, the USB power delivery system 100 can deduce the charge level of the connected electronic devices by measuring the charge time and/or the current being provided to the connected electronic devices and analyzing the measurements in view of charging profiles provided by the connected electronic devices. Based on the deduction, the USB power delivery system 100 can reprioritize the charging of the electronic devices. In another embodiment, reprioritizing may be based on how long a single electronic device has been plugged into a USB Type-C power distribution connector 190*a*, 190*b*. For example, if an electronic device has been plugged in for a substantial period, the electronic device is likely to be substantially charged and all or a large portion of output charging power may be reallocated to a more recently plugged in electronic device.

Figure 9:
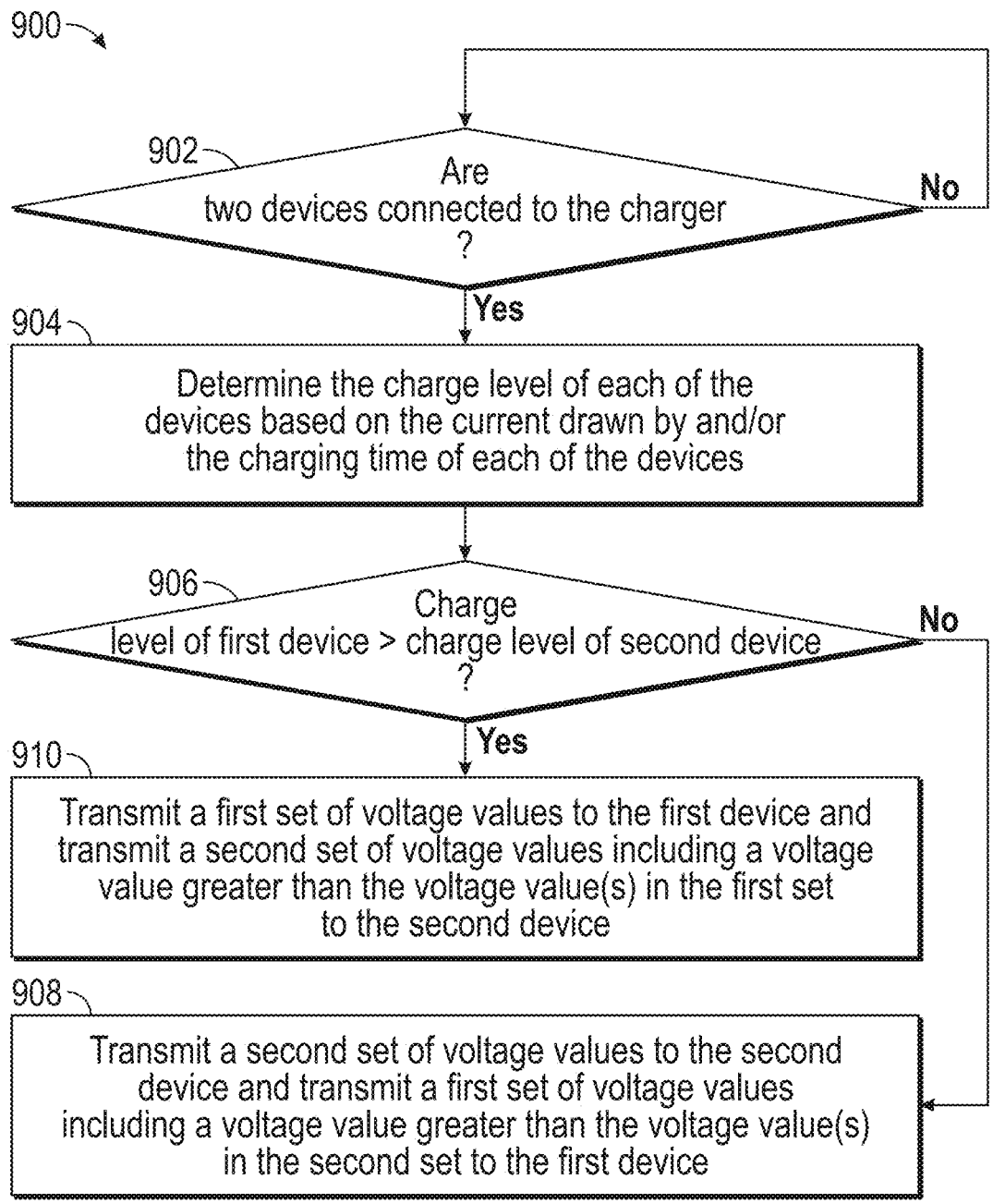
FIG. 9 is a flow chart illustrative of the method of charging electronic devices in accordance with the present disclosure.
Figure 10:
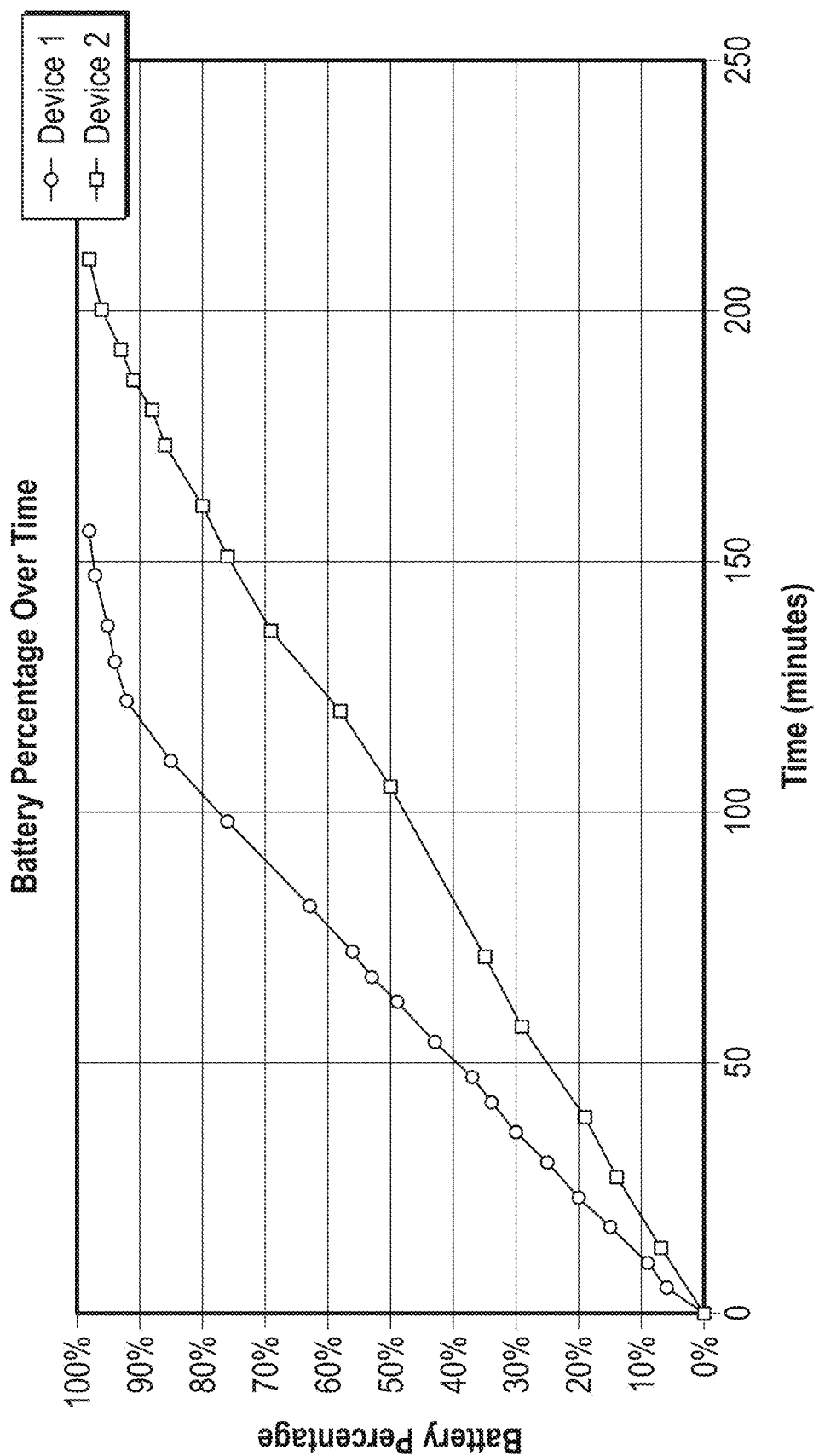
FIG. 10 depicts an example graph of battery percentage over time for two electronic devices, in accordance with the present disclosure.

FIG. 9 is a flow chart illustrative of a method of charging electronic devices 900 in accordance with the present disclosure. The method may begin with the USB power delivery system 100 publishing available voltages (e.g., 5V, 9V, and 15V) to two devices connected to the connectors 190*a*, 190*b* (block 910). Next, the USB power delivery system 100 determines the battery charge level of the two devices based on the current draw (block 920). Optionally, the USB power delivery system 100 may also determine the charge level based on the amount of time the device has been charging (block 930). For example, a timer starts when a device is plugged into a first connector 190*a*. Then another timer starts when a device is plugged into the second charging port 190*b*. The USB power delivery system 100 can then determine which device has the higher battery charge level based on charging profiles of the devices (e.g., the charging profiles illustrated in FIG. 10 and/or FIG. 11) and the timers.

Next, depending on which device has a higher battery charge level (block 940), the USB power delivery system 100 prioritizes which device receives more power. If the second device is determined at block 940 to have a higher battery charge level, then the USB power delivery system 100 directs more power to the first device than to the second device by changing the voltage values that are published to each device (block 950). If the first device is determined at block 940 to have a higher battery charge level, then the USB power delivery system 100 directs more power to the second device than to the first device by changing the voltage values that are published to each device (block 960).

Figure 12:
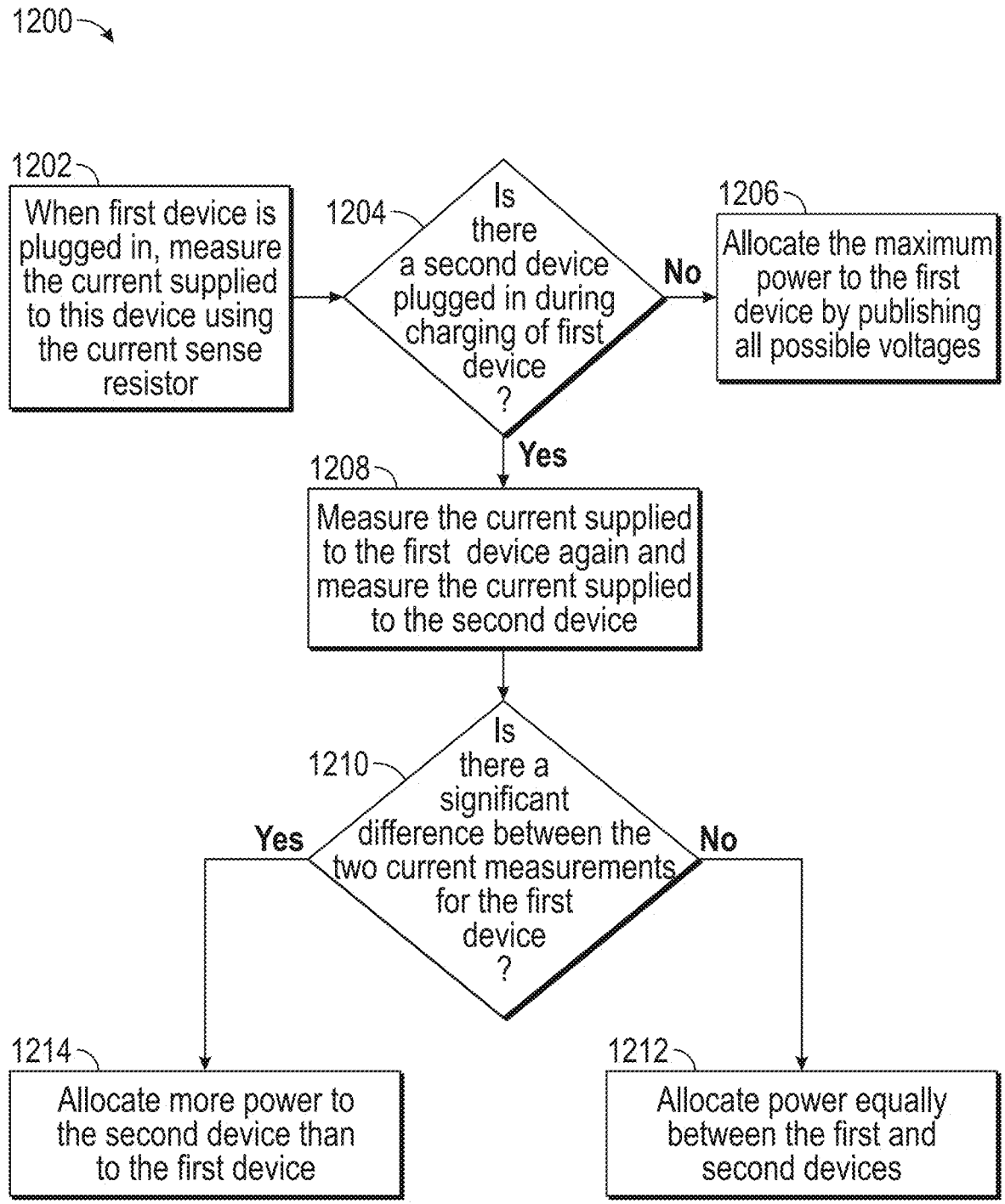
FIG. 12 is a flow chart illustrative of the method of charging electronic devices in accordance with the present disclosure.

FIG. 12 is a flow chart illustrating an exemplary embodiment of a method of charging devices in accordance with the present disclosure. The method may begin with a first device being plugged into the first USB Type-C power distribution connector 190*a* of the USB power delivery system 100. In an embodiment, the current supplied to the first device is measured using a current sense resistor (block 1202). Next, the master controller IC 406 determines whether a second device is plugged in during the charging of the first device (block 1204). If no second device is plugged in during the charging of the first device, then the USB power delivery system 100 allocates or continues to allocate the maximum amount of power to the first device by publishing all available voltage levels to the first device (block 1206).

If a second device is plugged in during the charging of the first device, then the USB power delivery system 100 measures the current supplied to the first device again and measures the current supplied to the second device (block 1208).

Next, the USB power delivery system 100 determines whether there is a significant difference between the two current measurements for the first device (block 1210). The significant difference may be a threshold difference indicating that the charging of the first device has transitioned from stage A to stage B of the charging cycle. If there is no significant difference between the current measurements for the first device (indicating that the charging of the first device has not transitioned from stage A to stage B of the charging cycle), the USB power delivery system 100 supplies at least equal power allocation to the first electronic device and the second electronic device (block 1212). Charging power is allocated equally to the first and second devices by publishing the same sets of available voltage values to the first and second devices. The published sets of available voltage values may include a maximum voltage value that, if supplied to both the first and second devices, would be within the charging capacity of the USB power delivery system 100.

Figure 11:
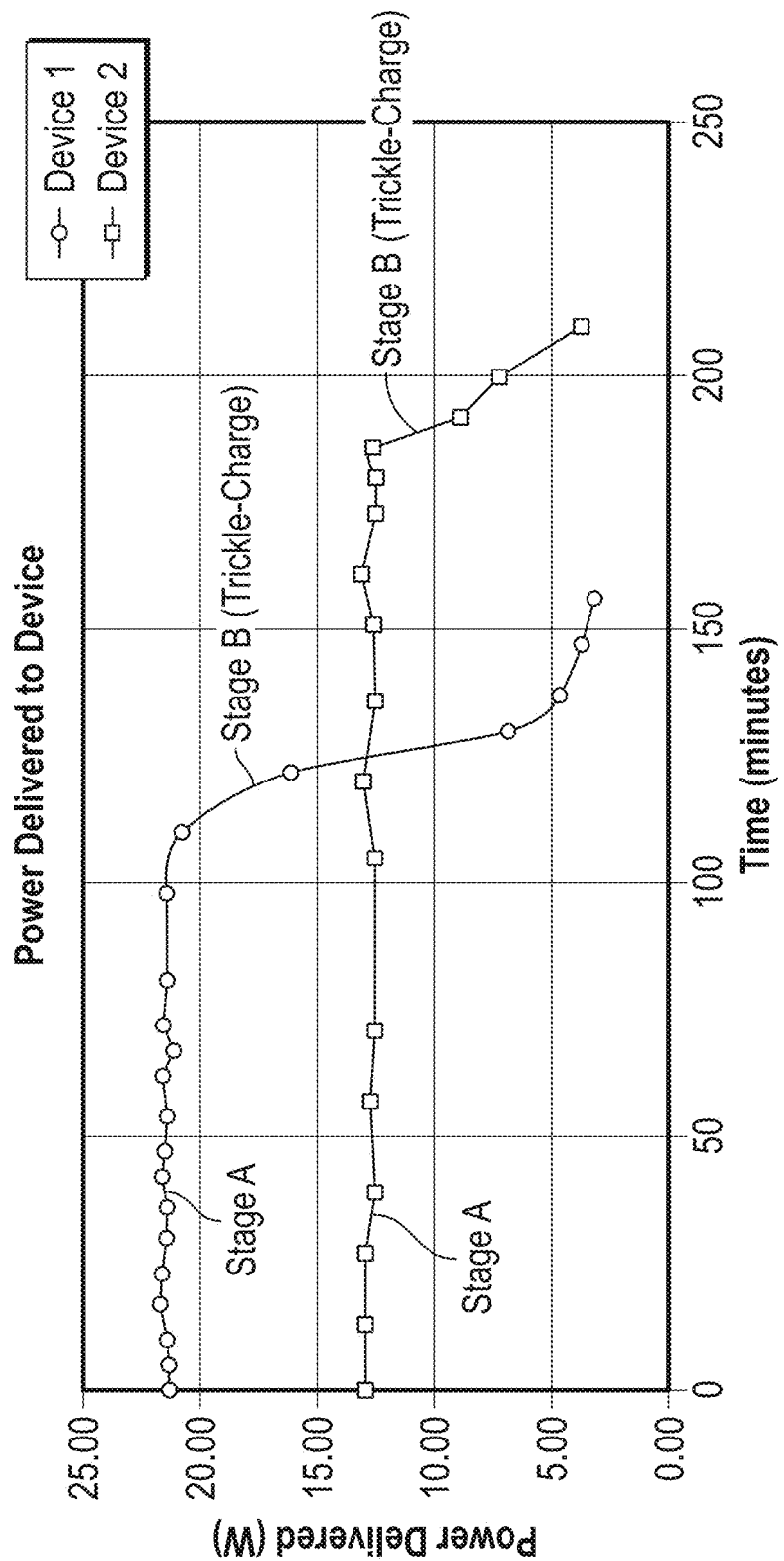
FIG. 11 depicts an example graph of power delivered to two electronic devices over time, in accordance with the present disclosure.

If there is a significant difference between the current measurements for the first device, the USB power delivery system 100 determines that the first device has entered stage B (trickle charging) as depicted in FIG. 11 and allocates more power to the second device than to the first device (block 1214). This may be accomplished by publishing higher voltage voltages to the second device than to the first device.

In embodiments where the USB power delivery system 100 is configured to supply a constant current to the first and second electronic devices, different charging powers may be allocated between first and second electronic devices by publishing different sets of voltage values to the first and second electronic devices corresponding to those different charging powers.

Figure 13:
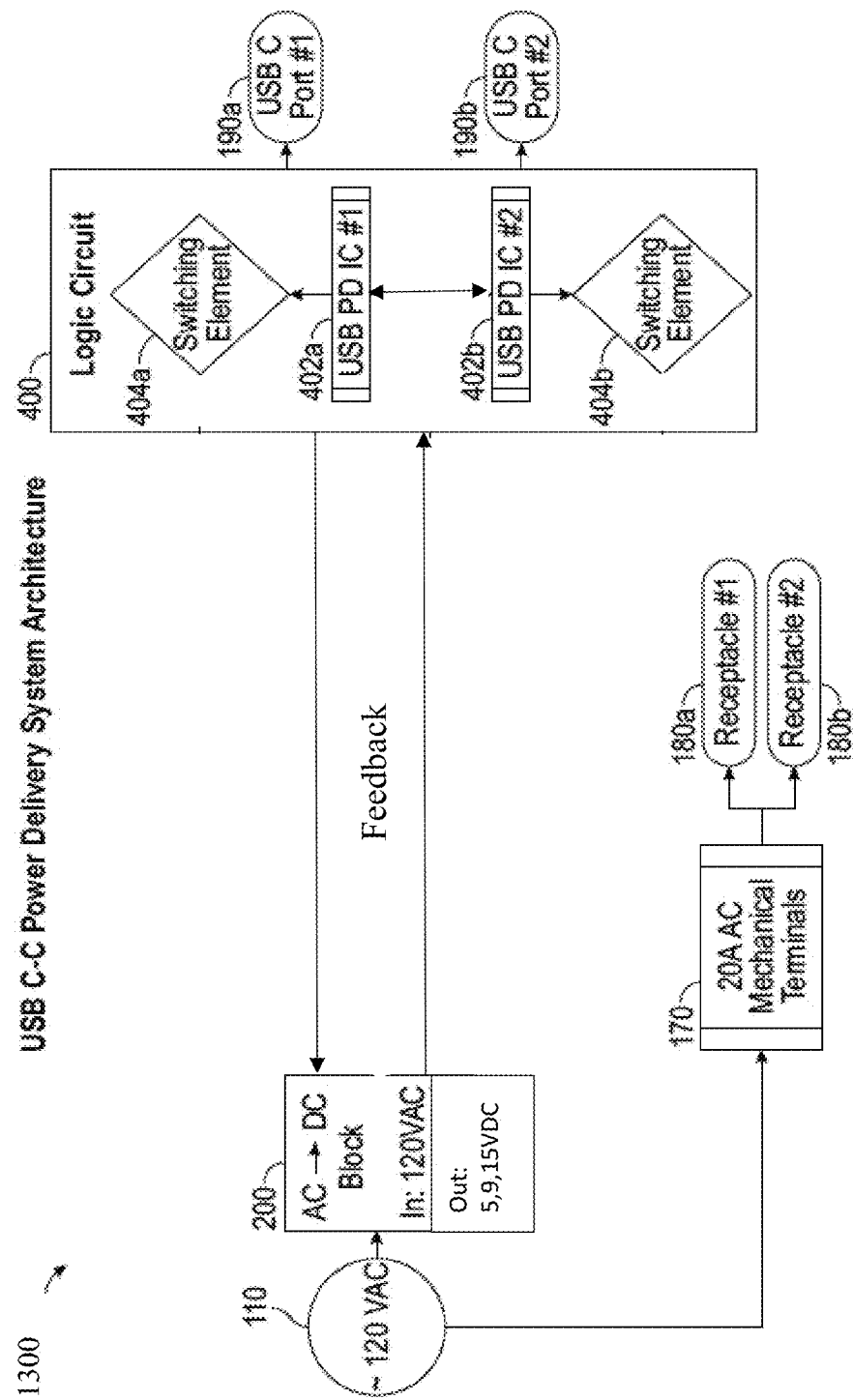
FIG. 13 depicts a block diagram of a USB power delivery system architecture including a direct feedback system in accordance with an exemplary embodiment of the disclosure.
Figure 14:
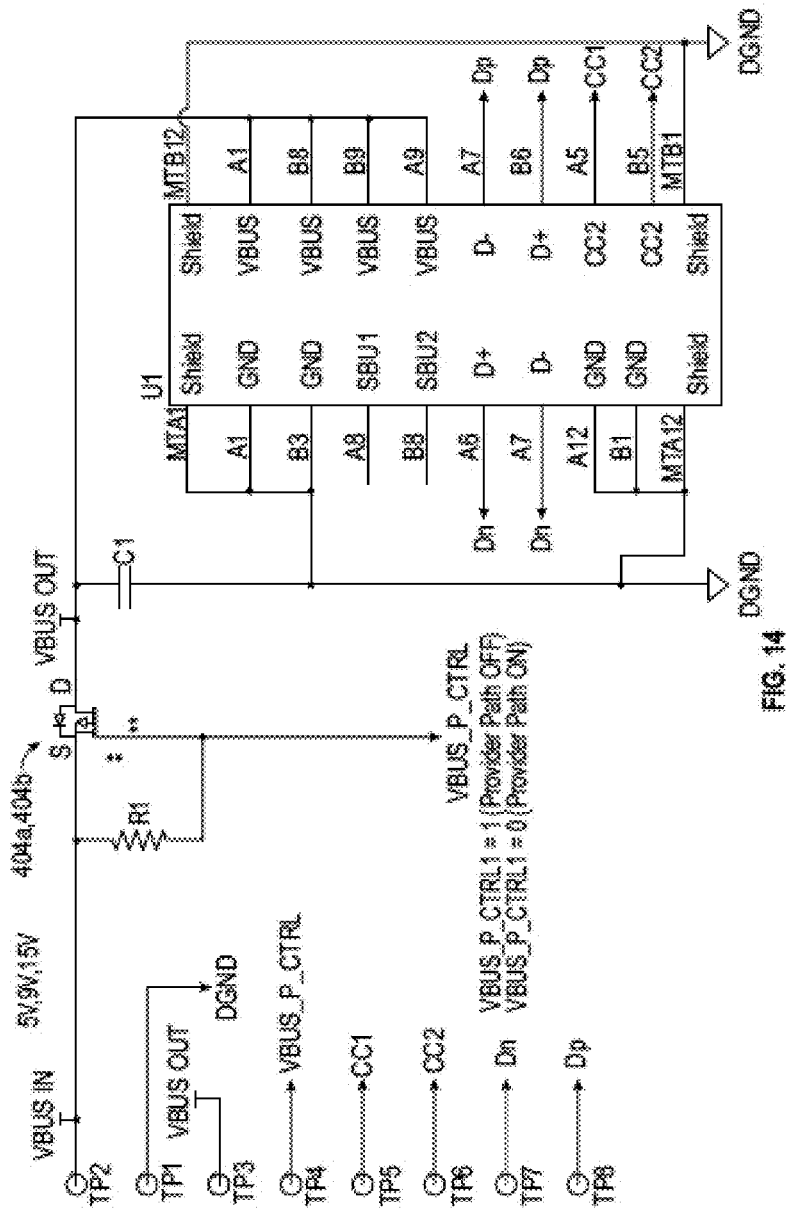
FIG. 14 depicts a schematic diagram of an example embodiment of switching elements of FIG. 13.
Figure 15:
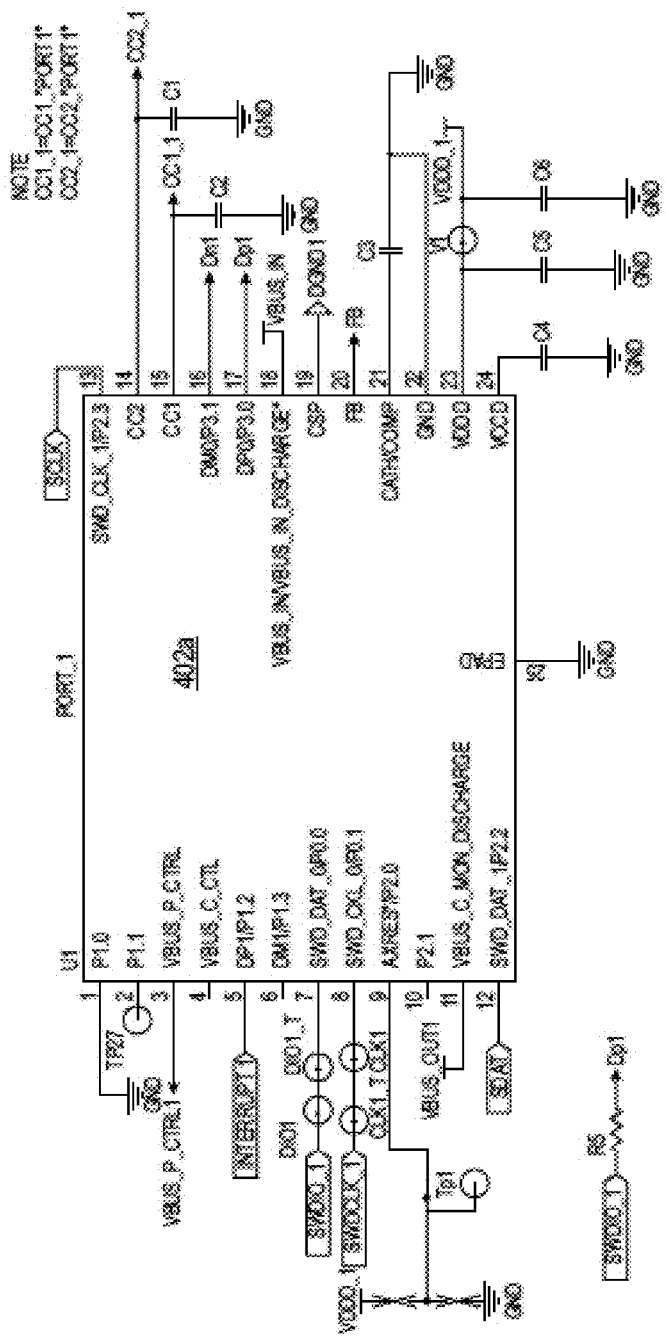
FIG. 15 depicts a schematic diagram of an example embodiment of a pair of USB power delivery (PD) controller integrated circuits (IC) of FIG. 13.
Figure 15:
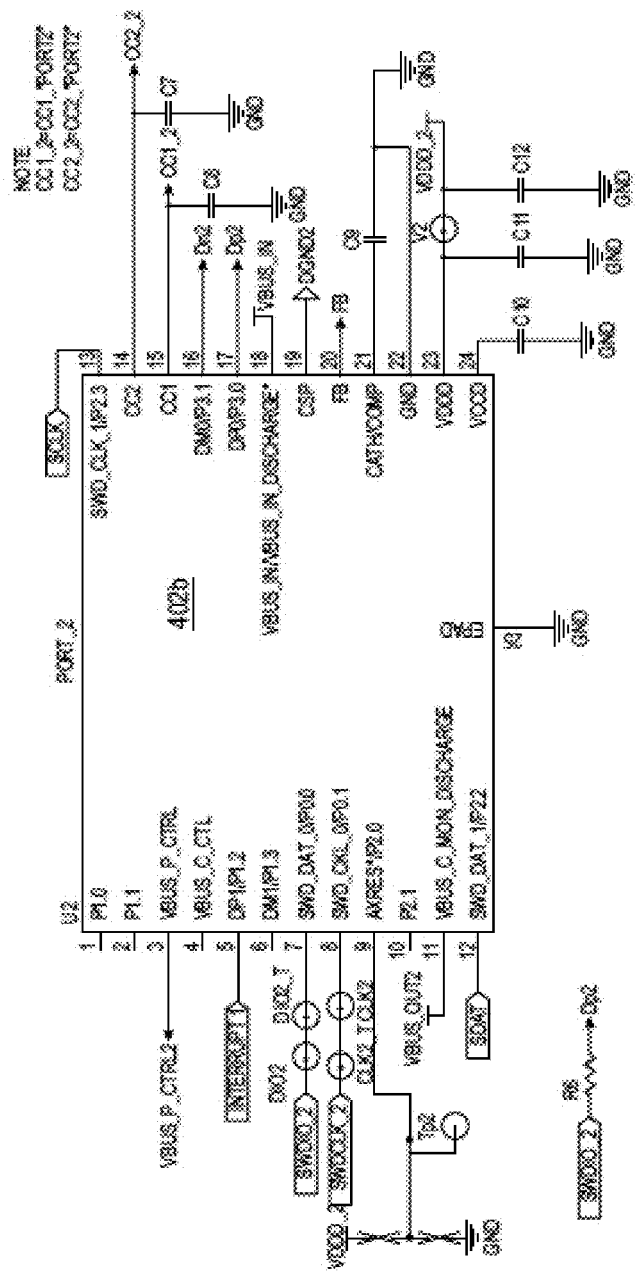
Figure 16:
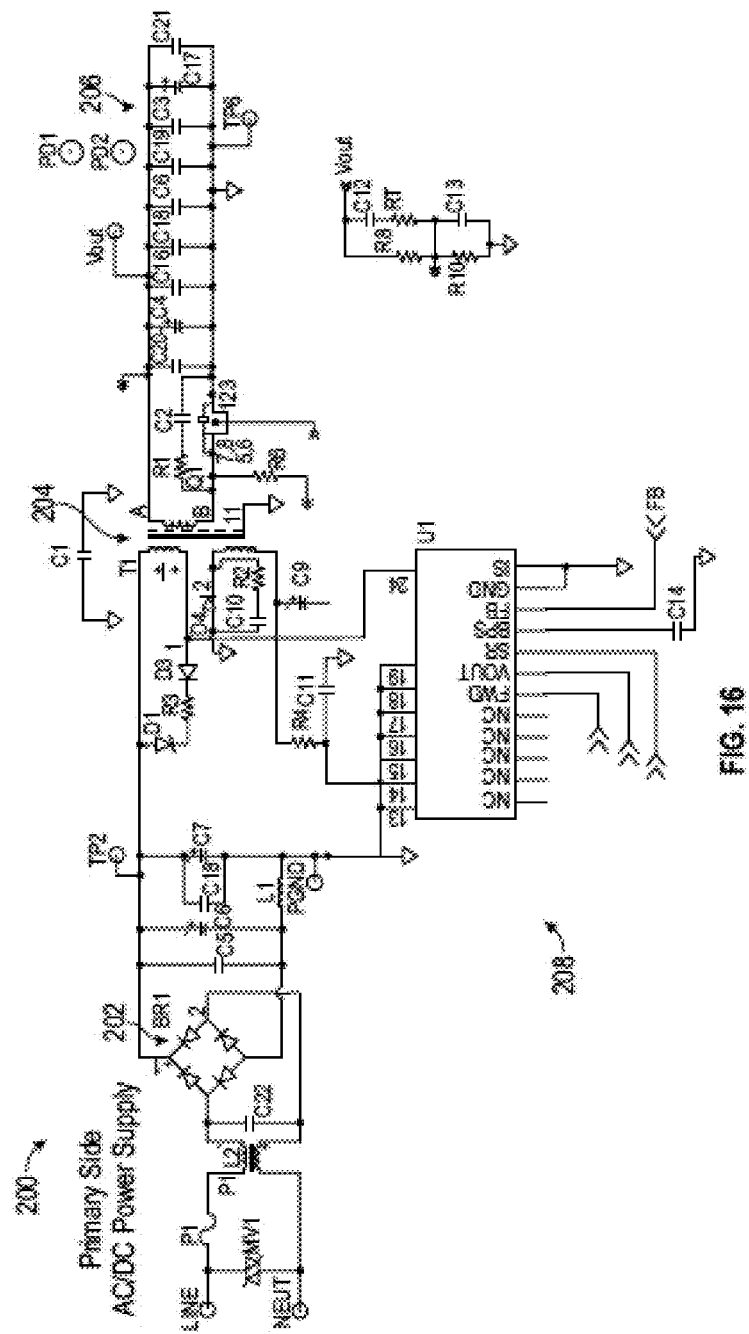
FIG. 16 depicts a schematic diagram of an example embodiment of the AC/DC converter of FIG. 13.

FIG. 13 depicts a block diagram of a USB power delivery system architecture including a direct feedback system in accordance with an exemplary embodiment of the disclosure. FIG. 14 depicts a schematic diagram of an example embodiment of switching elements of FIG. 13. FIG. 15 depicts a schematic diagram of an example embodiment of a pair of USB power delivery (PD) controller integrated circuits (IC) of FIG. 13. FIG. 16 depicts a schematic diagram of an example embodiment of the AC/DC converter of FIG. 13.

Referring to FIGS. 13-16, according to an aspect of the present disclosure, a universal serial bus (USB) charging system 1300 includes a power supply 110 including a plurality of power converters (e.g., AC/DC power converters 200) and a plurality of power supply outputs electrically coupled to the plurality of power converters, respectively. Each of the plurality of power converters is configured to convert an input voltage (e.g., 20 VAC) to a plurality of output voltages (e.g., 5, 9 or 15 VDC). A plurality of charging ports (e.g., USB port 190a and/or USB port 190b) are electrically connected with the plurality of power supply outputs, respectively. Each of the plurality of charging ports is configured to provide an output voltage selected from the plurality of output voltages to an electronic device. A logic circuit 400 is in electrical communication with the power supply and the plurality of charging ports. The logic circuit 400 is configured to provide direct feedback to the power supply to output a particular output voltage of the plurality of output voltages to the plurality of charging ports. Thus, the DC/DC converter block 300 described in more detail above may be omitted. Additionally, as described in more detail below, the master IC 406 may be omitted. Accordingly, a size, weight and manufacturing cost of the USB charging system 1300 may be reduced, while still maintaining a desired output power at the charging ports.

As an example, the electronic device receiving the output voltage may be a Smartphone, computer, Tablet or any other electronic device. The output voltage may be used to charge a battery of the electronic device.

According to an aspect of the present disclosure, each respective electronic device connected with each respective charging port of the plurality of charging ports may receive a same output voltage. For example, a single desired output voltage may be output to the logic circuit 400 and each of a plurality of devices respectively connected with a plurality of charging ports may receive a same output power.

According to an aspect of the present disclosure, each of the plurality of charging ports may be a USB Type-C charging port. According to an aspect of the present disclosure, voltages of the plurality of output voltages may range from about 5 volts to about 20 volts. However, exemplary embodiments of the present disclosure are not limited thereto, and other desired voltages may be output to the charging ports. As an example, logic circuit 400 may provide direct feedback to the power supply to output one of 5, 9 or 15 volts of direct current.

According to an aspect of the present disclosure, each of the plurality of power converters may be an AC to DC power converter. Each of the plurality of output voltages may be a DC output voltage.

An exemplary DC voltage to watts calculation formula is provided below, whish Power P is in watts (W), Voltage V is in volts (V) and current I is in amps (A):

$$P_{(W)} = V_{(V)} \times I_{(A)}$$

As an example, an output voltage of 5 Volts (direct current DC) at a current of 6 Amps provides 30 Watts according to the above-noted formula.

According to an aspect of the present disclosure, the logic circuit may include a first power delivery (PD) controller integrated circuit (IC) 402a and a second PD controller IC 402b. The first PD controller IC 402a may be electrically connected with a first charging port 190a of the plurality of charging ports. The second PD controller IC 402b may be electrically connected with a second charging port 190b of the plurality of charging ports.

According to an aspect of the present disclosure, the first PD controller IC 402a may be electrically connected with the second PD controller IC 402b. The master IC 406 may be omitted and the first PD controller IC 402a may be directly connected with the second PD controller IC 402b.

As an example, the logic circuit 400 may include the Cypress® EZ-PD™ CCG3PA USB Type-C port controller. Thus, the output voltage received at the logic circuit may range from 3.0V to 24.5V DC, and the logic circuit 400 may tolerate 30V of output voltage. Thus, the output voltage may range from 3.0V DC to 30V DC.

According to an aspect of the present disclosure, a method for charging a plurality of electronic devices using a USB charging system includes providing AC power from a power source 110 to an AC/DC converter 200. The method includes receiving, at the AC/DC converter 200, the AC power from the power source 100. The AC/DC converter 200 includes a plurality of power converters and a plurality of power supply outputs electrically coupled to the plurality of power converters, respectively. Each of the plurality of power converters is configured to convert the AC power to a plurality of different DC output voltages. The method includes receiving, at the power source 100 (e.g., at the AC/DC converter 200), direct feedback from a logic circuit 400 in direct electrical communication with the AC/DC converter 200, and outputting a particular DC output voltage from the AC/DC converter 200 in response to the direct feedback received. The logic circuit 400 is in electrical communication with a plurality of charging ports (e.g., any of USB charging ports 190a and/or 190b, Line-Voltage Ports 2591a and/or 2591b, and/or additional charging ports having substantially the same configuration). The method includes delivering the particular DC output voltage to each of the plurality of electronic devices respectively connected with each of the plurality of charging ports.

The method of charging a plurality of electronic devices according to an aspect of the present disclosure includes detecting, by the logic circuit 400, a temperature of two or more charging ports and reducing a wattage delivered to a particular charging port of the plurality of charging ports if a temperature detected in the particular charging port of the plurality of charging ports exceeds a predetermined threshold. The reduced wattage (e.g., reduced to below 30 watts) delivered to the particular charging port of the plurality of charging ports may be maintained at an above-zero level until a temperature of the particular charging port of the plurality of charging ports is reduced below a second predetermined threshold. Multiple temperature thresholds can be employed, each indicating a reduced wattage delivered to the particular charging port of the plurality of charging ports. A supply of power to a particular charging port may also be completely cut off and reduced to zero if a predetermined temperature threshold is reached, or if a predetermined threshold is reached multiple times within a predetermined time period.

Alternatively, or in conjunction with detecting a temperature of two or more charging ports, the logic circuit 400 can detect a current drawn by two or more charging ports of the plurality of charging ports (e.g., a current drawn by each line voltage port) and reduce a current drawn by a particular charging port of the plurality of charging ports if a temperature determined in the particular charging port of the plurality of charging ports exceeds a predetermined threshold and/or if a current drawn by a particular line voltage port exceeds a predetermined threshold.

The temperature in a particular charging port may also be reduced using a thermally conductive housing (see, e.g., thermally conductive housings 2701 or 2801 in FIGS. 27 and 28, respectively) in thermal contact with the plurality of charging ports. The thermally conductive housing transfers heat away from the charging ports of the plurality of charging ports to reduce a temperature of the charging ports of the plurality of charging ports. As an example, the thermally conductive housing may have a molecular structure configured to draw heat along the directional arrows illustrated in FIGS. 27-28. The molecular structure of the thermally conductive housing may draw heat along a path of least resistance away from the charging ports to reduce the temperature of the charging ports. The thermally conductive housing may include or be formed of aluminum. The thermally conductive housing may be in thermal contact with the power supply 110, the plurality of charging ports and the logic circuit 400. The thermally conductive housing is configured to transfer heat away from at least one of the power supply 110, the charging ports of the plurality of charging ports, or the logic circuit 400 to reduce a temperature of the USB charging system (e.g., USB charging system 2700 or 2800). The thermally conductive housing may be configured to transfer heat away from any suitable heat generating, or heat retaining component, to reduce a temperature of any other suitable component or to reduce the temperature of the device as a whole.

As an example, the electronic device receiving the output voltage may be a Smartphone, computer, Tablet or any other electronic device. The output voltage may be used to charge a battery of the electronic device.

According to an aspect of the present disclosure, each respective electronic device connected with each respective charging port of the plurality of charging ports may receive a same output voltage. For example, a single desired output voltage may be output to the logic circuit 400 and each of a plurality of devices respectively connected with a plurality of charging ports may receive a same output power.

According to an aspect of the present disclosure, each of the plurality of charging ports may be a USB Type-C charging port. According to an aspect of the present disclosure, voltages of the plurality of output voltages may range from substantially 5 volts to substantially 20 volts. However, exemplary embodiments of the present disclosure are not limited thereto, and other desired voltages may be output to the charging ports. As an example, logic circuit 400 may provide direct feedback to the power supply to output one of 5, 9 or 15 volts of direct current.

As an example, an output voltage of 5 Volts (direct current DC) at a current of 6 Amps provides 30 Watts according to the above-noted formula.

According to an aspect of the present disclosure, the logic circuit may include a first power delivery (PD) controller integrated circuit (IC) 402a and a second PD controller IC 402b. The first PD controller IC 402a may be electrically connected with a first charging port 190a of the plurality of charging ports. The second PD controller IC 402b may be electrically connected with a second charging port 190b of the plurality of charging ports.

According to an aspect of the present disclosure, the first PD controller IC 402a may be electrically connected with the second PD controller IC 402b. The master IC 406 may be omitted and the first PD controller IC 402a may be directly connected with the second PD controller IC 402b.

As an example, the logic circuit 400 may include the Cypress® EZ-PD™ USB Type-C port controller. Thus, the output voltage received at the logic circuit may range from 3.0V to 24.5V DC, and the logic circuit 400 may tolerate 30V of output voltage.

FIG. 16 depicts an exemplary schematic of an AC/DC converter 200 in accordance with the present disclosure. The AC/DC converter 200 typically takes an input from an AC power source 110 and processes it through the bridge rectifier 202. Bridge rectifier 202 converts AC to DC voltage by providing full wave rectification from a two-wire AC input. The polarity of the output is the same regardless of the polarity of the input. The DC signal created by the bridge rectifier 202 may have some amount of ripple on it, which is filtered out by filtering capacitors and inductors coupled to the output terminals of the bridge rectifier 202. The DC voltage is then stepped down with a transformer 204 and further filtered by a filter 206. A flyback converter 208 may be used to regulate the DC voltage.

Figure 17:
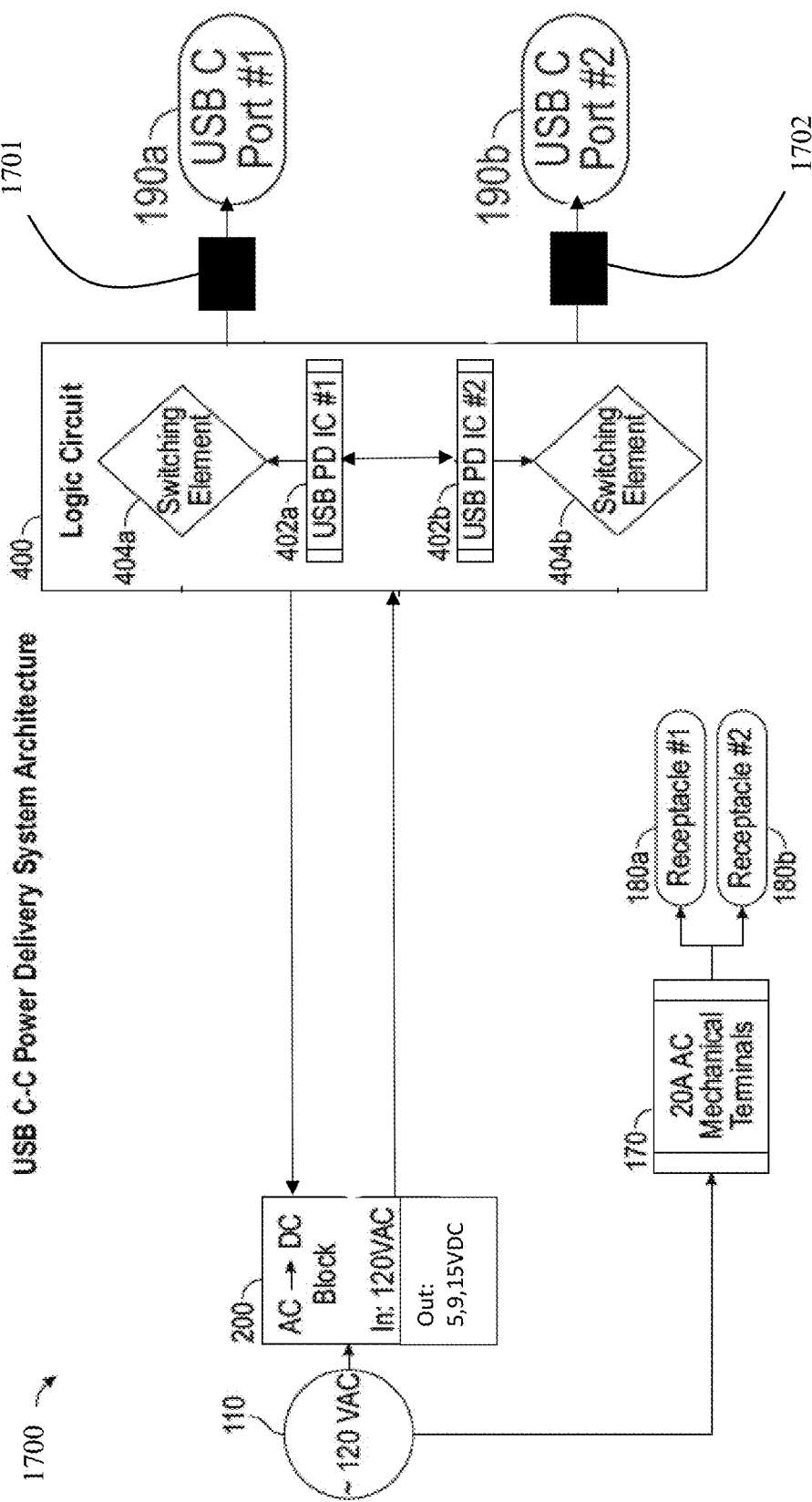
FIG. 17 depicts a block diagram of a USB power delivery system architecture including a direct feedback system and thermistors in accordance with an exemplary embodiment of the disclosure.

FIG. 17 depicts a block diagram of a USB power delivery system architecture including a direct feedback system and thermistors in accordance with an exemplary embodiment of the disclosure.

Referring to FIG. 17, according to an aspect of the present disclosure, a USB charging system 1700 may include a thermistor (e.g., thermistor 1701 or thermistor 1702) electrically connected with at least one PD controller IC (e.g., 402a or 402b). The USB charging system 1700 may be substantially the same as the USB charging system 1300 described in more detail above, and thus duplicative descriptions may be omitted below. The thermistor may be configured to reduce power delivery to the at least one charging port of the plurality of charging ports in response to a temperature exceeding a first predetermined threshold. The reduced power delivery to the at least one charging port of the plurality of charging ports may be maintained at an above-zero level until a temperature of the charging port is reduced below a second predetermined threshold. Thus, use of the thermistor may prevent a binary on/off power delivery scheme in which power is completely cut off in the event of excess heat generation. As a result, a reduced power output may be applied to a USB charging port while a temperature level is reduced. This may allow continuous charging to occur (at a reduced rate) for a connected device, even when a temperature above a predetermined threshold occurs. As a result, charging times of the connected device may be reduced, and overall power use efficiency may be increased when compared with a binary on/off power delivery scheme.

Figure 18:
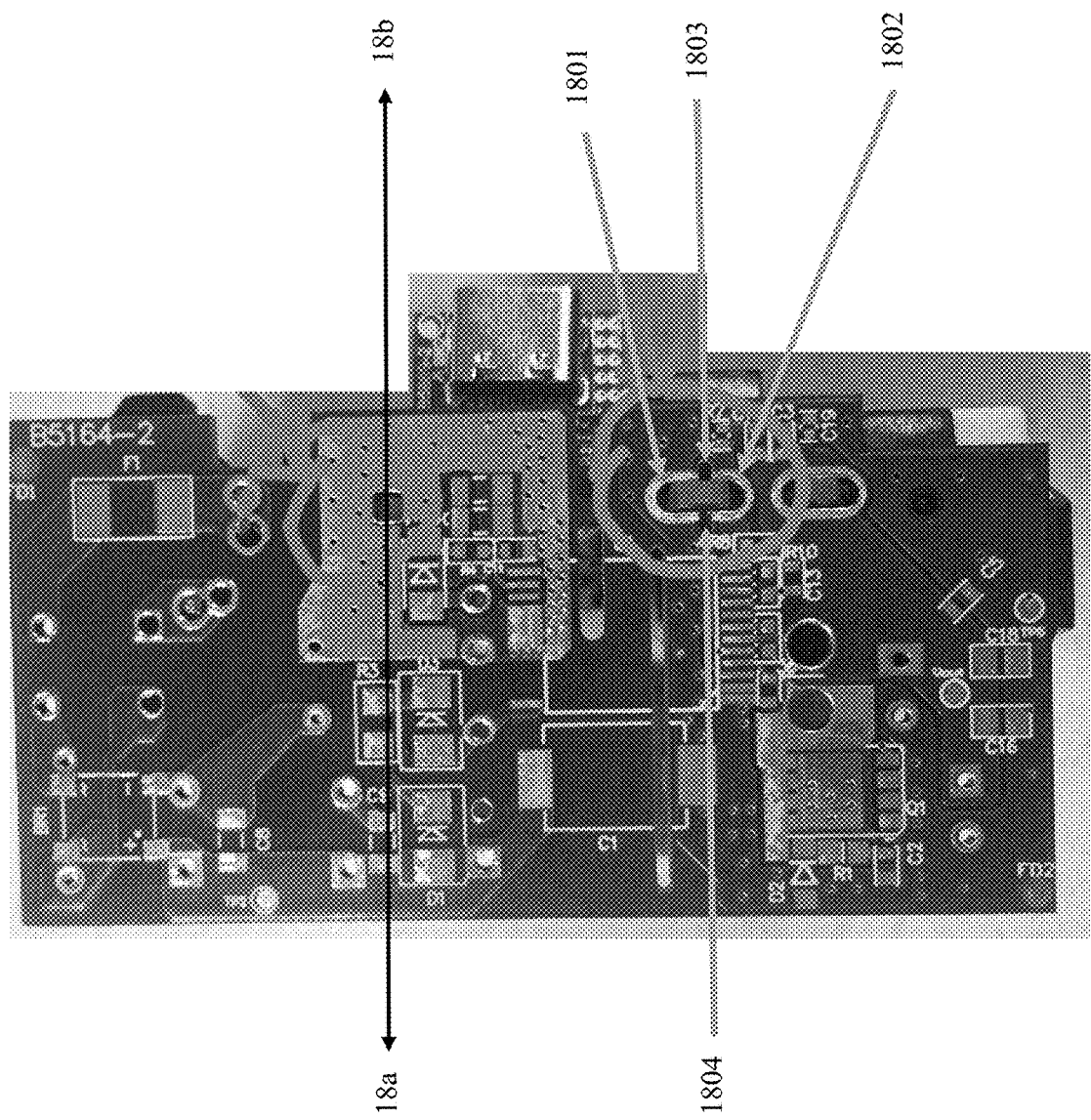
FIG. 18 depicts exemplary mechanical and electrical connections between a power board and a logic board in accordance with an exemplary embodiment of the disclosure.
Figure 19:
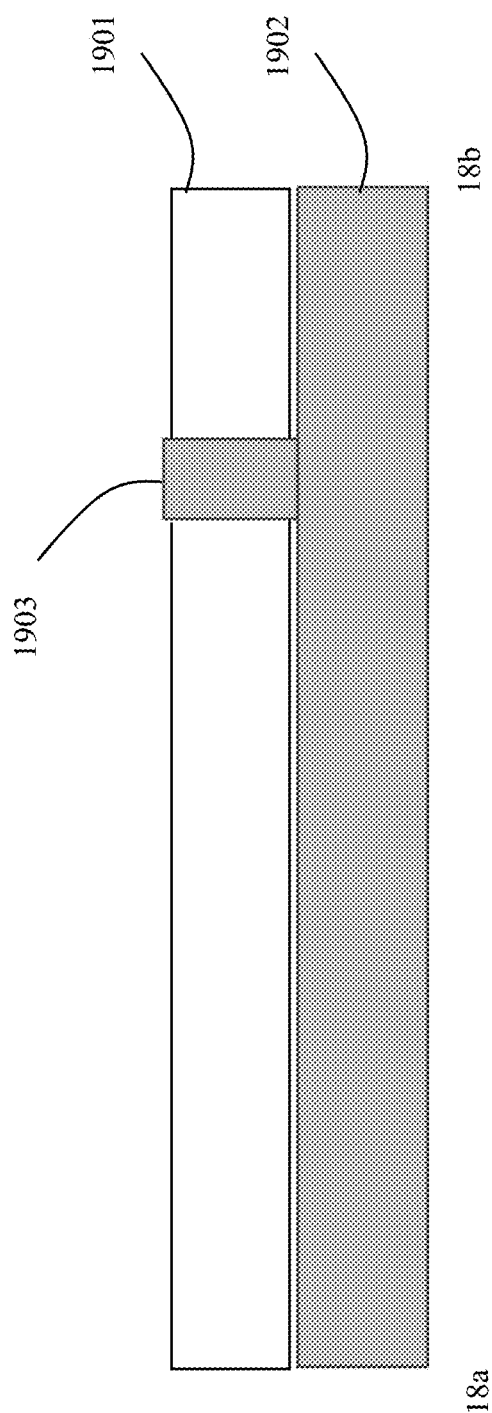
FIG. 19 is a cross-sectional view along lines 18a-18b of a mechanical connection between a power board and a logic board in accordance with an exemplary embodiment of the disclosure.

FIG. 18 depicts exemplary mechanical and electrical connections between a power board and a logic board in accordance with an exemplary embodiment of the disclosure. FIG. 19 is a cross-sectional view along lines 18a-18b of a mechanical connection between a power board and a logic board in accordance with an exemplary embodiment of the disclosure.

Referring to FIGS. 18 and 19, a mechanical connection is illustrated between a power board 1902 and a logic board 1901. The mechanical connection is formed by a projection 1903 extending from the power board 1902 through an aperture in the logic board 1901. Thus, strength and rigidity of a mechanical connection between the power board 1902 and the logic board 1901 may be increased. This may prevent movement between the boards, thus decreasing a failure rate of connections between the boards.

Referring to FIG. 18, an electrical connection between the power board 1902 and the logic board 1901 formed through a post may be divided into a split connection (i.e., two separated electrical connections) in a single post. For example, a first electrical connection 1801 may be separated from a second electrical connection 1802 between the power board 1902 and the logic board 1901 by a first slit 1803 and a second split 1804 in the post. Thus, two separate electrical connections may be formed in a relatively small amount of space. Thus, a size of the power board 1902 and/or the logic board 1901 may be reduced, and an overall size of a USB receptacle employing the power board 1902 and the logic board 1901 may be reduced.

Figure 20A:
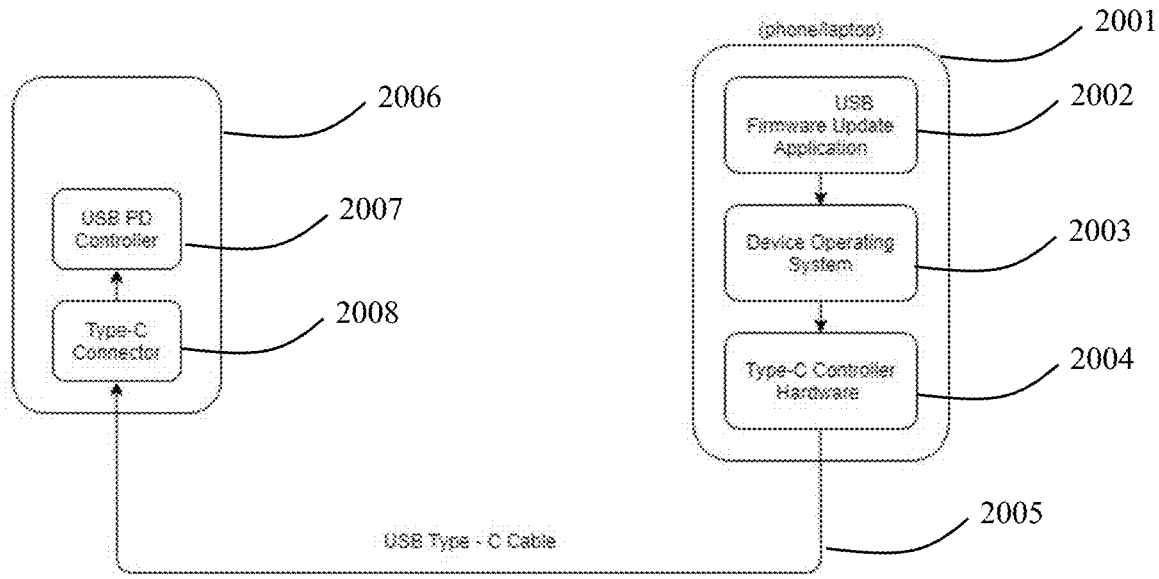
FIGS. 20A and 20B each depict an exemplary system for upgrading firmware of a USB receptacle in accordance with an exemplary embodiment of the disclosure.
Figure 20B:
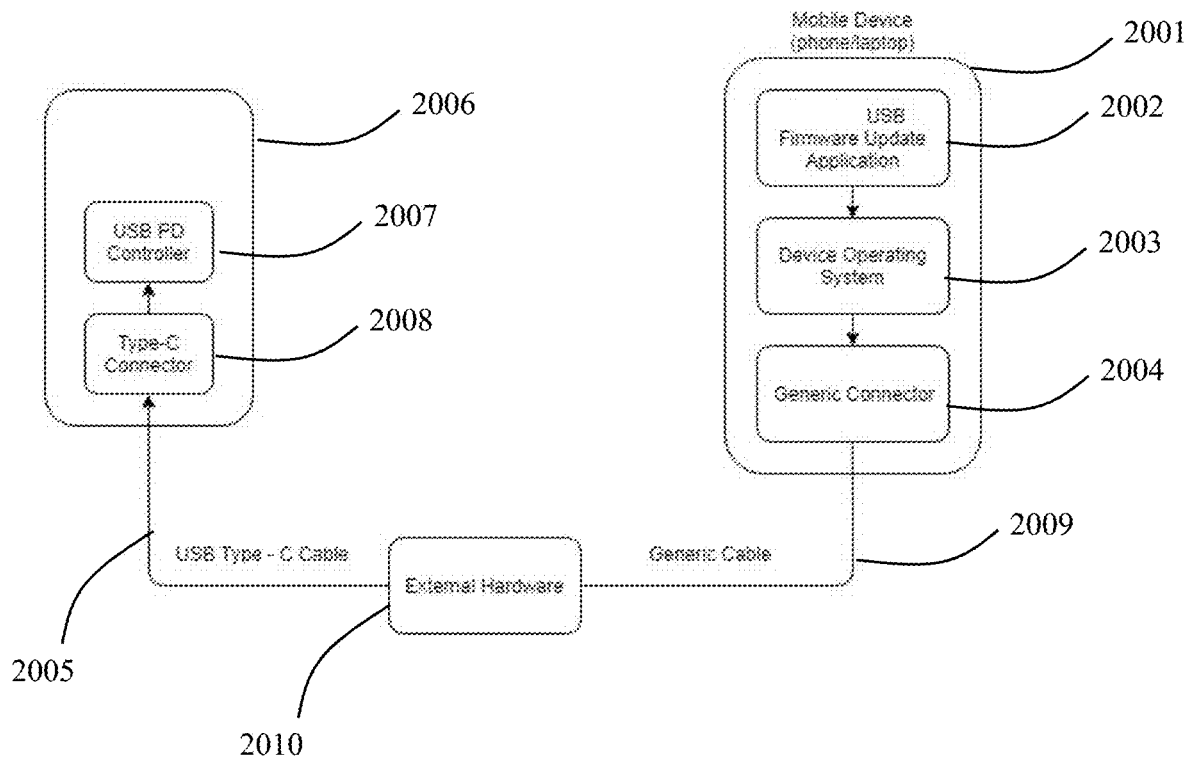
Figure 21:
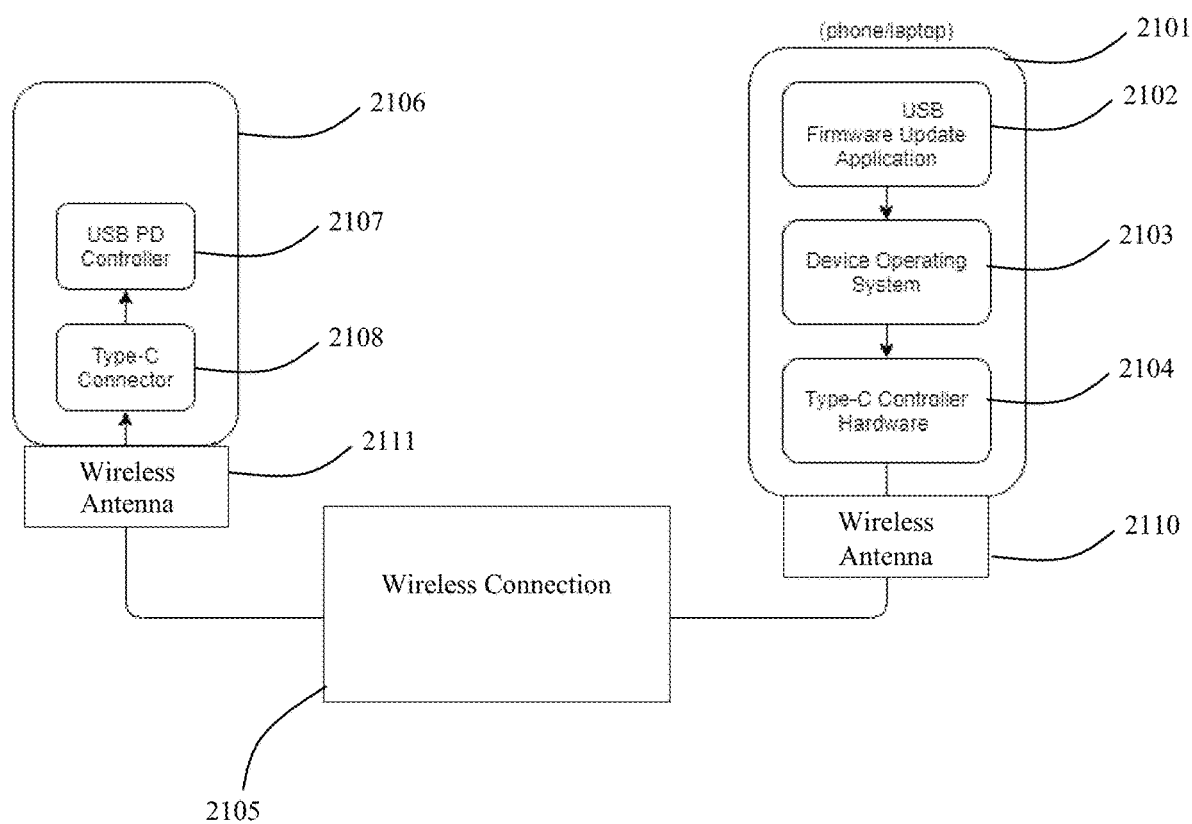
FIG. 21 depicts an exemplary system for wirelessly upgrading firmware of a USB receptacle in accordance with an exemplary embodiment of the disclosure.

FIGS. 20A and 20B each depict an exemplary system for upgrading firmware of a USB receptacle in accordance with an exemplary embodiment of the disclosure. FIG. 21 depicts an exemplary system for wirelessly upgrading firmware of a USB receptacle in accordance with an exemplary embodiment of the disclosure.

As an example, the logic circuit 2006 described in more detail below with reference to FIGS. 20A, 20B and 21 may include the Cypress® EZ-PD™ CCG3PA USB Type-C port controller. Thus, the logic circuit may have a fully programmable power supply mode, and firmware that may be modified and custom tailored, as desired. Unless otherwise specified below, the logic circuit 2006 described in more detail below may have substantially the same configuration as the logic circuit 400 described in more detail above, and thus duplicative descriptions may be omitted below. Unless otherwise specified below, the USB charging port 2008 described in more detail below may have substantially the same configuration as the charging ports (e.g., 190a and/or 190b) described in more detail above, and thus duplicative descriptions may be omitted below.

Referring to FIG. 20A, according to an aspect of the present disclosure, a system for modifying firmware includes a USB receptacle having a logic circuit 2006 including at least one power delivery (PD) controller integrated circuit (IC) 2007. The logic circuit 2006 has a first memory storing firmware configured to control the logic circuit 2006. At least one USB charging port 2008 is in communication with the logic circuit 2006. However, exemplary embodiments of the present disclosure are not limited to a single USB charging port. For example, as described herein, any number of desired charging ports may be included in the USB receptacle and may be controlled by the logic circuit 2006.

The firmware stored on the first memory of the logic circuit 2006 is modified by communicably coupling a device 2001 to the at least one USB charging port 2008. While the device may be a Smartphone or a laptop computer, exemplary embodiment are not limited thereto and other devices such as a tablet, desktop computer or other desired devices may be employed to update firmware, as described herein. The device 2001 has a processor and a second memory storing computer instructions configured to modify the firmware stored on the first memory of the logic circuit 2006. The firmware stored on the first memory of the logic circuit 2006 is modified by transmitting computer instructions from the device 2001 to the logic circuit 2006.

According to an aspect of the present disclosure, the device 2001 may include a device operating system 2003 configured to control the functionality of the device 2001 and may include hardware (e.g., Type-C controller hardware) 2004 configured to interface with and control a transfer of a firmware modification from the device 2001 to the logic circuit 2006.

According to an aspect of the present disclosure, the device 2001 may be a Smartphone, a USB drive, a Tablet, or a computer. The Smartphone, USB drive, tablet or computer may have a firmware update application thereon. The firmware update application is configured to modify the firmware stored on the first memory of the logic circuit 2006. Thus, the device 2001 may be able to access and modify firmware of the logic circuit 2006 without the use of external or specialized hardware between the device 2001 and the logic circuit 2006. This may be achieved by directly accessing the logic circuit 2006 using any device that is capable of connecting and interfacing with a USB charging port of the USB receptacle including the logic circuit 2006.

According to an aspect of the present disclosure, the USB charging port may be a USB Type-C charging port.

According to an aspect of the present disclosure, the device may be communicably coupled to the at least one USB charging port through a USB cable. The USB cable may be a USB Type-C cable. The USB Type-C cable may be a generic cable that does not include specialized hardware configured to interface with the logic circuit 2006.

Referring to FIG. 20B, the device 2001 may be communicably coupled to the USB charging port 2008 of the logic circuit 2006 via an external hardware module 2010. The hardware module 2010 may include a cable 2009 connected with the device 2001 and a USB cable connected with the USB charging port 2008. The external hardware 2010 may include a processor and a memory storing computer instructions thereon. The computer instructions stored on the external hardware may be configured to modify the firmware stored on the first memory of the logic circuit 2006.

A system and method for wirelessly updating firmware is described in more detail below. Unless otherwise specified below, the logic circuit 2106 described in more detail below may be substantially the same as the logic circuit 2006 described in more detail above, and thus duplicative descriptions may be omitted below. Unless otherwise specified below, the device 2101 described in more detail below may be substantially the same as the device 2001 described in more detail above, and thus duplicative descriptions may be omitted below.

Referring to FIG. 21, according to an aspect of the present disclosure, a system for wirelessly modifying firmware includes a USB receptacle having a logic circuit 2106 including at least one power delivery (PD) controller integrated circuit (IC) 2107. The logic circuit 2106 has a first memory storing firmware configured to control the logic circuit 2106. The logic circuit 2106 has a first wireless antenna 2111. The firmware stored on the first memory of the logic circuit 2106 is modified by communicably coupling a device 2101 to the logic circuit through a wireless connection 2105. The device 2101 has a second wireless antenna 2110 configured to communicate with the first wireless antenna 2111 of the logic circuit 2106. The device 2101 has a processor and a second memory storing computer instructions configured to modify the firmware stored on the first memory of the logic circuit 2106. The firmware stored on the first memory of the logic circuit 2106 is modified by wirelessly transmitting computer instructions from the device 2101 to the logic circuit 2106.

According to an aspect of the present disclosure, the USB receptacle including the logic circuit 2106 may also include a USB charging port 2108 in communication with the logic circuit 2106. The device 2101 may include a device operating system 2103 configured to control the functionality of the device 2101 and may include hardware (e.g., Type-C controller hardware) 2104 configured to interface with and control a transfer of a firmware modification from the device 2101 to the logic circuit 2106.

According to an aspect of the present disclosure, the first wireless antenna 2111 of the logic circuit 2106 may communicate with the second wireless antenna 2110 of the device 2101 through a Bluetooth or WiFi signal. Thus, the wireless antennas described herein may be Bluetooth and/or WiFi capable wireless antennas. Alternatively, the wireless antennas described herein may communicate with a cellular communication network and may pull down firmware updates from the cloud and modify the firmware of the logic circuit 2106 using a firmware modification pulled down from the cloud and transferred to the logic circuit 2106.

According to an aspect of the present disclosure, the device 2101 may be a Smartphone, a USB drive, a Tablet, or a computer. The device may have a USB firmware update application 2102 thereon. The firmware update application 2102 is configured to modify the firmware stored on the first memory of the logic circuit 2106. Thus, the firmware of the logic circuit 2106 may be updated wirelessly without a connection with a USB port in communication with the logic circuit 2106.

Figure 22:
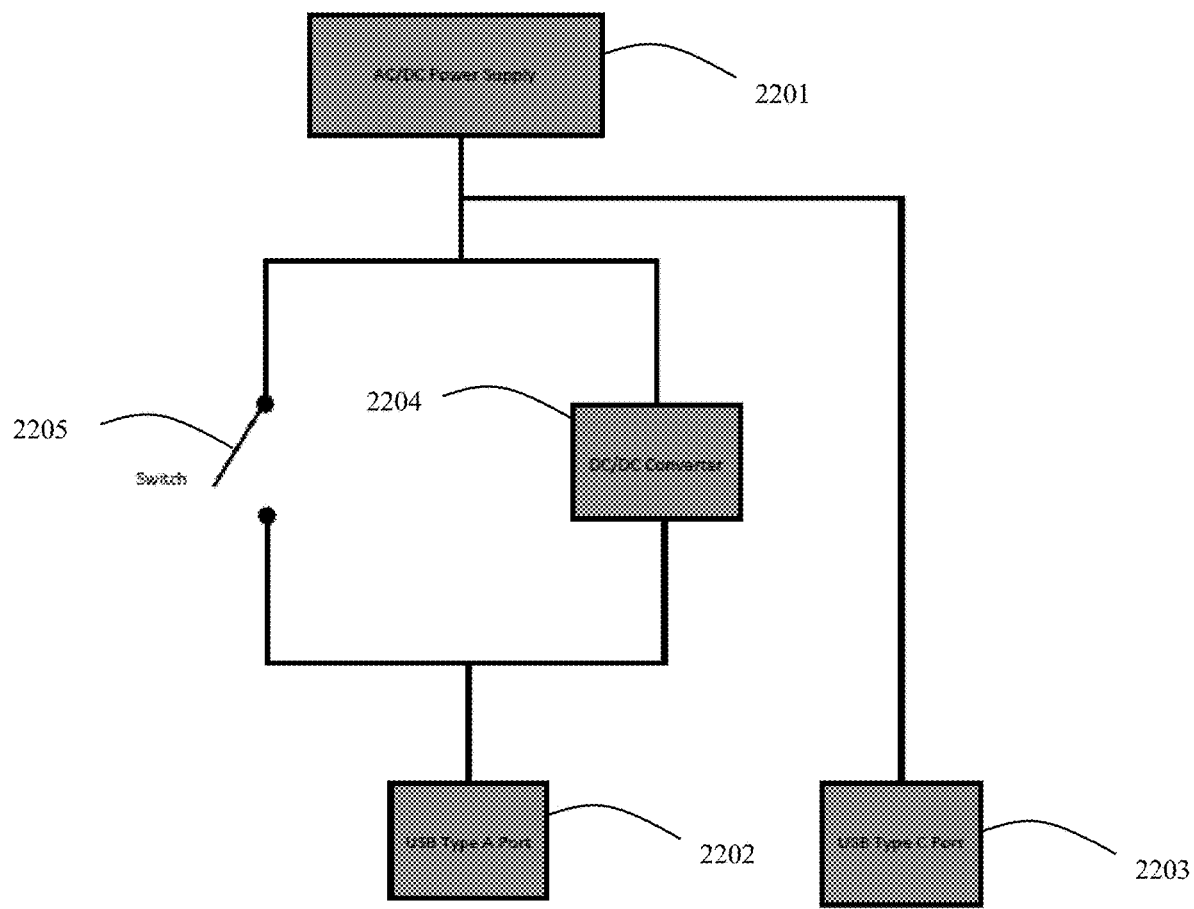
FIG. 22 is a block diagram of a USB Type-A charging port, a USB Type-C charging port, a single AC-DC power supply and a single voltage regulator in accordance with an exemplary embodiment of the disclosure.

FIG. 22 is a block diagram of a USB Type-A charging port, a USB Type-C charging port, a single AC-DC power supply and a single voltage regulator in accordance with an exemplary embodiment of the disclosure.

FIG. 22 depicts a relatively high power USB charger receptacle (e.g., with an AC-DC power supply providing an output voltage of greater than 5 volts) with the ability to charge devices with multiple output voltages through a USB Type-A port or a USB Type-C port. The USB Type-C port will meet the USB PD specification and be used to charge devices at multiple output voltages for an output voltage of relatively high power (e.g., above 5 volts and as high as substantially 20 volts). As an example, a constant 5 volt output voltage may be provided by the USB Type-A port, while a higher output voltage is provided by the USB Type-C port.

Referring to FIG. 22, according to an aspect of the present disclosure, a USB charging system includes an AC-DC power supply 2201 configured to output a plurality of output voltages. A USB Type-A charging port 2202 is electrically connected with the AC-DC power supply 2201. The USB Type-A charging port 2202 is configured to provide a first output voltage to a first electronic device. A USB Type-C charging port 2203 is electrically connected with the AC-DC power supply 2201. The USB Type-C charging port 2203 is configured to provide a second output voltage to a second electronic device. A voltage regulator 2204 is electrically connected with the AC-DC power supply 2201 and the USB Type-A charging port 2202. The voltage regulator 2204 is configured to maintain the first output voltage provided by the USB Type-A charging port 2202. A switch 2205 is electrically connected with the AC-DC power supply 2201 and the USB Type-A charging port 2202. The switch 2205 is configured to bypass the voltage regulator 2204. A logic circuit (see, e.g., FIG. 13) is in electrical communication with the voltage regulator 2204 and the switch 2205. The logic circuit is configured to enable or disable the voltage regulator 2204 by opening or closing the switch 2205.

According to an aspect of the present disclosure, each respective electronic device connected with each respective charging port (e.g., ports 2202 or 2203) may receive a different output voltage. Voltages of the plurality of output voltages may range from substantially 5 volts to substantially 20 volts.

According to an aspect of the present disclosure, the first output voltage may be a fixed output voltage (e.g., 5 volts), and the second output voltage may be a variable output voltage (e.g. a voltage of from above 5 volts to substantially 20 volts). The variable output voltage may be determined by the electronic device connected with the USB Type-C port 2203.

According to an aspect of the present disclosure, the voltage regulator may be a linear voltage regulator or a DC-DC converter.

Figure 24:
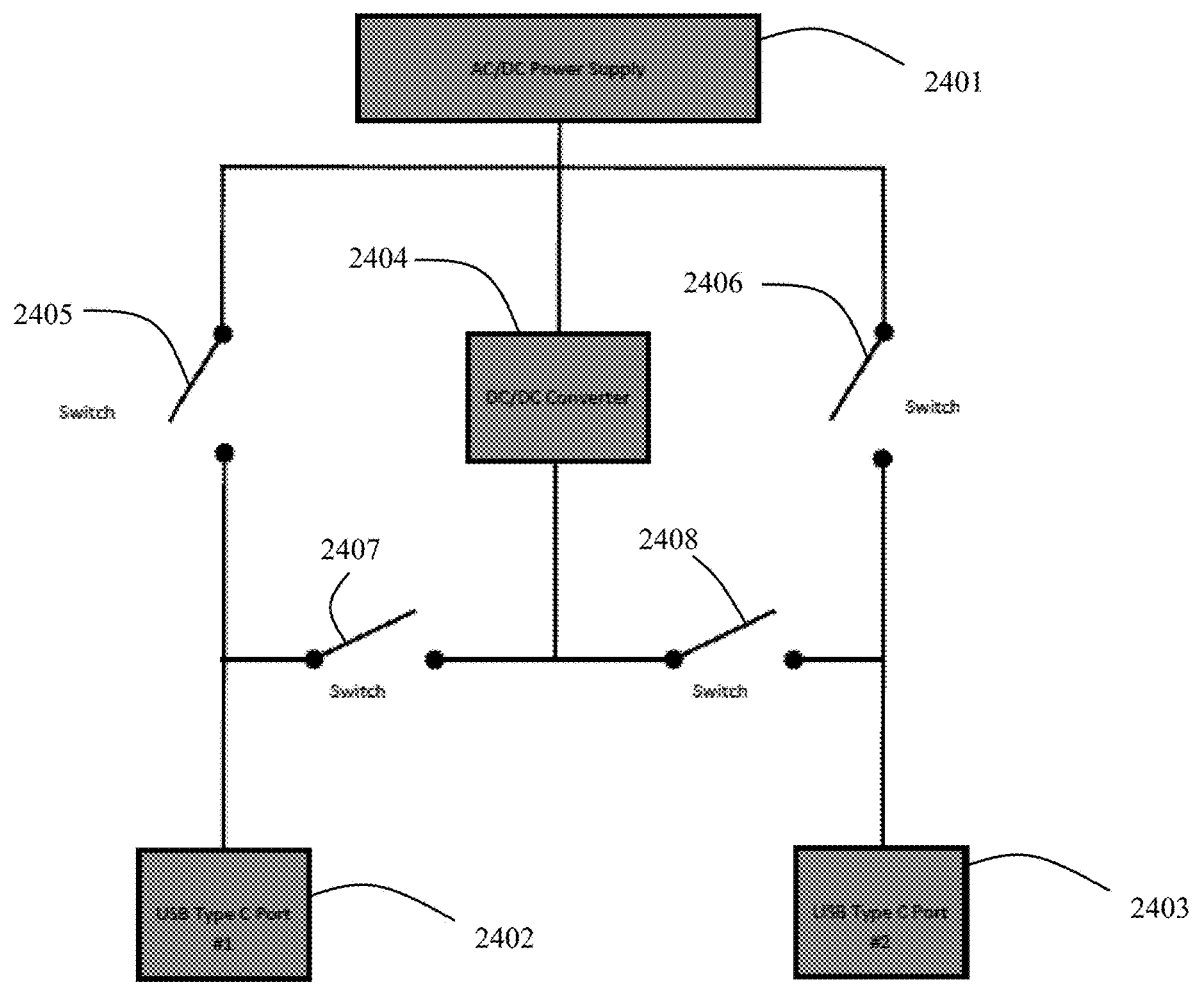
FIG. 24 is a block diagram of two USB Type-C charging ports and a single voltage regulator in accordance with an exemplary embodiment of the disclosure.
Figure 25:
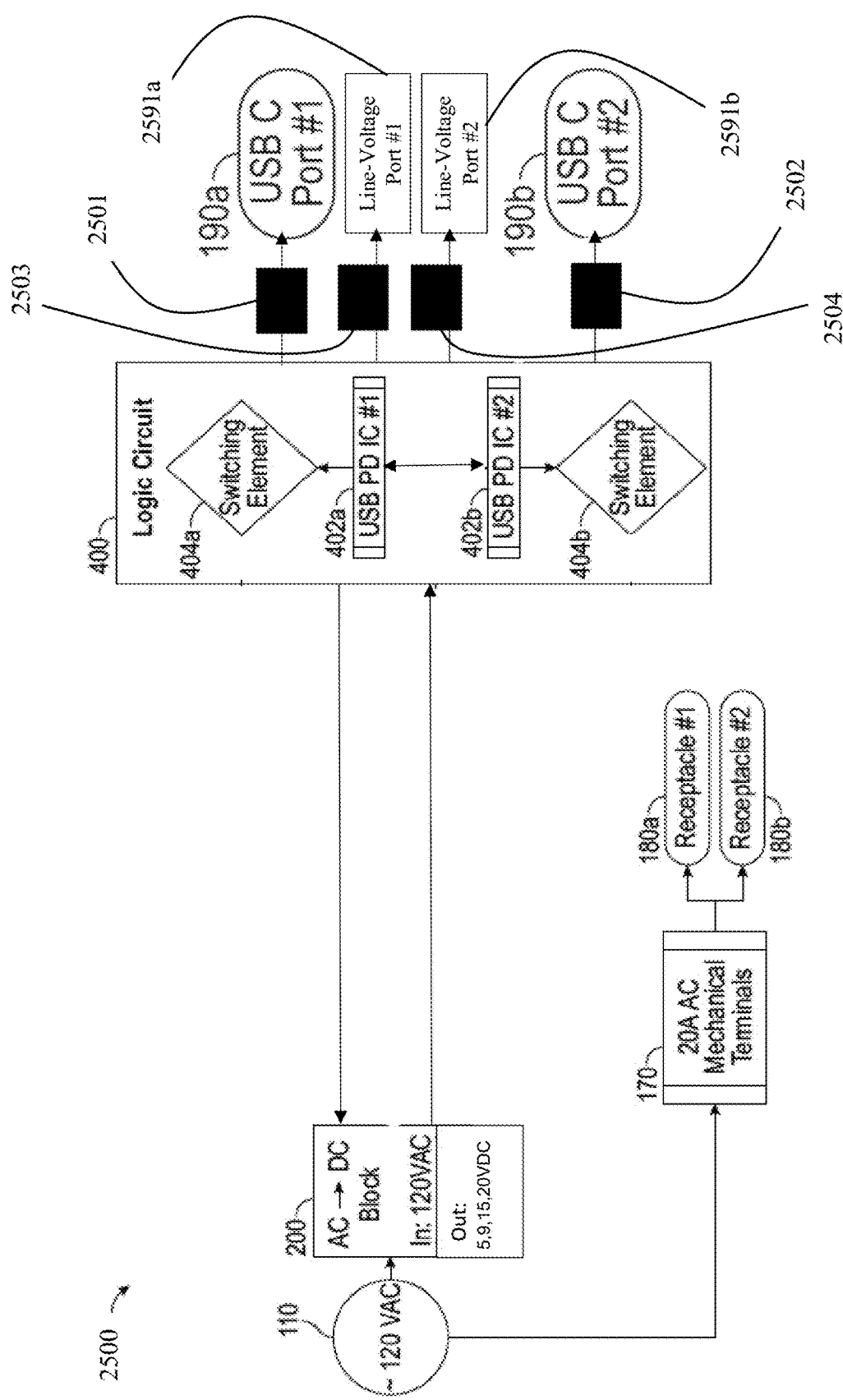
FIG. 25 depicts a block diagram of a USB power delivery system architecture including a logic circuit configured to regulate a temperature of a plurality of charging ports in accordance with an exemplary embodiment of the disclosure.
Figure 26:
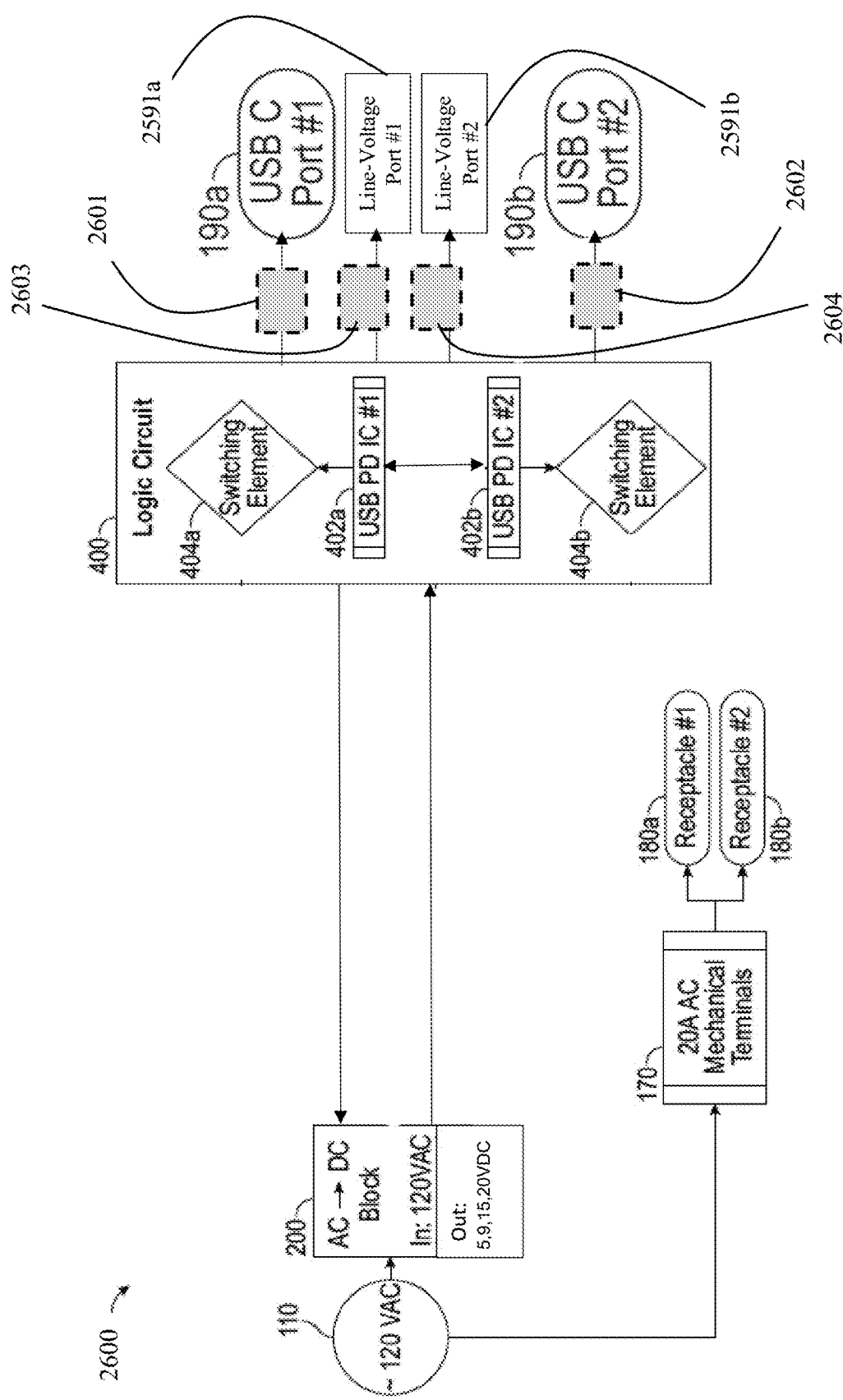
FIG. 26 depicts a block diagram of a USB power delivery system architecture including a logic circuit configured to detect a flow of current and regulate a temperature of a plurality of charging ports in accordance with an exemplary embodiment of the disclosure.

FIG. 24 is a block diagram of two USB Type-C charging ports and a single voltage regulator in accordance with an exemplary embodiment of the disclosure.

FIG. 24 depicts two independent voltage USB Type-C ports with a single DC-DC converter stage. This will allow the AC to DC power supply output voltage to be higher than the output voltage of one of the USB ports. The AC to DC power supply will be connected to a voltage regulator (e.g., a DC to DC converter or a linear voltage regulator) and one or more switches to the USB ports. This will allow the receptacle to have two different DC charging voltages at the same time. The DC to DC converter or linear voltage regulator and the switches will be controlled by the same microcontroller to verify that there is never more than the safe charging voltage at the USB port. The microcontroller will also verify that the receptacle will never advertise a higher charging power than the AC to DC power supply can provide. While two USB Type-C charging ports are illustrated and described, exemplary embodiments of the present disclosure are not limited thereto, and additional charging ports may be employed.

Referring to FIG. 24, according to an aspect of the present disclosure, a USB charging system includes an AC-DC power supply 2401 configured to output a plurality of output voltages. A first USB Type-C charging port 2402 is electrically connected with the AC-DC power supply 2401. The first USB Type-C charging port 2402 is configured to provide a first output voltage to a first electronic device. A second USB Type-C charging port 2403 is electrically connected with the AC-DC power supply 2401. The second USB Type-C charging port 2403 is configured to provide a second output voltage to a second electronic device. A voltage regulator 2404 is electrically connected with the AC-DC power supply 2401 and the first or second USB Type-C charging ports 2402 or 2403. The voltage regulator 2404 is configured to regulate the first or second output voltages of the first or second USB Type-C charging ports 2402 or 2403. A first switch 2405 is electrically connected with the AC-DC power supply 2401 and the first USB Type-C charging port 2402. The first switch 2405 is configured to bypass the voltage regulator 2404. A second switch 2406 is electrically connected with the AC-DC power supply 2401 and the second USB Type-C charging port 2403. The second switch 2406 is configured to bypass the voltage regulator 2404. A logic circuit (see, e.g., FIG. 13) is in electrical communication with the voltage regulator 2404 and the first and second switches 2405 and 2406. The logic circuit is configured to enable or disable the voltage regulator 2404 by opening or closing the first or second switches 2405 or 2406.

According to an aspect of the present disclosure, a third switch 2407 may be electrically connected with the AC-DC power supply 2401 and the first USB Type-C charging port 2402. The third switch 2407 may be configured to activate the voltage regulator 2404. A fourth switch 2408 may be electrically connected with the AC-DC power supply 2401 and the second USB Type-C charging port 2403. The fourth switch 2408 may be configured to activate the voltage regulator 2404.

According to an aspect of the present disclosure, each of the first, second, third and fourth switches 2405-2408 may be configured to be individually enabled or disabled by the logic circuit.

Figure 23:
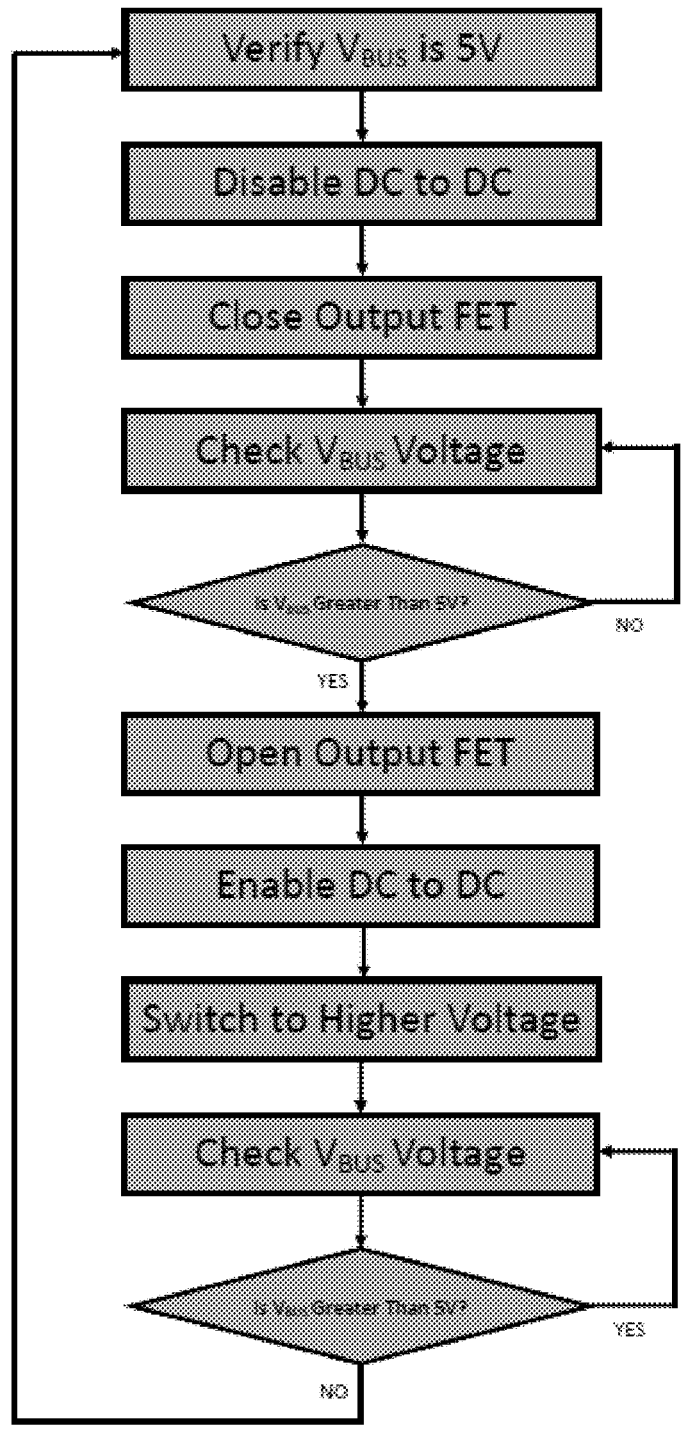
FIG. 23 is a flowchart of an exemplary algorithm employed by a logic circuit of the USB charging systems of FIGS. 22 and 24.

FIG. 23 is a flowchart of an exemplary algorithm employed by a logic circuit of the USB charging systems of FIGS. 22 and 24.

Referring to FIG. 23, an exemplary software flow chart for control of the USB Type A and Type C ports with independent voltages is illustrated. Independent voltages may be achieved by providing a DC-DC converter parallel to a pass-through switch. When the voltage at the output of power supply is greater than 5V (safe limit for Type-A), the DC-DC converter is used to convert the higher voltage to 5V for the Type-A port. If voltage at the output of power supply is 5V, then the pass-through switch is used to supply 5V to USB Type A.

Referring again to FIG. 17, and to FIGS. 25-28, USB charging systems 2500, 2600, 2700 and 2800 are described. The USB charging systems 2500, 2600, 2700 and 2800 may be substantially the same as the USB charging systems 1300 or 1700 described in more detail above unless otherwise indicated, and thus duplicative descriptions may be omitted below.

According to an aspect of the present disclosure, the logic circuit 400 is configured to regulate a wattage delivered to two or more charging ports of the plurality of charging ports (e.g., any of USB charging ports 190a and/or 190b, and/or additional charging ports having substantially the same configuration). The plurality of charging ports described herein may include a USB Type-A port, or a USB Type-C port, or a Line-Voltage port (2591a and/or 2591) in any desired combination. The logic circuit 400 is configured to detect a temperature of two or more charging ports of the plurality of charging ports. The logic circuit 400 is configured to reduce a wattage delivered to a particular charging port of the plurality of charging ports if a temperature detected in the particular charging port of the plurality of charging ports exceeds a predetermined threshold. The logic circuit 400 may be in electrical communication with any of thermistors 2501, 2502, 2503 and/or 2504. The thermistors are configured to detect a temperature of each charging port and communicate the detected temperature to the logic circuit 400. The thermistors 2501, 2502, 2503 and 2504 may be substantially the same as the thermistors (e.g., thermistor 1701 or thermistor 1702) described above with reference to FIG. 17 unless otherwise indicated, and thus duplicative descriptions may be omitted herein. Instead of thermistors, any suitable temperature sensors may be used, non-limiting examples of which are thermocouples, resistance temperature detectors (RTDs), silicon bandgap temperature sensors. Additionally, a temperature sensor may be integral to one or more integrated circuit chips, controllers, logic circuits, or the like.

As an example, a maximum wattage deliverable to each charging port of the plurality of charging ports is at least 30 watts. Thus, a wattage in excess of 30 watts may be applied to one or more of the charging ports to relatively rapidly charge an electronic device connected with a particular charging port. The systems and methods described herein allow for an increased wattage to be applied (e.g., in excess of 30 watts) to reduce a charging time of an electronic device, while also dynamically reducing the wattage applied for some periods of time to maintain a desired temperature at the charging port. This allows a connected electronic device to be charged in a minimal amount of time, while also regulating a temperature of the corresponding charging port (e.g., to prevent overheating or exceeding a permitted temperature threshold). As described herein, reducing the power applied to charging port below 30 watts, but above 0 watts, allows the electronic device to be charged at a reduced rate, while allowing the temperature of the corresponding charging port to be reduced. As described herein, the temperature of a particular charging port may be reduced through passive and/or active processes. For example, passive cooling may be employed by using a thermally conductive housing, and active cooling may be employed by using a fan configured to blow air within, or exhaust from, a charging system described herein.

According to an aspect of the present disclosure, the thermistors 2501, 2502, 2503 and 2504 are each configured to collect temperature data for the USB charging system (e.g., USB charging systems 2500, 2600, 2700 or 2800) and communicate the temperature data to the logic circuit 400.

The logic circuit 400 may control a combination of USB Type C ports (e.g., 2 USB Type C Ports 190a, 190b, as illustrated), Line-Voltage Ports (e.g., 2 Line-Voltage Ports 2591a, 2591b), and/or USB Type A ports (not shown).

As an example, 30 watts may be provided to one or more of the USB Type C ports (e.g., an output voltage of 5 Volts (direct current DC) at a current of 6 Amps provides 30 Watts). However, power greater than 30 watts may be provided to one or more of the USB Type C ports (e.g., by increasing the output voltage above 5 Volts, or the current above 6 Amps).

According to an aspect of the present disclosure, the logic circuit 400 is configured to detect a current drawn by two or more charging ports of the plurality of charging ports. The logic circuit 400 is configured to reduce a current drawn by a particular charging port of the plurality of charging ports if a temperature determined in the particular charging port of the plurality of charging ports exceeds a predetermined threshold. Detecting a current drawn by two or more charging ports may be performed as an alternative method to determining a temperature of two or more charging ports, or may be employed simultaneously with directly measuring a temperature of each charging port. The current drawn by each charging port may be determined using current sensors 2601, 2602, 2603 and/or 2604. The current sensors are each in electrical communication with the logic circuit 400. Each charging port may be connected with both a thermistor and a current sensor.

As an example, each of the current sensors 2601, 2602, 2603 and 2604 may be a coil (e.g. a toroid coil), Hall Effect sensor, or a voltage over a known resistance (e.g. a shunt).

Figure 27:
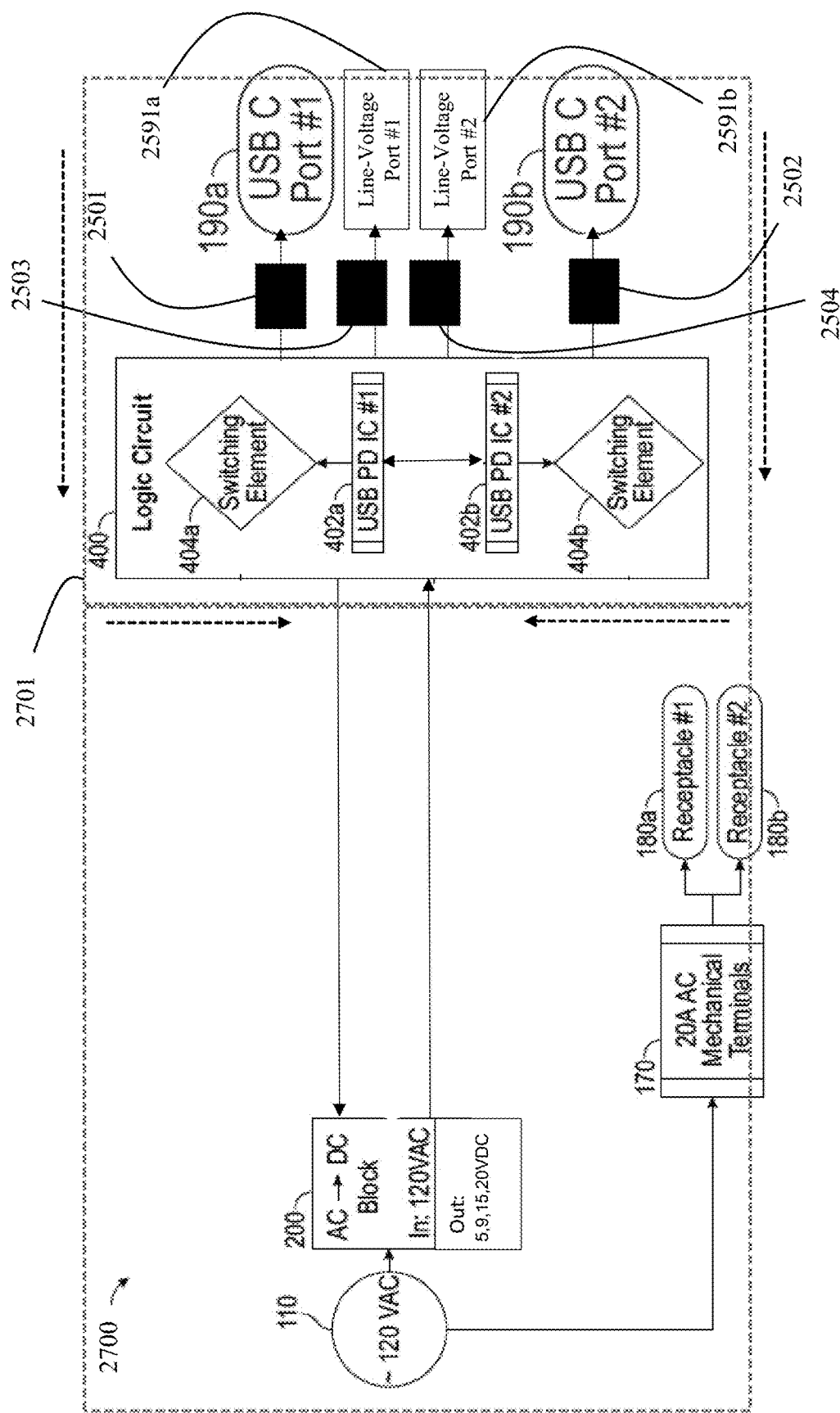
FIG. 27 depicts a block diagram of a USB power delivery system architecture including a logic circuit configured to regulate a temperature of a plurality of charging ports, and a thermally conductive housing in accordance with an exemplary embodiment of the disclosure.
Figure 28:
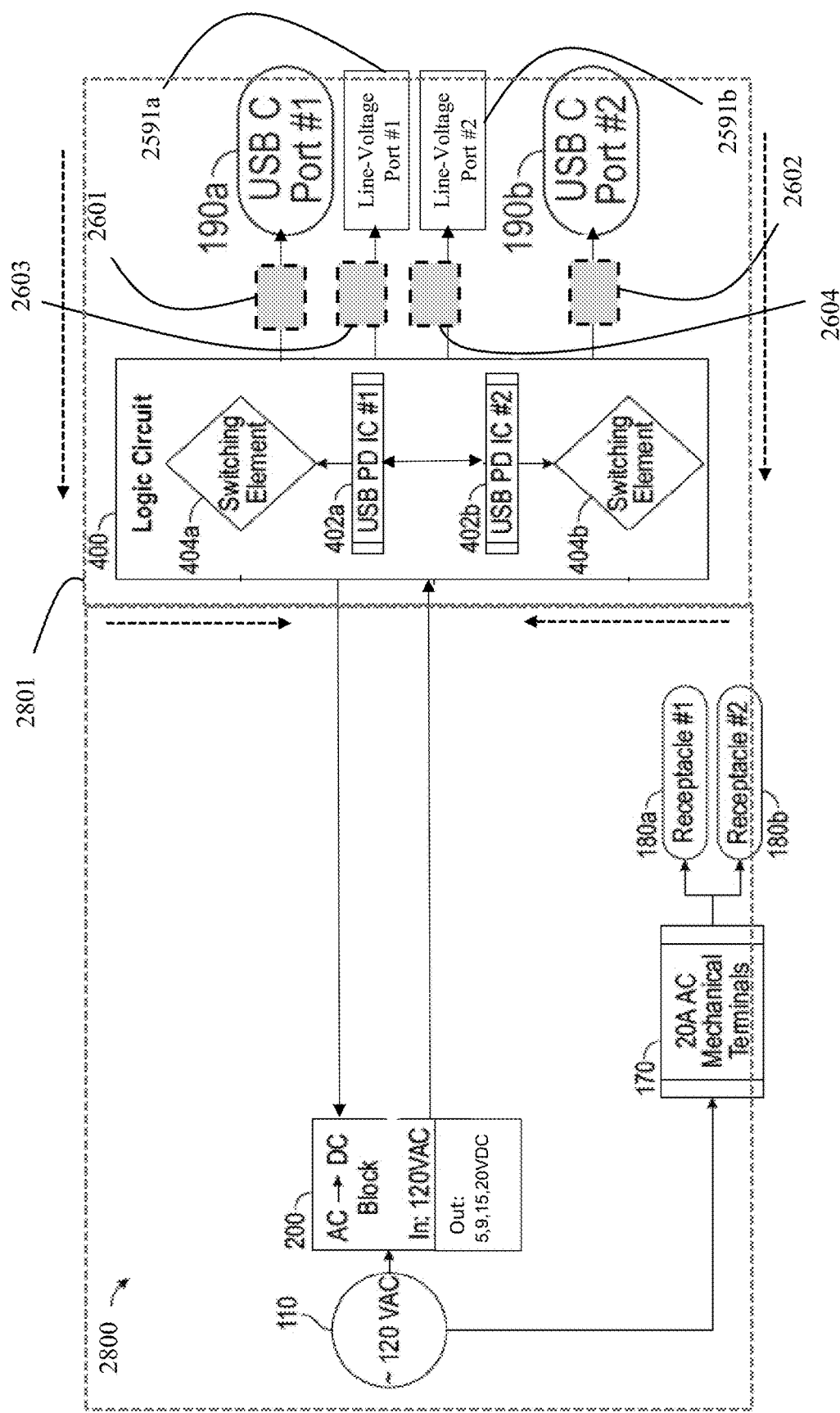
FIG. 28 depicts a block diagram of a USB power delivery system architecture including a logic circuit configured to detect a flow of current and regulate a temperature of a plurality of charging ports, and a thermally conductive housing in accordance with an exemplary embodiment of the disclosure.
Figure 29:
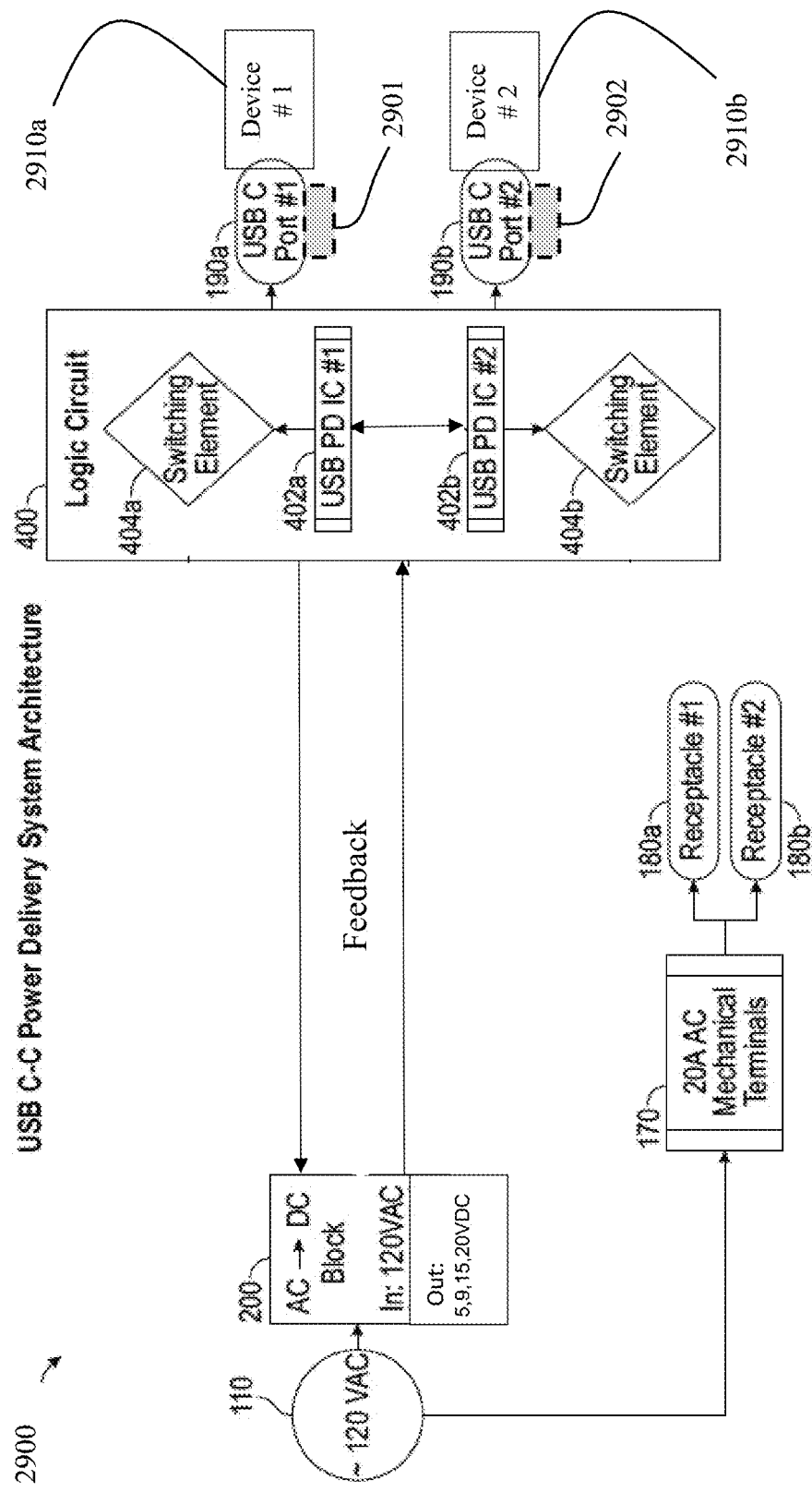
FIG. 29 depicts a block diagram of a USB power delivery system architecture including a logic circuit configured to regulate wattages delivered to electronic devices connected with each of a plurality of charging ports in accordance with an exemplary embodiment of the disclosure.
Figure 30:
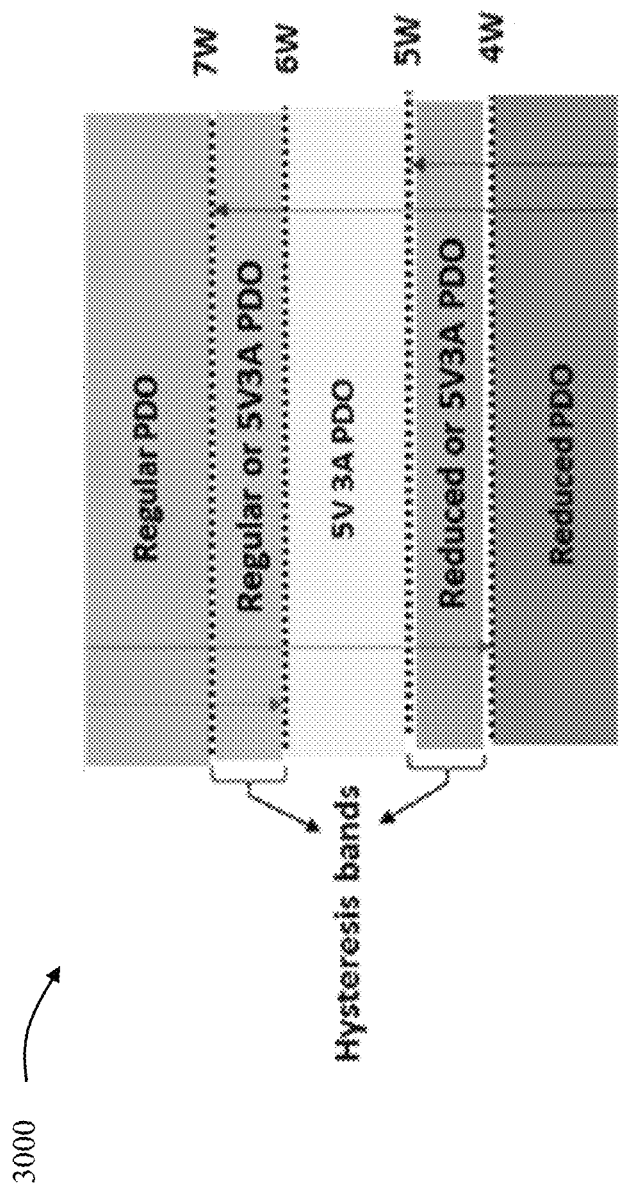
FIG. 30 depicts exemplary hysteresis bands in accordance with aspects of the present disclosure.
Figure 31A:
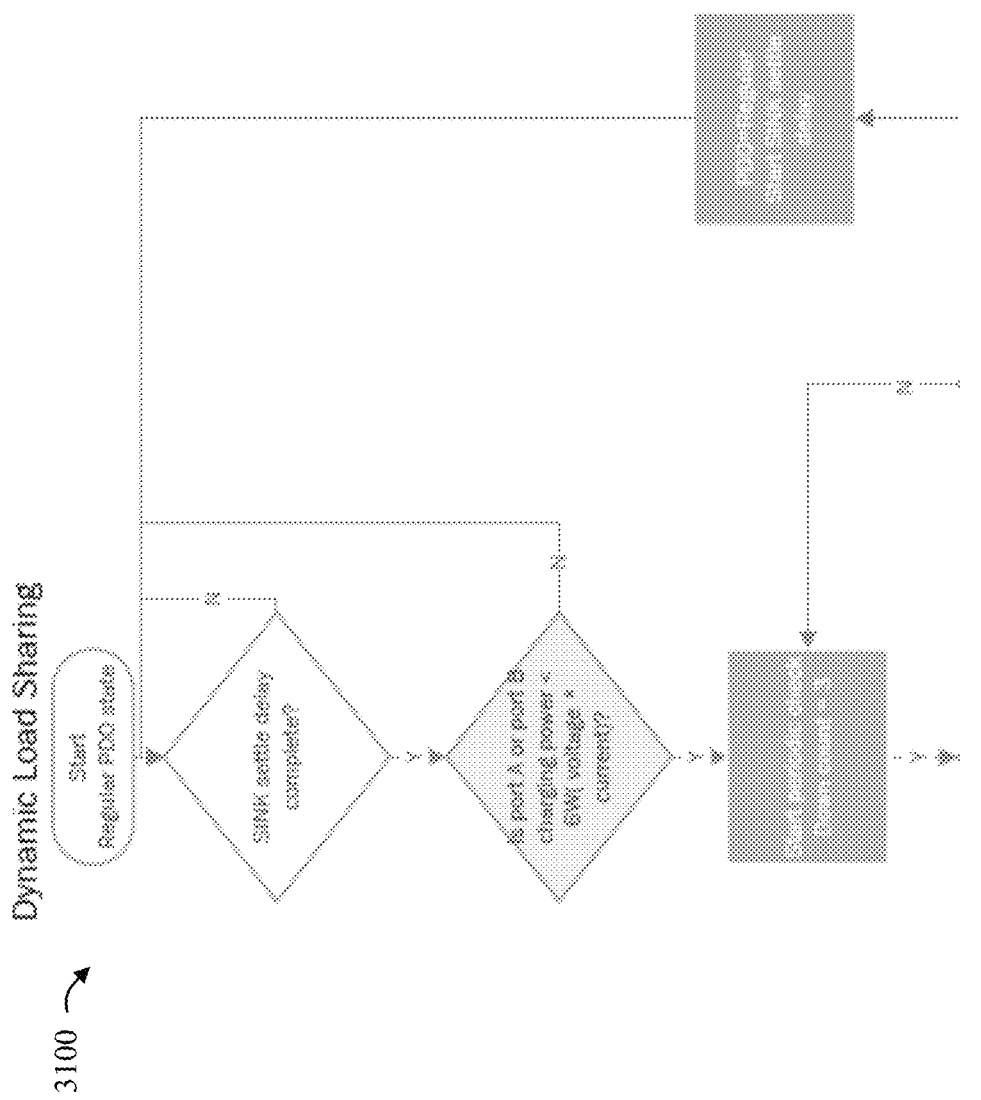
FIGS. 31A, 31B, 31C, 31D and 31E depict an exemplary algorithm employable by a USB power receptacle for dynamic load sharing.
Figure 31B:
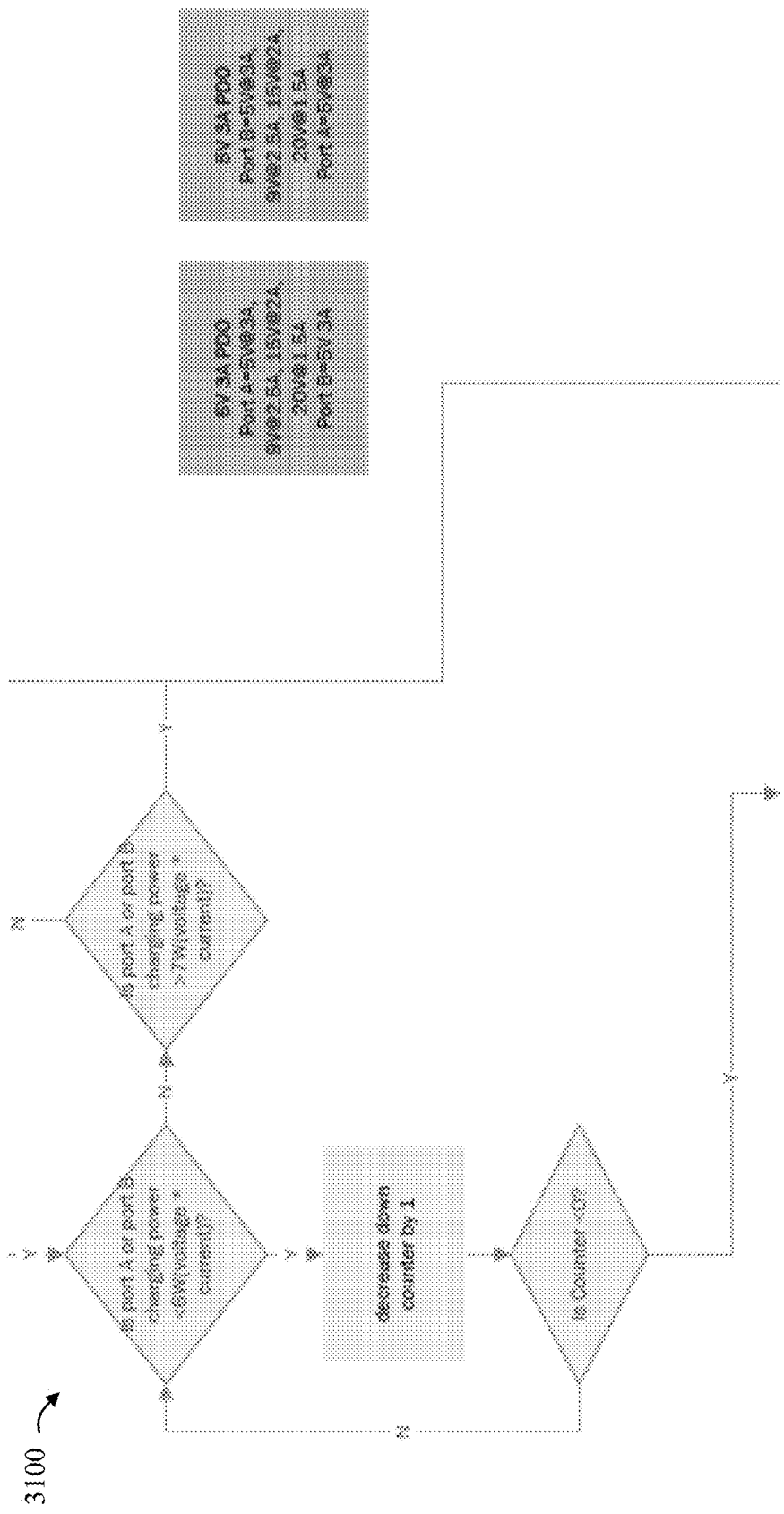
Figure 31C:
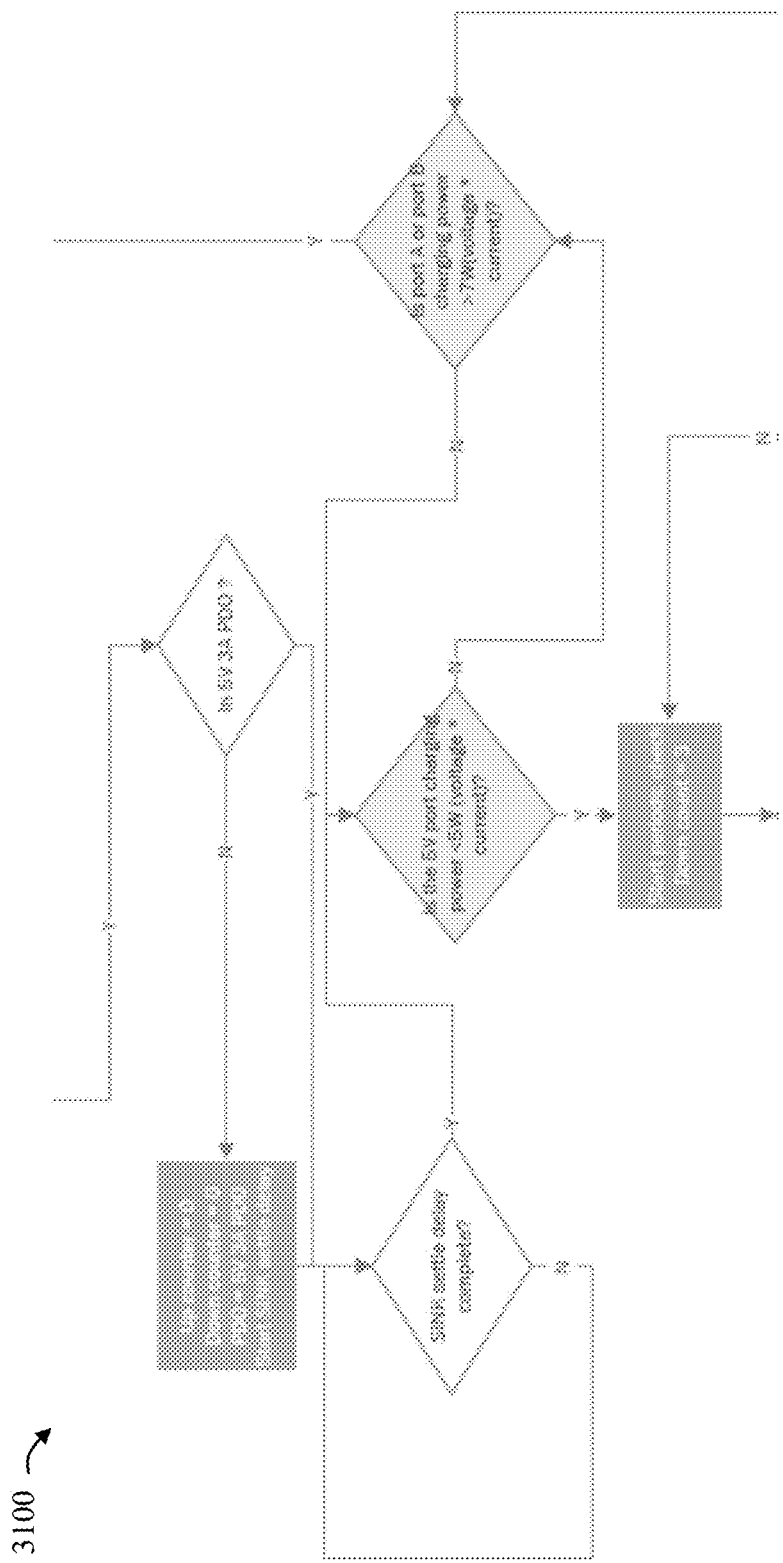
Figure 31D:
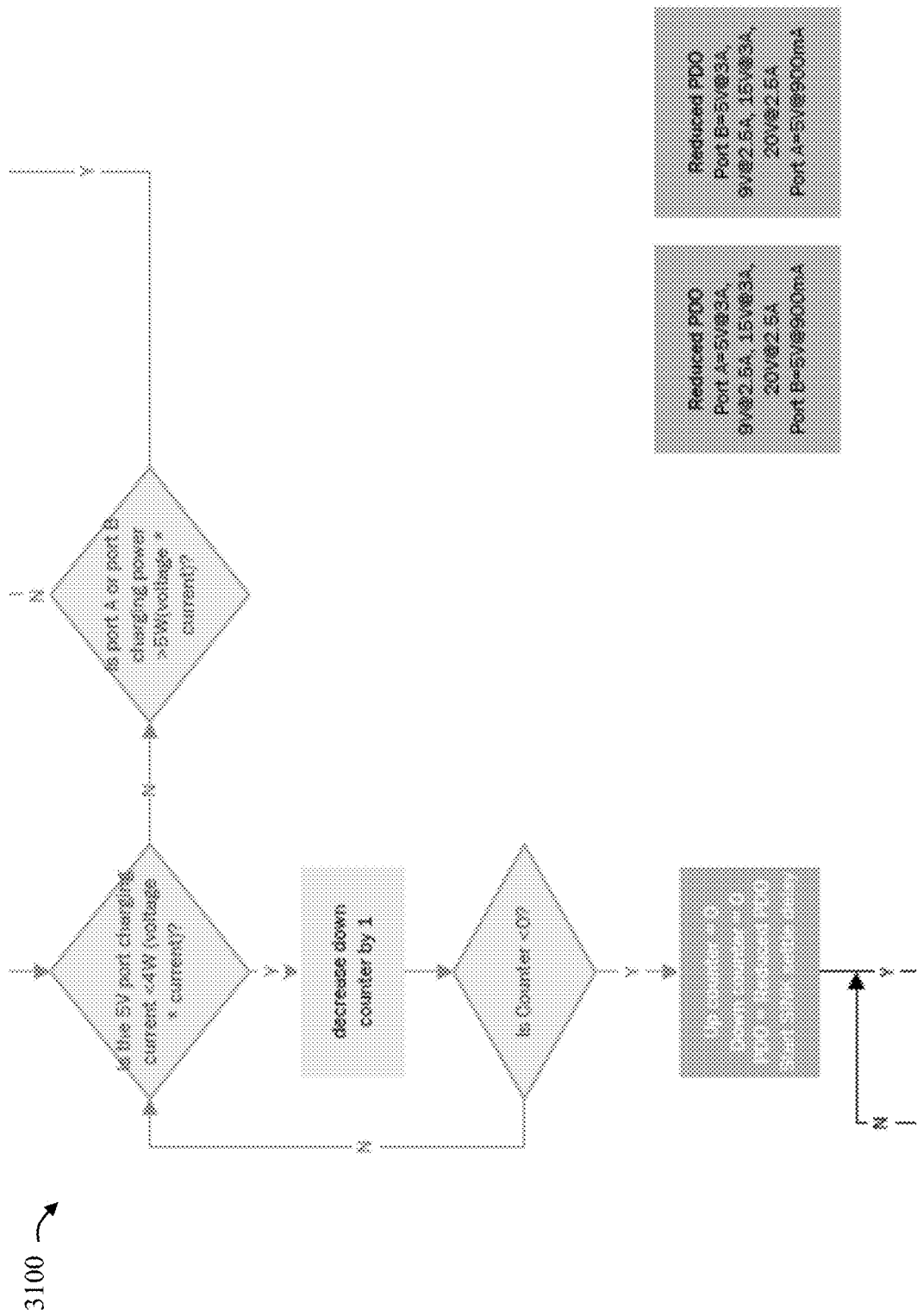
Figure 31E:
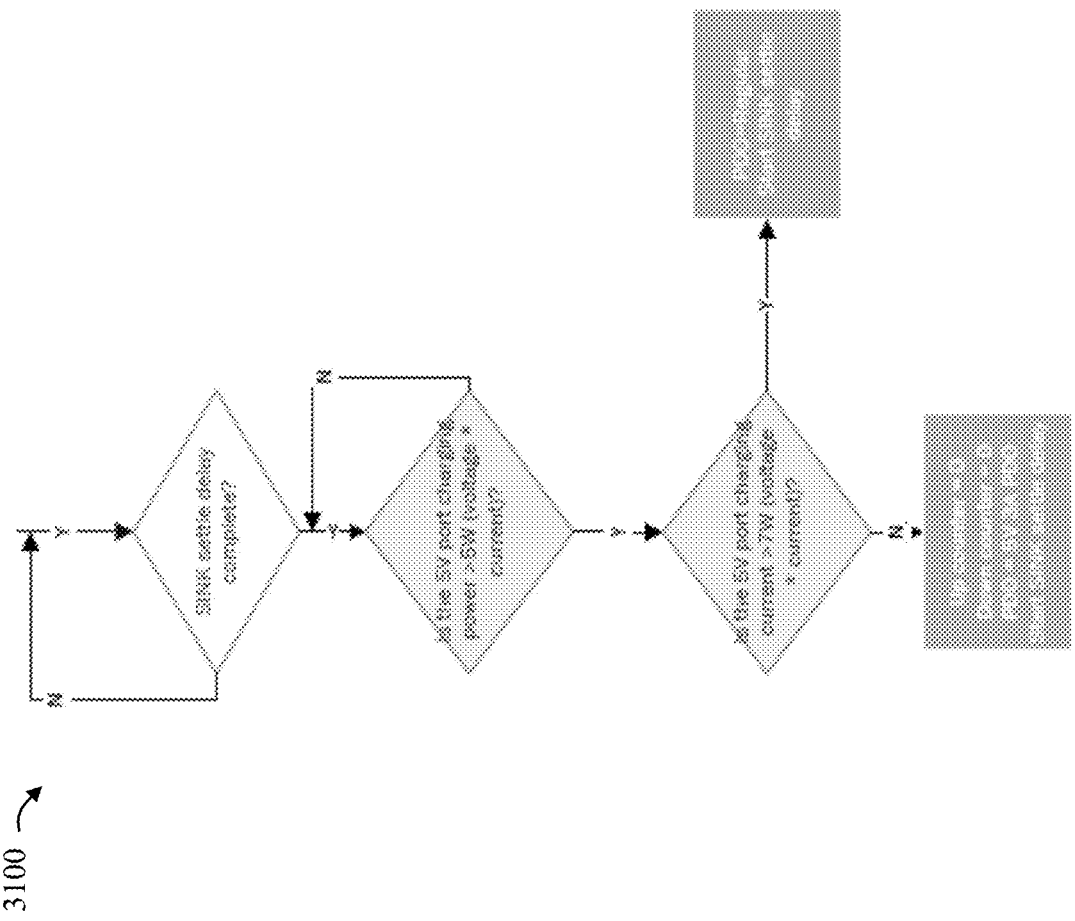

Referring particularly to FIGS. 27-28, a thermally conductive housing (e.g., thermally conductive housing 2701 or 2801) is in thermal contact with the plurality of charging ports. The thermally conductive housing is configured to transfer heat away from the charging ports of the plurality of charging ports to reduce a temperature of the charging ports of the plurality of charging ports.

According to an aspect of the present disclosure, the thermally conductive housing includes a metal or other high thermal conductivity material. The thermally conductive housing can passively transfer heat along a desired direction through conduction and/or convection. As an example, heat may be transferred through a metal housing initially through conduction and subsequently through convection.

As an example, the thermally conductive housing may have a molecular structure arranged to draw heat (e.g., to passively draw heat) along the directional arrows illustrated in FIGS. 27-28. The molecular structure of the thermally conductive housing may draw heat along a path of least resistance away from the charging ports to reduce the temperature of the charging ports. For example, a combination of metals having different thermal conductivity characteristics may be included in the thermally conductive housing to control a path of least resistance along which heat generated in at least one charging part can be passively transferred. A combination of copper, aluminum, brass, steel and/or bronze may be included in the thermally conductive housing. Additionally, the thermally conductive housing may draw heat along a plurality of paths according to the relative thermal resistance of each of such paths.

Referring to FIGS. 29, 30, and 31A to 31E, a USB charging system 2900 and method for dynamic load sharing is described. The USB charging system 2900 can be employed to dynamically charge multiple electronic devices (e.g., two electronic devices 2910a and 2910b) at relatively high wattage (e.g., at 60 watts of combined total output) to reduce an amount of overall time for charging the multiple electronic devices by allocating power to the device in need of more power to reach a full charge. The systems and methods described with reference to FIGS. 29, 30, and 31A to 31 are deployable as firmware of a USB charging receptacle (e.g., a 60 watt USB charging device) having at least two dynamically controlled USB charging ports (e.g., USB Type-C charging ports). While a 60 watt USB charging system is described as an example, the systems and methods described herein are similarly applicable to USB charging systems above or below 60 watts.

When electronic devices 2910a and 2910b are respectively connected with and charging via first and second USB charging ports 190a and 190b and one device reaches its maximum state of charge (SoC), the current supplied to that one device is reduced and the current supplied to the other device is increased. Thus, the device that is yet to reach its maximum SoC when another device has already reached its maximum SoC gets to charge faster thus reducing an overall charging time for multiple electronic devices.

According to an aspect of the present disclosure, the logic circuit 400 is configured to monitor a state of charge of devices 2910a and 2910b connected with charging ports 190a and 190b, respectively. The logic circuit 400 is configured to dynamically regulate a wattage delivered each of devices 2910a and 2910b. As an example, a maximum combined wattage deliverable to the first and second charging ports 190a and 190b is about 60 watts.

The logic circuit 400 is configured to reduce a wattage delivered to first charging port 190a when a state of charge of the first device 2910a connected with the first charging port 190a exceeds a predetermined threshold (e.g., when a maximum state of charge or a near maximum state of charge is reached). The logic circuit 400 is configured to increase a wattage delivered to the second device 2910b connected with the second charging port 190b when the state of the charge of the first device 2910a exceeds the predetermined threshold.

After a reduction/increase in supplied current, new power delivery outputs (PDOs) are advertised to ports 190a and 190b depending on the output current/power of ports 190a and 190b. Thus, there is no need to disconnect/reconnect any device to advertise new PDOs to ports 190a or 190b. In both ports 190a, 190b charging voltages and currents are changed (by advertising new PDOs) based on measuring the SoC of the electronic devices connected in real time. An exemplary algorithm for implementing dynamic load sharing in USB charging system 2900 is described in more detail below with reference to FIGS. 30 and 31A to 31E.

As an example, a reduced wattage delivered to the first device 2910a connected with the first charging port 190a is maintained at an above-zero level, by the logic circuit 400, when the state of charge of the first device 2910a is below a maximum state of charge for the first device 2910a. Thus, a minimal wattage may be applied to the first charging port 190a, while a significantly higher wattage is applied to the second charging port 190b, or the reverse may be applied if second device 2910b reaches the predetermined charging threshold (e.g., the maximum state of charge of the second device 2910b) before the first device 2910a. This process allows a nearly charged device to continue charging while a second device at a lower level of charge is charged at a faster rate, thus reducing an overall amount of time needed to charge two devices.

Alternatively, the reduced wattage delivered to the first device 2910a connected with the first charging port 190a can be maintained at 0 watts, by the logic circuit 400, when the state of charge of the first device 2910a reaches the maximum state of charge for the first device 2910a. Thus, in this scenario the increased wattage delivered to the second device 2910b is maintained at about 60 watts by the logic circuit 400.

According to an aspect of the present disclosure, a first current sensor 2901 in electrical communication with the logic circuit 400 is connected with the first charging port 190a. A second current sensor 2902 in electrical communication with the logic circuit 400 is connected with the second charging port 190b. The first current sensor 2901 communicates data of a first load current in the first current sensor 2901 to the logic circuit 400. The second current sensor 2902 communicates data of a second load current in the second current sensor 2902 to the logic circuit 400. Thus, the logic circuit 400 can continuously receive data of a current received in the first and second charging ports 190a and 190b (e.g., in real-time). Alternatively, the logic circuit 400 can periodically receive data of a current received in the first and second charging ports 190a and 190b (e.g., by sampling).

Referring particularly to FIGS. 30 and 31A to 31E, an exemplary algorithm 3100 employing hysteresis bands 3000 is described. The algorithm described below can be employed by firmware of a USB charging receptacle, as described herein.

In an exemplary algorithm, three power delivery outputs (PDOs) can be advertised to each of two charging ports (see, e.g., USB ports 190a and 190b). The three PDOs that are advertised depend on load power consumed by a port nearing full charge (i.e., a "lower power port"). The difference between the 5V 3 A PDO and the regular PDO is that in 5V, 3 A PDO, the lower power port nearing full charge is always advertised with only the 5V, 3 A PDO whereas in the regular PDO, both the ports are advertised with at least one PDO other than 5V, 3A.

If at least one port is charging at 5V, 3 A, then the corresponding device connected with that port is already in the 5V, 3 A PDO state. The other states where both electronic devices get charged at identical voltages (other than 5V) are regular PDO states.

When an electronic device connected with a charging port is operating in a regular PDO state, the firmware checks periodically if the power consumed by one of the ports is less than 6 W. If this proposition is true, then a counter is initialized to 3 and is decremented. If this proposition is false, then the counter is reinitialized to 3. If the counter equals 0 then the lower power port is advertised only with 5V, 3 A PDO. If the higher power port is charging at 20V, 1.5 A, then it get advertised with 15V, 2 A, 9V, 2.5 A and 5V, 3 A PDOs. If the higher power port is charging at "x" V(x=15V, 9V or 5V) then it is re-advertised with "x" V PDO and 5V, 3 A PDO. This condition is referred to as a 5V, 3 A condition.

In the 5V, 3 A condition, the firmware checks at a predetermined rate if the lower power port is within two thresholds. (a). P(lower power port) >4 W and (b). P(lower power port) <7 W If the power P(lower power port)<4 W, then a counter is initialized to 3 and is decremented. If the counter equals 0, then the lower power port is advertised with 5V, 900 mA PDO. The higher power port is advertised with 20V, 1.5 A, 15V, 2 A, 9V, 2.5 A and 5V, 3A PDOs. This is referred to as Reduced PDO state. At the Reduced PDO state, the counter is reset to 0.

In the 5V, 3 A condition, if the Power P(lower power port) >7 W at least once, then converter is switched back to the regular PDO state. The counter is reset to 0.

In the Reduced PDO state, the firmware checks at a predetermined rate P(lower power port) >7 W at least once, then converter is switched back to the regular PDO state. The firmware also checks if Power P(lower power port) >5 W at least once, then converter is switched back to the 5V, 3 A state. The counter is reset to 0.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

The invention claimed is:

1. A universal serial bus (USB) charging system, comprising:
a power supply including a plurality of power converters connected electrically parallel to one another and a plurality of power supply outputs electrically coupled to the plurality of power converters, respectively, each of the plurality of power converters configured to convert an input voltage to a plurality of output voltages;
a plurality of charging ports electrically connected with the plurality of power supply outputs, respectively, each of the plurality of charging ports configured to provide an output voltage selected from the plurality of output voltages to an electronic device;
a temperature sensor; and
a logic circuit in electrical communication with the power supply and the plurality of charging ports, the logic circuit configured to provide direct feedback to the power supply to output a particular output voltage of the plurality of output voltages to the plurality of charging ports, the logic circuit configured to regulate a wattage delivered to two or more charging ports of the plurality of charging ports,
wherein the logic circuit is in electrical communication with the temperature sensor and the logic circuit is configured to detect a temperature of the two or more charging ports of the plurality of charging ports and reduce a wattage delivered to a particular charging port of the plurality of charging ports if a temperature detected in the particular charging port of the plurality of charging ports exceeds a predetermined threshold.

2. The USB charging system of claim 1, wherein a maximum wattage deliverable to each charging port of the plurality of charging ports is from about 1 watt to about 100 watts.

3. The USB charging system of clam 1, wherein the plurality of charging ports includes a USB Type-A port, or a USB Type-C port.

4. The USB charging system of claim 1, further including a thermistor connected with one or more of a first power delivery (PD) controller integrated circuit (IC) or a second PD controller IC of the logic circuit, the thermistor configured to transmit temperature data of the USB charging system thereto, the thermistor being in communication with a charging port of the plurality of charging ports.

5. The USB charging system of claim 1, wherein the reduced wattage delivered to the particular charging port of the plurality of charging ports is maintained at an above-zero level until a temperature of the particular charging port of the plurality of charging ports is reduced below a second predetermined threshold.

6. The USB charging system of claim 1, wherein a first power converter of the plurality of power converters is configured to simultaneously output a first output voltage different from a second output voltage output by a second power converter of the plurality of power converters.

7. The USB charging system of claim 1, wherein the logic circuit comprises a power delivery (PD) controller integrated circuit (IC) connected with a first charging port of the plurality of charging ports and a second charging port of the plurality of charging ports.

8. A universal serial bus (USB) charging system, comprising:
- a power supply including a plurality of power converters connected electrically parallel to one another and a plurality of power supply outputs electrically coupled to the plurality of power converters, respectively, each of the plurality of power converters configured to convert an input voltage to a plurality of output voltages;
- a plurality of charging ports electrically connected with the plurality of power supply outputs, respectively, each of the plurality of charging ports configured to provide an output voltage selected from the plurality of output voltages to an electronic device;
- a temperature sensor; and
- a logic circuit in electrical communication with the power supply and the plurality of charging ports, the logic circuit configured to provide direct feedback to the power supply to output a particular output voltage of the plurality of output voltages to the plurality of charging ports, the logic circuit configured to regulate a wattage delivered to two or more charging ports of the plurality of charging ports,
- wherein the logic circuit is in electrical communication with the temperature sensor and the logic circuit is configured to detect a current drawn by the two or more charging ports of the plurality of charging ports and reduce a current drawn by a particular charging port of the plurality of charging ports if a temperature detected in the particular charging port of the plurality of charging ports exceeds a predetermined threshold.

9. The USB charging system of claim 8, wherein a maximum wattage deliverable to each charging port of the plurality of charging ports is from about 1 watt to about 100 watts.

10. The USB charging system of clam 8, wherein the plurality of charging ports includes a USB Type-A port, a USB Type-C port, or a Line-Voltage port.

11. The USB charging system of claim 8, further including a current sensor electrically connected with at least one charging port of the plurality of charging ports, the current sensor configured to collect current data for the at least one charging port of the plurality of charging ports and communicate the current data to the logic circuit.

12. The USB charging system of claim 8, wherein the reduced wattage delivered to the particular charging port of the plurality of charging ports is maintained at an above-zero level until a current of the particular charging port of the plurality of charging ports is reduced below a second predetermined threshold.

13. The USB charging system of claim 8, wherein a first power converter of the plurality of power converters is configured to simultaneously output a first output voltage with a second output voltage output by a second power converter of the plurality of power converters.

14. The USB charging system of claim 8, wherein the logic circuit comprises a power delivery (PD) controller integrated circuit (IC) connected with a first charging port of the plurality of charging ports and a second charging port of the plurality of charging ports.

15. A universal serial bus (USB) charging system, comprising:
- a power supply including a plurality of power converters connected electrically parallel to one another and a plurality of power supply outputs electrically coupled to the plurality of power converters, respectively, each of the plurality of power converters configured to convert an input voltage to a plurality of output voltages;
- a plurality of charging ports electrically connected with the plurality of power supply outputs, respectively, each of the plurality of charging ports configured to provide an output voltage selected from the plurality of output voltages to an electronic device;
- a temperature sensor;
- a logic circuit in electrical communication with the power supply and the plurality of charging ports, the logic circuit configured to provide direct feedback to the power supply to output a particular output voltage of the plurality of output voltages to the plurality of charging ports, the logic circuit configured to regulate a wattage delivered to two or more charging ports of the plurality of charging ports,
- wherein the logic circuit is in electrical communication with the temperature sensor and the logic circuit is configured to detect a temperature of the two or more charging ports of the plurality of charging ports and reduce a wattage delivered to a particular charging port of the plurality of charging ports if a temperature detected in the particular charging port of the plurality of charging ports exceeds a predetermined threshold; and
- a thermally conductive housing in thermal contact with the power supply, the plurality of charging ports and the logic circuit, the thermally conductive housing configured to transfer heat away from at least one of the power supply, the charging ports of the plurality of charging ports, or the logic circuit to reduce a temperature of the USB charging system.

16. The USB charging system of claim 15, wherein the thermally conductive housing includes a metal.

17. The USB charging system of claim 15, wherein a maximum wattage deliverable to each charging port of the plurality of charging ports is at least 30 watts.

18. The USB charging system of claim 15, wherein the plurality of charging ports includes a USB Type-A port, a USB Type-C port, or a Line-Voltage port.

19. The USB charging system of claim 15, wherein the reduced wattage delivered to the particular charging port of the plurality of charging ports is maintained at an above-zero level until a temperature of the particular charging port of the plurality of charging ports is reduced below a second predetermined threshold.

20. The USB charging system of claim 15, wherein a first power converter of the plurality of power converters is configured to simultaneously output a first output voltage different from a second output voltage output by a second power converter of the plurality of power converters.

21. A universal serial bus (USB) charging system, comprising:
- a power supply including a plurality of power converters and a plurality of power supply outputs electrically coupled to the plurality of power converters, respectively, each of the plurality of power converters configured to convert an input voltage to a plurality of output voltages;
- a plurality of charging ports electrically connected with the plurality of power supply outputs, respectively, each of the plurality of charging ports configured to provide an output voltage selected from the plurality of output voltages to an electronic device;

a temperature sensor; and a logic circuit in electrical communication with the power supply, the plurality of charging ports and the temperature sensor, the logic circuit configured to provide direct feedback to the power supply to output a particular output voltage of the plurality of output voltages to the plurality of charging ports, the logic circuit configured to monitor a state of charge of a device connected with each charging port of the plurality of charging ports and regulate a wattage delivered to the device connected with each charging port of the plurality of charging ports, wherein the logic circuit is configured to reduce a wattage delivered to a first charging port of the plurality of charging ports when a state of charge of a first device connected with the first charging port of the plurality of charging ports exceeds a predetermined threshold and increase a wattage delivered to a second device connected with a second charging port of the plurality of charging ports when the state of the charge of the first device exceeds the predetermined threshold.

22. The USB charging system of claim 21, wherein a maximum combined wattage deliverable to the first and second charging ports is from about 1 watt to about 100 watts.

23. The USB charging system of claim 21, wherein the first charging port and the second charging port art both USB Type-C ports.

24. The USB charging system of claim 21, wherein the reduced wattage delivered to the first device connected with the first charging port of the plurality of charging ports is maintained at an above-zero level, by the logic circuit, when the state of charge of the first device is below a maximum state of charge for the first device.

25. The USB charging system of claim 21, wherein the reduced wattage delivered to the first device connected with the first charging port of the plurality of charging ports is maintained at a range of from 0 watts to about 15 watts, by the logic circuit, when the state of charge of the first device reaches a maximum state of charge for the first device.

26. The USB charging system of claim 21, wherein when the state of charge of the first device reaches a maximum state of charge for the first device, the increased wattage delivered to the second device is maintained at substantially a maximum wattage output of the USB charging system by the logic circuit.

27. The USB charging system of claim 21, further including a first current sensor connected with the first charging port and a second current sensor connected with the second charging port, the first current sensor configured to communicate data of a first load current in the first current sensor to the logic circuit, and the second current sensor configured to communicate data of a second load current in the second current sensor to the logic circuit.

28. The USB charging system of claim 27, wherein the logic circuit is configured to receive the data of the first load current and the second load current, and adjust the wattage delivered to the device connected with each charging port of the plurality of charging ports in real-time.

29. The USB charging system of claim 21, wherein a first power converter of the plurality of power converters is configured to simultaneously output a first output voltage different from a second output voltage output by a second power converter of the plurality of power converters.

30. The USB charging system of claim 21, wherein the logic circuit comprises a first power delivery (PD) controller integrated circuit (IC) and a second PD controller IC, the first PD controller IC electrically connected with a first charging port of the plurality of charging ports and the second PD controller IC electrically connected with a second charging port of the plurality of charging ports.

* * * * *